United States Patent [19]
Grimm et al.

[11] Patent Number: 5,907,815
[45] Date of Patent: May 25, 1999

[54] PORTABLE COMPUTER STORED REMOVABLE MOBILE TELEPHONE

[75] Inventors: Thomas R. Grimm; Ronald L. Smith; LaVaughn F. Watts, Jr., all of Temple, Tex.

[73] Assignee: Texas Instruments Incorporated, Dallas, Tex.

[21] Appl. No.: 08/568,709

[22] Filed: Dec. 7, 1995

[51] Int. Cl.$^6$ ..................................................... H04Q 7/32
[52] U.S. Cl. ........................ 455/557; 455/556; 455/575; 455/550
[58] Field of Search .................................. 455/556, 557, 455/558, 575, 551, 552, 422; 395/893, 156, 200.01; 340/825.44; D14/138, 140, 144

[56] References Cited

U.S. PATENT DOCUMENTS

| | | | |
|---|---|---|---|
| 5,020,090 | 5/1991 | Morris | 455/556 |
| 5,249,218 | 9/1993 | Sainton | 455/422 |
| 5,353,334 | 10/1994 | O'Sullivan | 455/557 |
| 5,522,089 | 5/1996 | Kikinis et al. | 395/893 |
| 5,566,226 | 10/1996 | Mizoguchi et al. | 455/422 |
| 5,625,673 | 4/1997 | Grewe et al. | 455/556 |

*Primary Examiner*—Wellington Chin
*Assistant Examiner*—Keith Ferguson
*Attorney, Agent, or Firm*—Ronald O. Neerings; James C. Kesterson; Richard L. Donaldson

[57] ABSTRACT

The present invention provides a solution to the dual problems of mobility and portability associated with using a portable telephone in combination with a portable computer. A portable telephone (166) is constructed to fit within a cavity (210) in a portable computer (164). When fully inserted into the computer (166), the portable telephone (166) is physically connected to the portable computer (164) by a latching mechanism and communicates with the portable computer by means of a computer/portable telephone interface (172, 192, 204 that electrically connects the portable telephone to the portable computer. Physically and electrically connecting the portable telephone to the portable computer eliminates the need for a cable or tethered connection between a portable computer and a portable telephone. In one embodiment of the invention, the portable telephone serves as the portable computer's modem and function while installed in the computer. Thus, the portable phone facilitates the transmission and reception of data between the portable computer and another computer connected to the telephone system. In another embodiment of the invention, the portable computer (and not the portable telephone), contains the modem that is utilized for telephonic data communications. In yet another embodiment of the invention, a modem is omitted altogether for digital data communications. An operator of the portable computer/portable telephone also has the option of using the portable telephone for voice transmission independently of the computer, or may enjoy hands free voice operation by using the portable computer's internal speaker and microphone. The portable telephone operates on the computers internal battery/power system while installed in the portable computer and on it's own battery (charged while in the portable computer) when used independently of the portable computer.

29 Claims, 79 Drawing Sheets

PORTABLE COMPUTER STORED REMOVABLE MOBILE TELEPHONE

FIELD OF THE INVENTION

The present invention relates to the fields of mobile telecommunications and portable computers. More specifically, the present invention relates to a portable telephone dimensioned to fit within a battery pack space of a portable computer.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

BACKGROUND OF THE INVENTION

The demands of modern life require many mobile workers, students and business people to carry at least one electronic device to perform their daily work. Some of the more commonly utilized electronic devices are the pager, personal digital assistant "PDA", the cellular telephone, the portable computer and a modem for the portable computer.

Portable computers are available in various models, functionality and cost from companies like Compaq, Toshiba, and Texas Instruments. Modems for computers are manufactured by companies such as US Robotics and Megahertz. Modems allow computers to communicate with each other over telephone lines. Modems are available in stand alone varieties or as a separate board that is inserted into the portable computer as an integral part of the computer (as in the case of the Texas Instruments TM-4000E portable computer), or as part of a card insertable into the PCMCIA card slot, as in the case of the Texas Instruments TM-4000M and TM-5000 portable computers).

Modern computer and telephone system technology have made the transmission of computer originated data over conventional telephone lines a commonplace event. In such systems, a computer is connected through a suitable interface, such as an RS 232 interface, to provide serial data signals to a conventional wire line modem. With modems of this type, when signal quality changes induce errors in the modem data stream, an ARQ (Automatic Repeat Request) of packet repeat scheme is conventionally employed for controlling these errors. This requires a complete repeat of numerous bytes of data until such time as all of the bytes of data in the packet are received correctly. However, the low frequency of signal quality change induced errors in a wire line environment makes this an efficient method of controlling error.

Current wire line modem technology provides a scrambled modulated signal to the telephone line which will not be interpreted by telephone equipment as a valid switch command. To accomplish this, conventional wire line modems are provided with a scrambler circuit which assures that the modulated signal is continuously changing. This changing signal is used by the modem PLL (Phase Locked Loop) circuitry to provide synchronization, for without this scrambled modulated signal, a static condition of the modem will cause the PLL to loose synchronization and the telephone equipment to interpret the static signal as a switch command.

Figure 1:
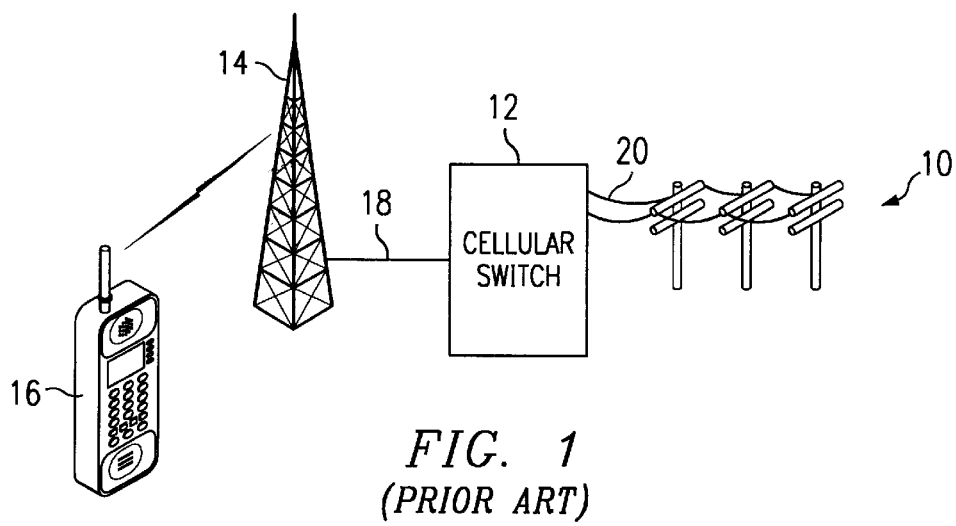
FIG. 1 illustrates a basic prior art cellular telephone network.
Figure 2:
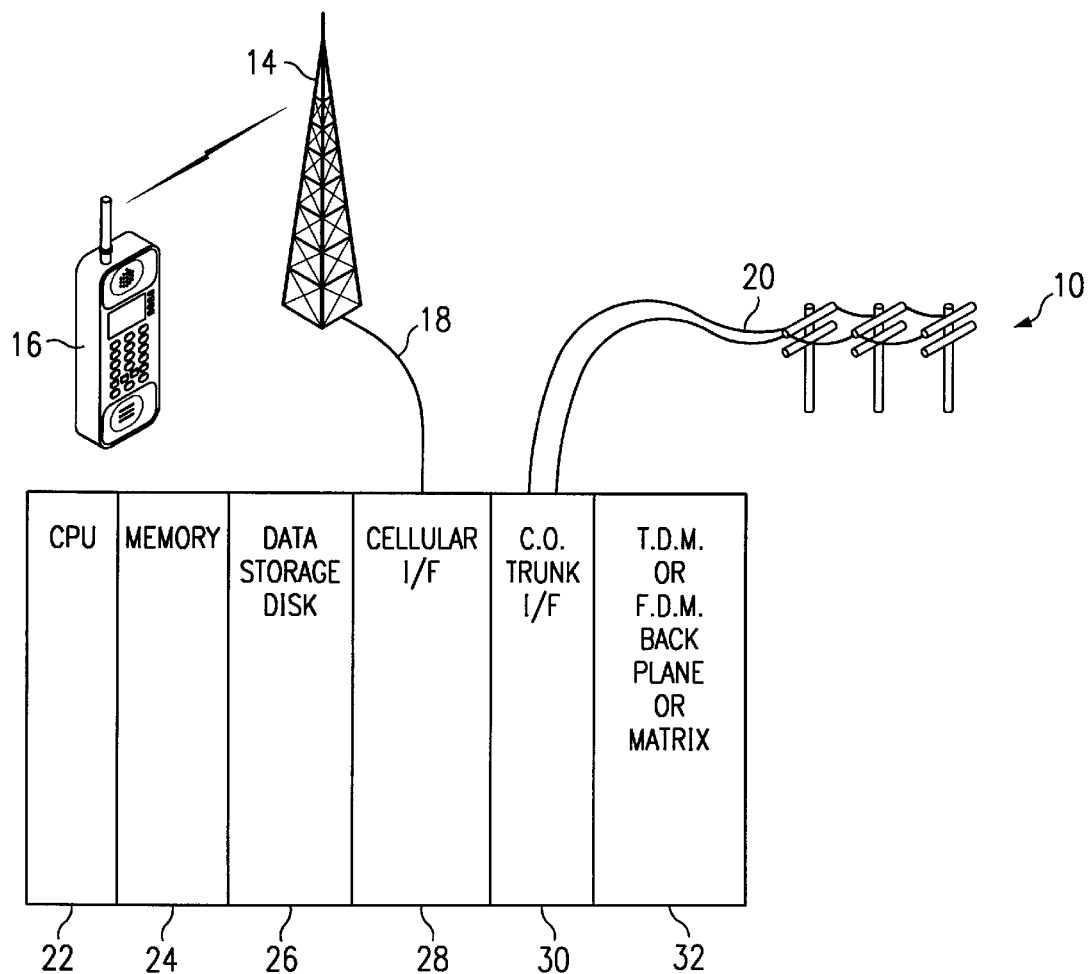
FIG. 2 is a block diagram of the cellular telephone network of FIG. 1.

Conventional telephone modems have operated effectively to interface computers with a telephone system for data transmission, but these modems do not operate effectively to provide data transmission over conventional cellular telephone equipment. Cellular telephones are available in various sizes, shapes, functionality and cost from companies such as Motorola, Nokia and Erricson. Portable hand held cellular telephones do not presently incorporate internal modems or ports for connecting to stand alone modems since cellular telephones have not been used to transmit data. FIG. I illustrates a prior art cellular network 10 having a mobile cellular telephone exchange (MTX) switch 12 connected to a transceiver and antenna 14. A transceiver is located in each cell of the cellular network and communicates with the MTX to effect transmission and reception of signals to and from the mobile telephone 16. The transceiver is typically connected to the cellular switch 12 via a leased or dedicated network line 18. The cellular switch 12 is typically connected to the land-based destinations via telephone network 20. FIG. 2 is a block diagram of the telephone network of FIG. 1. The hierarchical architecture of cellular switch 12 includes a central processing unit 22, memory 24, data storage disk 26, cellular interface 28, central office trunk interface 30 and a backplane or switching matrix 32.

In the cellular telephone environment, numerous errors are induced into data transmission because of the problems associated with cellular telephone communication. Echo and fading problems cause multiple bit errors in the data stream, and such problems occur frequently with a moving vehicle. For example, the transmitted signal may hit a building or other obstacle and bounce erratically or fade as the vehicle is shielded from the cell antenna. This high frequency of error in the data stream transmitted by cellular transmission renders the error correction protocol present in conventional wire line modems unsuitable for cellular use. Errors occur so frequently in a cellular environment that the number of repeat requests becomes large and data transmission efficiency is reduced below an acceptable amount. In some instances, errors may occur so often that a correct packet may never be received. Thus, the error correction protocol present in conventional telephone modems is unable to cope with problems presented in a cellular environment.

One solution to the problem of transmitting data in a vehicle mounted cellular telephone environment is discussed in U.S. Pat. No. 4,697,281 to O'Sullivan, herein incorporated by reference. The patent describes a cellular telephone data communication system and method involving the use of a mobile data processing interface and a cooperating static data processing interface to effectively transmit data over a cellular telephone system. Each data processing interface includes a processor which operates in the transmitting mode to add an error control correction data format to data received from an external data source. The data is divided into packets and provided to a modem which is uniquely operated to eliminate the action of the modem scramble system and to remain active in spite of a carrier signal loss. The modem is deactivated or disconnected by a disconnect signal from the processor, and when carrier signal loss occurs, this disconnect signal is provided only after the lapse of a delay period without the resumption of the carrier signal. The error control correction data format causes a receiver to evaluate the received data for error and to retransmit an acknowledgment signal for each acceptable packet of received data. In the absence of an acknowledgment signal, the processor will again provide a data packet to the modem for retransmission. Also, the processor will determine the frequency of error in the received data from the acknowledgment signals and subsequently adjust the data packet size in accordance with this error frequency.

More specifically, a system for transmitting data over a cellular environment as taught by U.S. Pat. No. 4,697,281 is indicated generally at 34 in FIG. 3. A vehicle mounted mobile cellular telephone system conventionally includes a transceiver 36 which transmits or receives voice signals in the radio frequency range by means of an antenna 38. Voice signals transmitted by the antenna 38 are received by an antenna 40 connected to a transceiver 42 located in a specific cell area of the cellular telephone network. The transceiver 42 is connected to the cellular land line equipment 44 which is operative to transmit the received signal over conventional telephone lines 46. Voice signals from the telephone lines 46 may also be transmitted by the transceiver 42 and the antenna 40 back to the antenna 38 to and through the transceiver 36 of the cellular telephone unit. The transceiver 36 is controlled by a cellular telephone system control unit 48 which is connected to the transceiver by means of a cellular telephone bus 50. The cellular bus 50 may be one which meets the AMPS (Advanced Mobile Phone Service) specifications determined by the Federal Communications Commission. These specifications indicate that control signals between the transceiver 36 and the control unit 48 should be on an eight bit parallel party line bus and that the analog signals should be a differential signal with a nominal –20 dbV level using a 24 wire interconnecting cable. A very complete description of the AMPS system is provided in "The Bell System Technical Journal", 1979, Vol. 58, No. 1, pp 1–269.

A cellular interface 52 renders the remainder of the mobile data programming interface 54 compatible with the cellular bus 50 of a particular cellular telephone system. For example, with AMPS compatible cellular telephones, the cellular interface 52 would consist of an eight bit parallel I/O, port party line drivers and receivers, operational amplifiers providing differential driving and receiving analog conversion between the –20 dbV signal on the cellular bus and the defined levels required by an analog switch and condition system 56. Cellular interfaces of this type are known, commercially available items, as exemplified by cellular interfaces sold by Motorola Corporation of Schaumberg, Ill. or Oki of Japan.

The analog switch and conditioning system 56 is implemented using currently known switching technology. The system may incorporate CMOS analog switches operative in response to microprocessor generated control signals to switch the state of signal processing operational amplifiers. Basically, this analog switch and condition system operates to selectively connect various components of the portable cellular unit to the cellular interface 52. Microprocessor 58 provides control functions for the cellular interface 52 and analog switch and conditioning system 56 as well as for other portions of mobile date programming interface 54. Microprocessor 58 may be a conventional 8/16 bit microprocessor, such as the Intel 8088 manufactured by Intel Corporation. The microprocessor includes random access (RAM) and read only (ROM) memory storage systems which contain the control and data error programs necessary to adapt computer data for cellular telephone transmission. The use of a separate microprocessor in the portable cellular unit frees the limited memory which is normally available in portable computers for other uses.

A serial data stream is provided to the microprocessor 58 from an external portable computer 60 by means of a conventional RS 232 interface 62 included within the mobile data programming interface. Data received by the microprocessor from the portable computer 60 is provided with unique error correction signal information before being provided to a modem 64.

The modem 64 may be one of a number of conventional modems used for telephone wire line transmission which has test mode capabilities for deactivating certain modem functions. A particular commercially available modem suitable of use as the modem 64 is the AMI 3530 modem manufactured by Gould Advanced Semiconductors of 3800 Hemstead Road, Santa Clara, Calif. Modems of this type, when employed for data transmission over conventional telephone lines, will disconnect immediately in response to a carrier loss. When such modems sense a channel blanked status occasioned by a carrier loss, they provide a "break bit" output and disconnect. Also, for normal use such modems include a scrambler system which assures that the data modulated signal is continuously changing, and this signal change is used by the modem PLL circuitry to provide synchronization. A non-scrambled modulated signal may be interpreted by the telephone operating equipment as a valid switch command, and this is particularly true when the modem is in the static condition. Normally this scrambler system in the modem prevents this tactic condition where loss of synchronization by the PLL or the interpretation of the static signal as a switch command is most likely to occur. However, modems such as the AMI 3530 incorporate a test mode of operation wherein the modem is prevented from disconnecting in response to carrier loss and wherein the modem scrambler can be deactivated or defeated. Normally, such modems would be incapable of effective operation in this test mode, but it is the availability of this test mode that renders modems of this type suitable for use as the modem 74.

The data stream from the microprocessor 58, including error correction data from the microprocessor, is transmitted by the modem 64 through the analog switch 56 and cellular interface 52 to the transceiver 36. This data is then transmitted as a radio frequency signal by the antenna 38 to the antenna 40, where it is converted by the transceiver 42 and cellular land line equipment 44 to a signal suitable for transmission over conventional telephone lines 46. These telephone lines connect the signal to the second portion of the cellular transmission system of the present invention which is a static data programming interface 66 operative to pass data signals to and from the telephone line 46. The data signals which are passed to the telephone line originate at a host computer 68 which cooperates with the static data programming interface in a manner similar to the operation of the portable computer 60 with the mobile data programming interface 54.

For transmission purposes, the computer 68 provides data to an RS 232 interface 70 which in turn provides the data to a microprocessor 72. This microprocessor preferably is identical in construction and function the microprocessor 58, and is programmed with the same control and error correction and other programming. The microprocessor 72 adds error correction and control signal to the data provided from the RS 232 interface, and then provides the modified data stream to a modem 74. The modem 74 is identical in construction and function to the modem 64, and operates to transmit the data stream by means of an analog switch and conditioning system 76 to a conventional FCC interface 78. The FCC interface provides the data stream to the telephone lines 46 where they are sent by means of the cellular land line equipment 44 to the transceiver 42. The data is then transmitted to the transceiver 36 which provides it by means of the cellular interface 52 and the analog switch 56 to the microprocessor 58. The microprocessor then removes the error correction and control signals from the data stream and provides the data through the RS 232 interface 62 for display and use by the portable computer 60.

The static data programming interface 66 receives data transmitted over the cellular telephone line, and this incoming data from the FCC interface 78 is fed by means of the analog switch 76 to the microprocessor 72. Here the error and control signals are removed from the data and the data is then displayed and/or used by the computer 68. It will be noted that the static data programming interface 66 and the mobile data programming interface 54 are substantially identical in structure and operation with the exceptions that the static data programming interface is connected to telephone lines by an FCC interface while the mobile data programming interface is connected to a cellular telephone system by a cellular interface. Also, the mobile data programming interface may be powered from a vehicle battery 80 which operates through a conventional power converter 82 to provide power to a power bus 84. This power bus 84 is connected to provide power to all of the operating units in the mobile data programming interface 54 and may also be connected to provide power to the portable computer 60. The static programming interface 66 includes a similar power bus, not shown, which is connected to any conventional power supply such as the power supply in a building containing the computer 68.

Although the mobile data programming interface 54 and the static data programming interface 66 must communicate with one another to effectively transmit data over a cellular telephone system, both of these units can also transmit and receive conventional cellular telephone audio transmissions. The mobile data programming interface 54 includes a telephone interface 86 which may be connected to an external telephone-like handset 88 and which operates in a conventional manner through the analog switch and conditioning system 56 and cellular interface 52 to transmit and receive audio communications by means of the transceiver 36. In a similar manner, the static data programming interface 66 includes a telephone interface 90 which may be connected to an external telephone to transmit and receive audio signals through the telephone interface, the analog switch 76 and the FCC interface 78. Thus, both the mobile data programming interface 54 and the static data programming interface 66 are adapted for normal audio communication. Like the mobile data programming interface, the static data programming interface includes a control and display section (not shown) which is connected to the microprocessor 72 and which operates to receive data from which the microprocessor has extracted the control and error signals.

Figure 3:
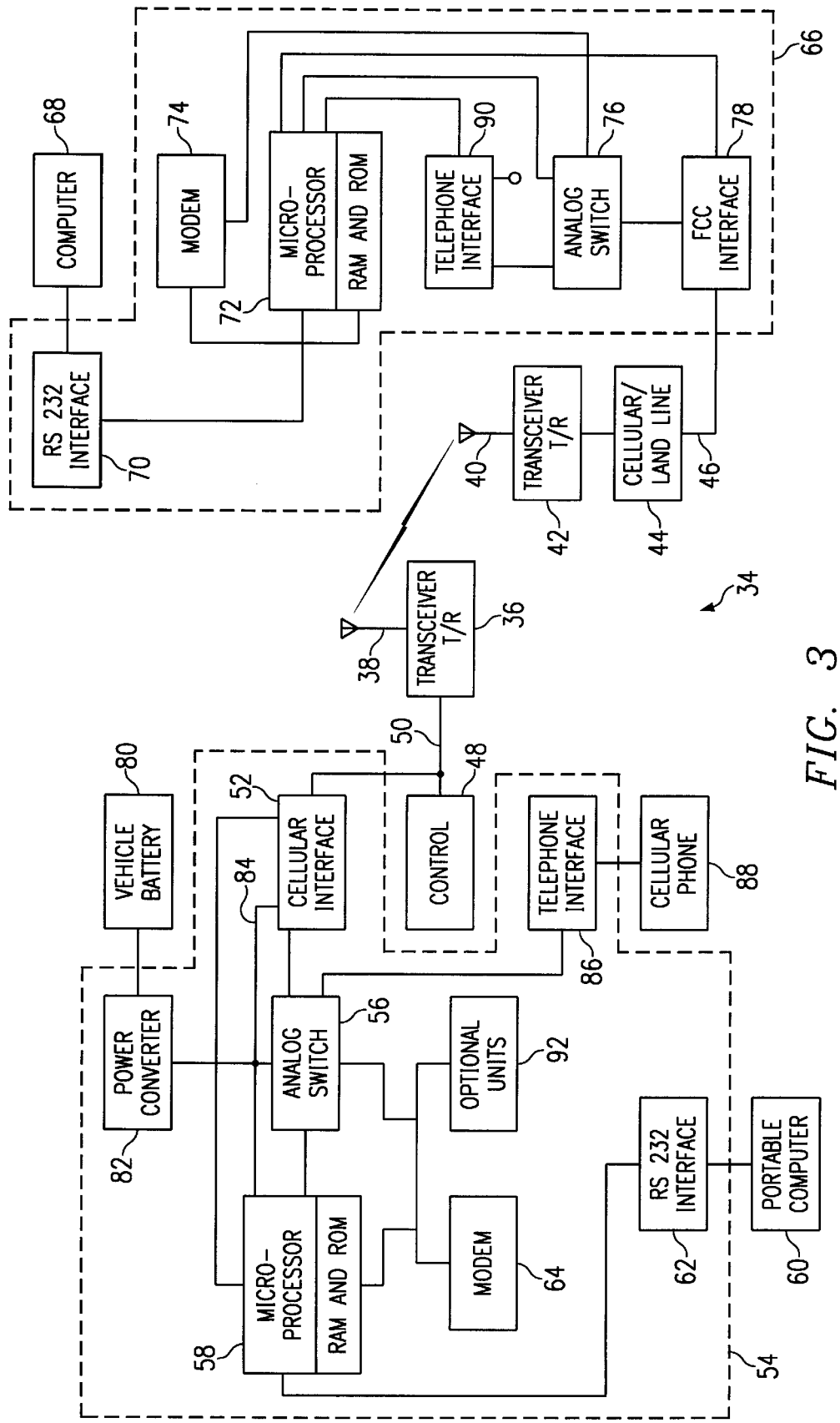
FIG. 3 is a block diagram of a prior art cellular telephone data communication system.

Both the mobile data programming interface 54 and the static data programming interface 66 will operate with optional equipment, and an optional equipment block 92 is shown for the mobile data programming interface in FIG. 3. This optional equipment might include other modems, a microphone which may be employed to provide audio communication in place of the cellular phone 88, and various memory and encrypting devices known to the art to accomplish automatic dialing similar functions.

Figure 4:
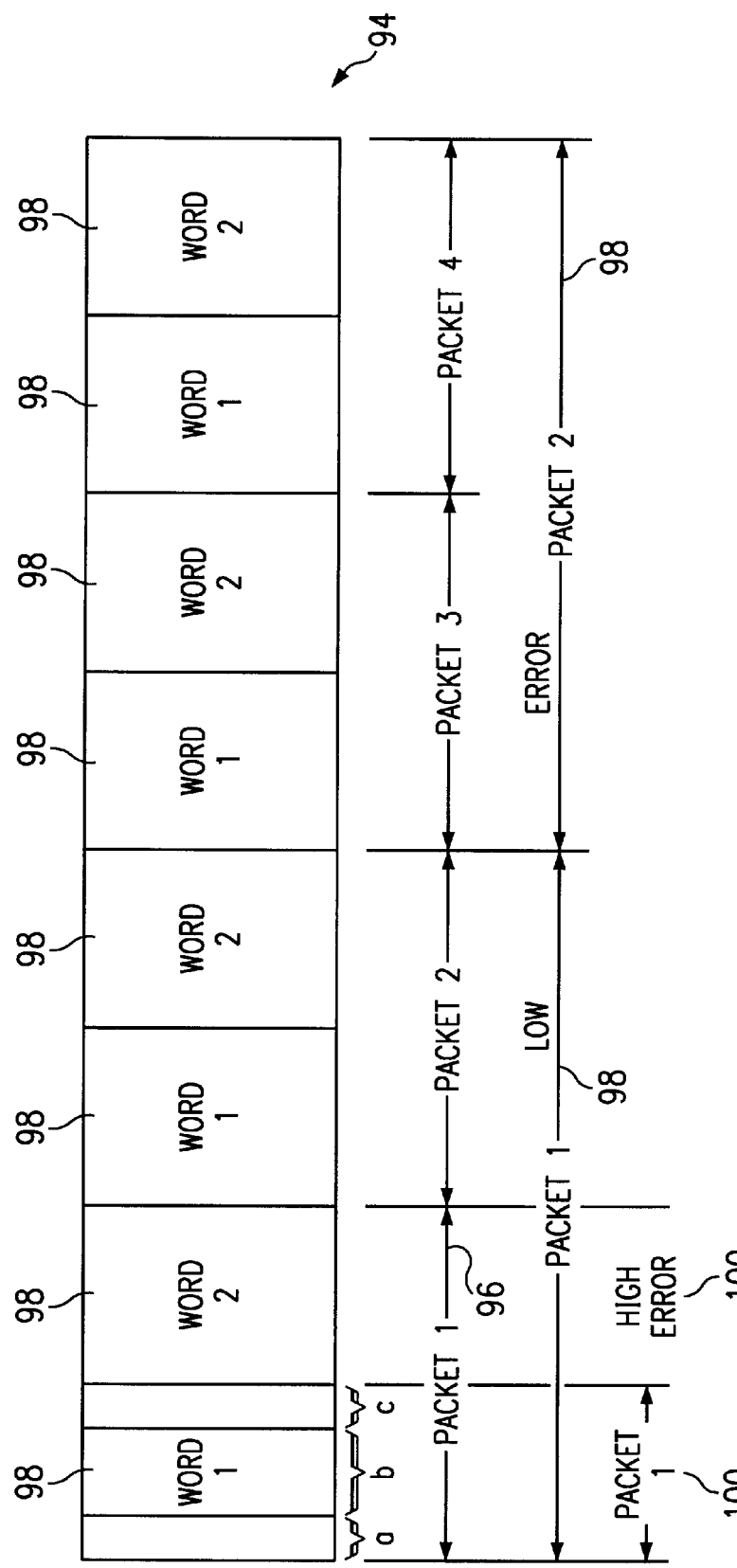
FIG. 4 is a diagram illustrating a manner in which the data signal to be transmitted by the cellular telephone data communication system of FIG. 3 is modified to provide an error detection and correction capability.

Before considering in detail the operation of the mobile data programming interface 54 and the static data programming interface 66, it is necessary to understand the manner in which the microprocessor 58 and modem 64 and the microprocessor 72 and modem 74 cooperate to adapt a data signal for cellular telephone transmission. With reference to FIG. 4, there is diagrammatically illustrated a data document 94 to be transmitted which has originated with the portable computer 60. This data document is divided, by the microprocessor 58, into a plurality of packets 96, and for purposes of illustration in FIG. 4, four packets of equal size are shown. In actuality, a document would be divided into many more packets which would not necessarily be of equal size. Further, each packet is divided by the micoprocessor 58 into a plurality of words, and for purposes of illustration in FIG. 4, each packet 96 includes two words 98. Again, a packet would normally contain many more than two words, but two are shown for purposes of illustration. Each word in a packet includes three bytes a, b, and c, and the microprocessor 58 will determine whether the word is a control word or a data word. When the word is a data word, then bytes a and b will be data bytes, while byte c is a forward error correction (FEC) byte. Conversely, if the word is a control word, byte a will be the control word signifier, byte b will be the control word descriptor and again, byte c will be the FEC byte. Thus, it will be noted that byte c is always the FEC byte for both data and control words.

Data words are always synchronous with the packet stream, while control words may or may not be synchronous to data. An example of an asynchronous control word would be an acknowledgement word, while an example of a synchronous control word would be the packet "end" word, while asynchronous control words do not affect the CRC of a packet. An exemplary form for an asynchronous control word, for example, the acknowledgement word, would be a control word signifier for byte a, the packet number for byte b, and byte c, the FEC byte. On the other hand, an example of a synchronous control word, such as the packet "end word", would be a control word signifier for byte a, a CRC byte for byte b and the FEC byte as byte c. A control word synchronous to the packet indicates that byte b is a data rather than a control byte.

The FEC byte causes the receiving microprocessor to check the data bytes in a data word and determine whether or not an error exists in that word. If an error is detected, the microprocessor 72 will use the FEC byte to correct the word at reception. However, if a predetermined error level in any word within a packet is exceeded, an acknowledgement signal for the packet will not be transmitted back to the transmitting microprocessor, thereby causing this microprocessor to retransmit the entire packet. For example, the predetermined error level could be a specified number of bits per word, for example 2 bits. Correction would occur for any error of 2 bits or less, but an error in excess of 2 bits would result in no acknowledgment being transmitted for the packet.

The microprocessor unit 72 operates in a manner identical to that of the microprocessor 58 to form data packets with control and data words to transmit data provided from the computer 68, and the microprocessor 58 operates in the receiving mode to check the data byte and pass acceptable data to the portable computer 60. If the transmitting microprocessor 72 or 58 does not receive acknowledgement signals back from the receiving microprocessor, correction, or other procedures to be described, are initiated by the transmitting microprocessor.

Referring back to FIG. 4, if the receiving microprocessor, in this example the microprocessor 72, examines a received data word and discovers an error in excess of the predetermined error level, it will not transmit a packet acknowledgement signal to the microprocessor 58. The transmitting microprocessor 58 will, by the lack of acknowledgment signals, be informed of excess error in a data packet 96, and will operate to retransmit this packet until the data is received in a substantially error-free or at least a correctable condition. To this point, the transmission of the data package has occurred in much the same manner as does the transmission of a data stream over a telephone wire. However, in the telephone wire environment, the error frequency is not as great as that experienced with cellular telephone transmission systems, and consequently, a uniform packet repeat process for error correction is acceptable for wire line data transmission. This is not the case for cellular telephone transmission, because the high error frequency might well cause multiple packet repeats to such an extend that no transmission would ever occur. Consequently, the transmitting microprocessor of the present invention is programmed with an error correction capability which involves a sliding packet size. This packet size is changed in accordance with transmission quality determined by the transmitting microprocessor on the basis of an evaluation of the error frequency in signals received from previously transmitted data. The receiving microprocessor transmits a data stream to the transmitting microprocessor from which this evaluation is made. The packet size is increased for a good transmission signal and decreased for a bad transmission signal, so that in a high error situation, the retransmitted packet is of minimum size. The transmitting microprocessor is continuously evaluating the number of errors in the data stream it receives from the receiving microprocessor, and is adjusting the packet size of subsequent transmissions in accordance with this evaluated error data. Thus, as illustrated by FIG. 4, the packet size 96 might be increased during transmission period by the transmitting microprocessor to a much larger packet size 98 when transmission errors are minimal, or, conversely, the transmitting microprocessor might decrease the packet size to a much smaller packet size 100 as transmission errors increase.

In the transmission mode, both the microprocessors 58 and 72 provide a sliding packet ARQ wherein the packet size changes or slides based on the transmission quality. In a high error situation, the packet size becomes smaller and the time required to repeat a packet containing error is lessened. Consequently, in a cellular transmission situation where errors are occurring frequently, a packet of reduced size containing corrected data may be received, while if the packet remained of greater size, numerous bytes of data would have to be retransmitted until all bytes of data would have to be retransmitted until all bytes of data in the packet are received correctly. This would reduce data transmission efficiency, or in extremely high error situations, prevent the reception of a correct packet.

The microprocessors 58 and 72 maintain the modems 64 and 74 on line in the event of a carrier signal loss during data transmission. As previously indicated, such a carrier transmission loss occurs when the vehicle bearing the mobile data programming interface 54 passes between cells in a cellular telephone system. The modems 64 and 74 are operated normally in the test mode or a similar mode which prevents the modem from automatically disconnecting in response to a carrier signal loss. Instead, the modem is not permitted to disconnect until it receives a disconnect signal from the respective microprocessor 58 or 72. This microprocessor, which has been sending or receiving data, senses the carrier signal loss when it receives a "break bit" from the associated modem, and therefore, the microprocessor recognizes a carrier loss and initiates a time delay period before permitting the modem to disconnect. Generally, the hand-off period between cells of a cellular telephone system causes less than a one-second carrier signal loss, and consequently, the delay initiated by the microprocessor in response to a carrier loss may be anywhere within the range of from two to seven seconds. This delay period is sufficient to permit reestablishment of the carrier signal when the loss of carrier is occasioned by travel between cells. By never allowing a carrier loss to cause modem disconnect during this predetermined time delay period, the time needed for the modem to reestablish data transmission after the carrier loss terminates is decreased, thereby improving overall efficiency. Thus, if the carrier loss terminates during the predetermined time period set by the microprocessor, modem disconnect does not occur. On the other hand, the microprocessor will instruct the modem to disconnect when the data transmission is ended by the microprocessor, when the cellular telephone call is completed, as sensed by the cellular interface 52 or the FCC interface 78 and transmitted to the microprocessor, or when the delay period set by the microprocessor expires.

The modems 64 and 74 are not only used in the test mode to disable the normal modem disconnect circuitry, but also are used in a mode which disables the modem scrambler circuitry. It is important for effective cellular data transmission to prevent the scrambler polynomial from increasing the number of bit errors received, for these additional errors further reduce the effectiveness of the error correction scheme. However, with the scrambler defeated, the synchronization of the modem PLL circuitry is no longer provided and the non-scrambled modulated signal may be interpreted by the telephone company equipment as a valid switch command. Both of these problems are solved by the cooperation between the modem and its associated microprocessor. Considering the microprocessor 58 to be the transmitting microprocessor, all data sent by the modem 64 is first presented to the modem by the microprocessor. The microprocessor is programmed to ensure that the data signal provided to the modem has enough changing signals to keep the modem PLL in synchronization and to prevent the telephone switching equipment from assuming the signal is a valid switching command. It must be recognized, however, that data is not always sent by the modem 70 in a continuous stream, and that the modem is often in a static condition. It is when the modem is in this static condition that the modem PLL may lose synchronization or that the telephone equipment may interpret the static condition as a switch command. Normally, the modem scrambler would prevent this static condition, but in the present circuit, the transmitting microprocessor knows when the last data byte was presented to the modem and what the transmission rate of the modem is. With this information, the microprocessor determines when the modem is in a static condition, and immediately initiates the presentation of a unique byte of data to the modem. This unique byte is repeatedly presented until data is again available for transmission, or in the alternative, until the modem is shut down. The characteristics of this unique byte, hereinafter known as the synch byte, are such that the bit stream is always changing, and the receiving modem recognizes this byte as a synch byte and not a valid data byte. These two conditions can be met by many different bytes, and the choice of which one to use is arbitrary.

Since the structure and operation of the mobile data programming interface 54 and the static data programming interface 66 are substantially the same, both operate in the same manner to either transmit or receive data.

Figure 5:
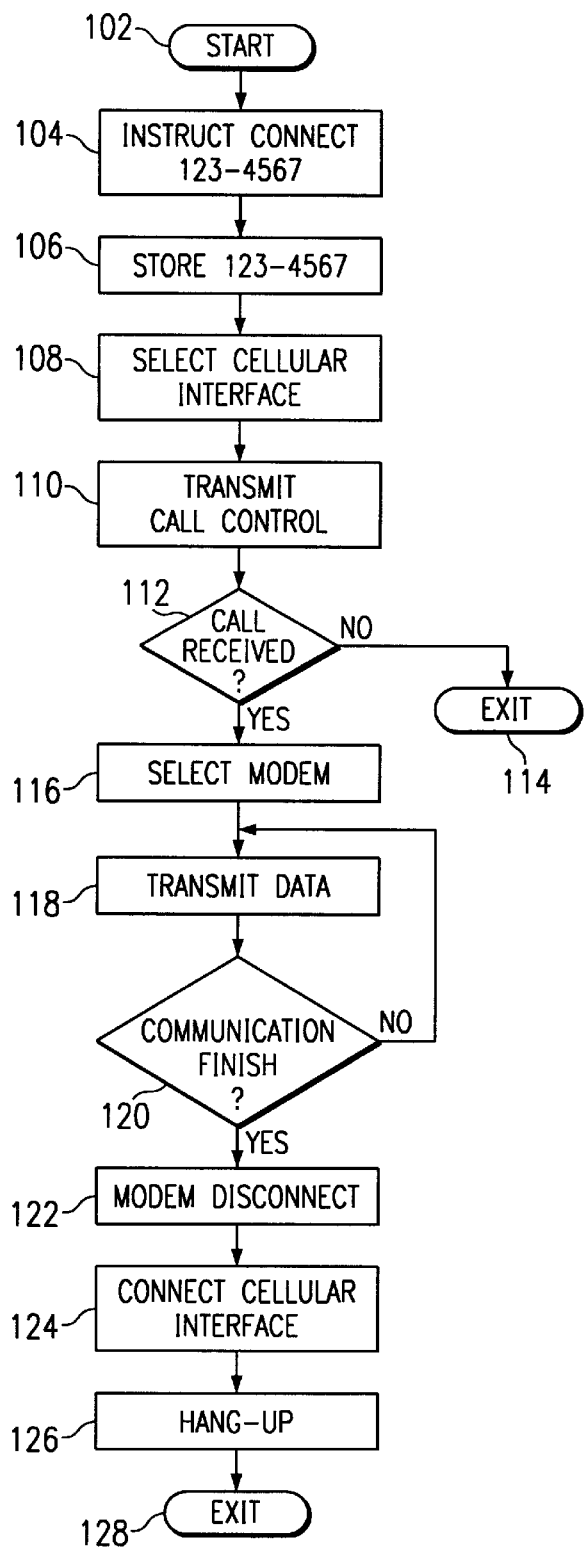
FIG. 5 is a flow chart showing the control functions of the microprocessor for a transmitting interface of the cellular telephone data communication system shown in FIG. 3.

Referring now to FIG. 5, there is illustrated a flow chart including the basic process steps used by the microprocessor 58 in transmitting a data signal over the cellular telephone system. The coding of the process steps of this flow chart into the instructions suitable to control the microprocessor 58 will be understandable to one having ordinary skill in the art of programming (also illustrated in detail in the microfiche program appendixes to U.S. Pat. No. 4,697,281). The flow chart of FIG. 5 begins at start block 102, and the microprocessor 58 is adapted to receive dialing instructions as indicated by block 104 which originate at the portable computer 60 or from some other source. These instructions command the microprocessor to connect the system to a designated telephone number (122-4567) and the received instructions are stored in the microprocessor as shown by block 106. In response to the instructions, the microprocessor then operates to cause the analog switch and conditioning system 56 to complete an instruction path to the cellular interface 52 as shown at 108. With this path completed, the microprocessor operates at 110 to transmit the stored call control signals to the cellular interface with the instructions to cause the cellular interface to send the eight bit parallel control signals required to dial the phone number 123-4567. The microprocessor then waits for the call to be answered, and if this does not occur, the NO branch is taken from the decision block 112 to block 114 to exit from the flow chart in FIG. 5. However, if the call is answered, the YES branch is taken from the decision block 112 to block 116, where the microprocessor 58 instructs the analog switch and conditioning system 56 to switch the signal path from the cellular interface to the modem 64. Subsequently, at block 118, the modem is instructed to transmit data received by the microprocessor.

The data transmission is monitored as indicated by the decision block 120. As long as data is being transmitted through the microprocessor 58, the NO branch of the decision block 120 takes the decision to the block 118 to continue the transmission of data. However, once data transmission is finished, the YES branch of the decision block 120 is taken to the modem disconnect block 122 where the microprocessor instructs the modem to terminate its function. Then the analog switch and conditioning system 56 is instructed, as indicated by the block 124, to disconnect the path between the modem and the cellular interface and to reconnect the microprocessor which, at 126, instructs the cellular interface to hang up the telephone and terminate the call before exiting at 128.

Figure 6:
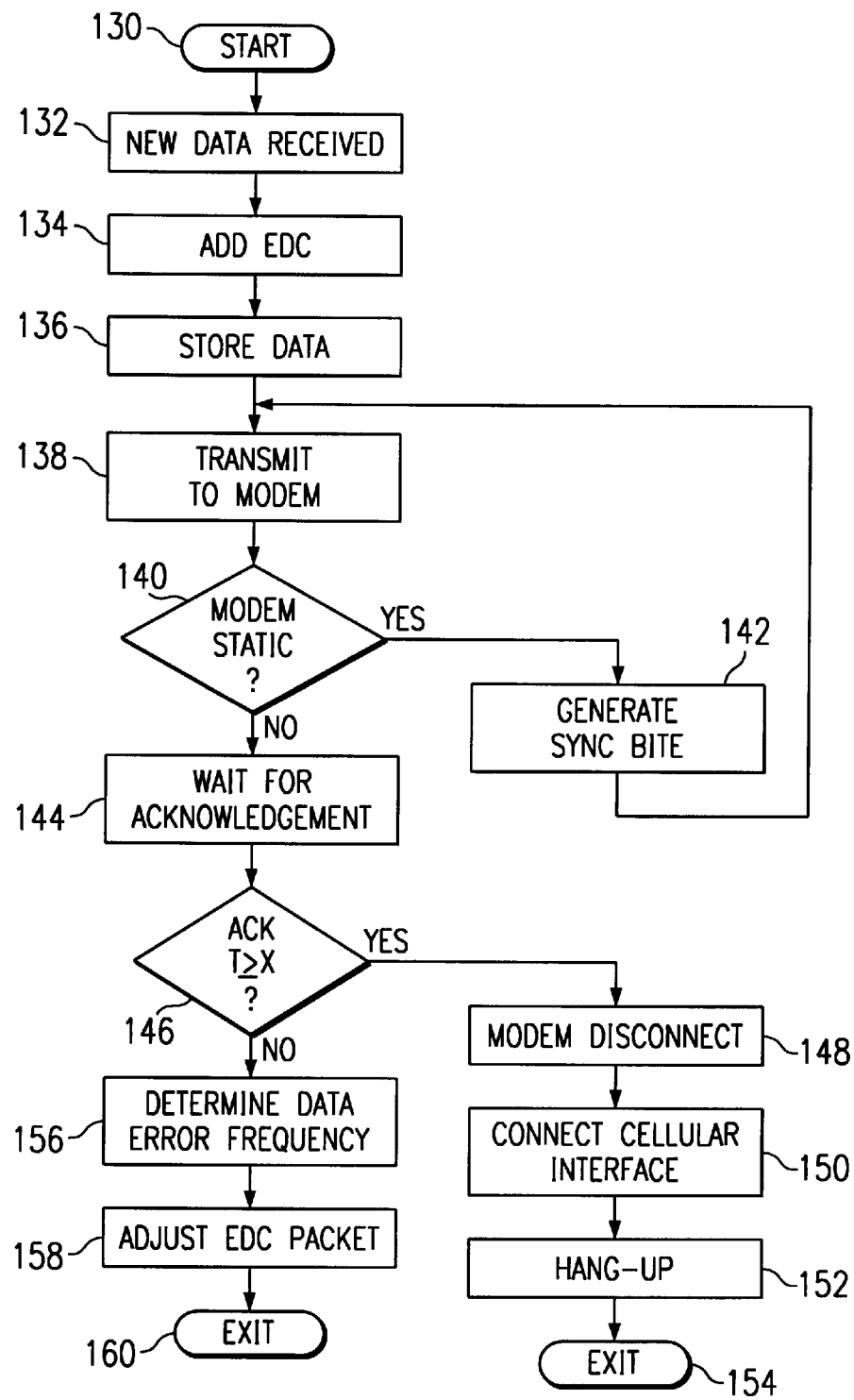
FIG. 6 is a flow chart showing the data processing function of the microprocessor for a transmitting interface of the cellular telephone data communication system shown in FIG. 3.

Referring now to FIG. 6, a flow diagram illustrates in detail the operation of the microprocessor 58 during the block shown at 118 in FIG. 5 when data transmission is occurring. Again, the coding of the process steps used by the microprocessor 58 into the instructions suitable to control the microprocessor will be understood by one having ordinary skill in the art (and illustrated in detail in the microfiche program appendixes to U.S. Pat. No. 4,697,281).

Entering the flow chart at a start block 130, a data stream provided by the portable computer 60 through the RS 232 interface 62 is received by the microprocessor 58 as indicated by the block 132. Next, the data signal is modulated with the error detection and correction and other control bytes described in connection with FIG. 4, as illustrated by the block 134 and the modulated data stream is stored at 136. The data is then transmitted to the modem at 138, and the modem provides the data to the cellular interface for transmission. As previously indicated, the microprocessor provides the data to the modem in a modulated signal which has enough changing signals to keep the modem PLL in synchronization. However, during the operation of the modem, the microprocessor monitors the data and modem operation to make sure that the modem is not static. The microprocessor uses the transmission rate of the modem and the time when the last data byte was presented to determine when the modem is in a static condition, and as indicated by the decision block 140, when the modem is static, the YES line to the block 142 shows that a repetitive synch byte is generated which is transmitted to the modem.

When the modem is not in the static condition, the NO line from the decision block 140 to the block 144 indicates that the microprocessor waits for the receipt of acknowledgment signals from the receiving microprocessor 72 for each word and packet of data transmitted. In the event of a loss of carrier signals, the microprocessors 58 and 72 respond to a "break bit" from the modem and initiate a time clock before permitting modem disconnect. As indicated by the decision block 146, when the awaited carrier signals are totally missing for a time t which is equal to or greater than a predetermined time x, the YES line to a modem disconnect block 148 is followed. At this point, the same operation which has occurred with the blocks 122, 124, 126, and 128 in FIG. 5 occurs, and the modem is disconnected from the cellular interface. The cellular interface is reconnected to the microprocessor at 150 which instructs the cellular interface to perform a hang-up operation at 152 before exiting at 154.

On the other hand, if the time when no carrier signals are received is less than the predetermined delay time period x, then the NO line from the decision block 146 to a data error frequency determination block 156 becomes relevant. Here, the frequency of data errors at the receiving data microprocessor 72 is determined and employed at block 158 to adjust the EDC packet to provide larger or smaller packets in the manner described in connection with FIG. 5. Then this portion of the program is exited at 160.

The operation of the microprocessors 58 and 72 during the reception of data, evaluation of data errors and transmission of acknowledgment signals has been described previously. Since this operation is similar to that which occurs with wire line and other data transmission systems, it will be readily understood by those having ordinary skill in the art and illustrated in detail in the microfiche program appendixes to U.S. Pat. No. 4,697,281).

The portable computer 60 disclosed in U.S. Pat. No. 4,697,281 is connected to the mobile data programming interface 54 via a cable connected to an RS 232 interface 62 in the mobile data programming interface 54. The cable or tethered connection is fine as long as there is little movement between the portable computer and the mobile data programming interface and as long as the cable does not interfere with movement of a cellular telephone user. The problems of mobility and portability become more accurate it when the cellular phone is a hand held or portable cellular unit. Mobility is inhibited since a user of the hand held or portable cellular telephone can only move up to the distance of the cable or tethered connection from the portable computer. Portability is inhibited since the cable or tethered connection must be removed and reattached each time the components are separated a distance greater than the cable or tethered connection. Additional problems include tripping over the cable or tethered connection, catching the cable or tether connection on furniture, cut cables or tethered connections and worn out cable connectors. Thus, while the invention of U.S. Pat. No. 4,697,281 offers one solution to the problem of transmitting data in a cellular telephone environment, it fails to remedy mobility and portability problems caused by the cable or tethered connection between the cellular phone and a portable computer.

SUMMARY OF THE INVENTION

The present invention provides a solution to the dual problems of mobility and portability associated with using a portable telephone in combination with a portable computer. The invention comprises a portable telephone (cellular in the present case) constructed in such a fashion as to fit within a cavity in a portable computer (such as a cavity that otherwise accepts a battery pack—like the front loading battery pack for the Texas Instruments TM-5000 portable computer—or other device when not utilized as a portable telephone port). The portable telephone is physically connected to the portable computer by a latching mechanism and communicates with the portable computer by means of a computer/portable telephone interface (in this embodiment of the invention, an in line connector that electrically connects the portable telephone to the portable computer). Physically and electrically connecting the portable telephone to the portable computer eliminates the need for a cable or tethered connection between a portable computer and a portable telephone, as illustrated in FIG. 7.

In one embodiment of the invention, the portable telephone serves as the portable computer's modem and function while installed in the computer. Thus, the portable phone facilitates the transmission and reception of data between the portable computer and another computer connected to the telephone system. In another embodiment of the invention, the portable computer (and not the portable telephone), contains the modem that is utilized for telephonic data communications. In yet another embodiment of the invention, a modem may be omitted altogether omitted when telephone 188 is to be used in a completely digital telephone network. An operator of the portable computer/portable telephone also has the option of using the portable telephone for voice transmission independently of the computer, or may enjoy hands free voice operation by using the portable computer's internal speaker and microphone. The portable telephone operates on the computers internal battery/power system while installed in the portable computer and on it's own battery (charged while in the portable computer) when used independently of the portable computer.

DETAILED DESCRIPTION OF PREFERRED EMBODIMENTS

Figure 7:
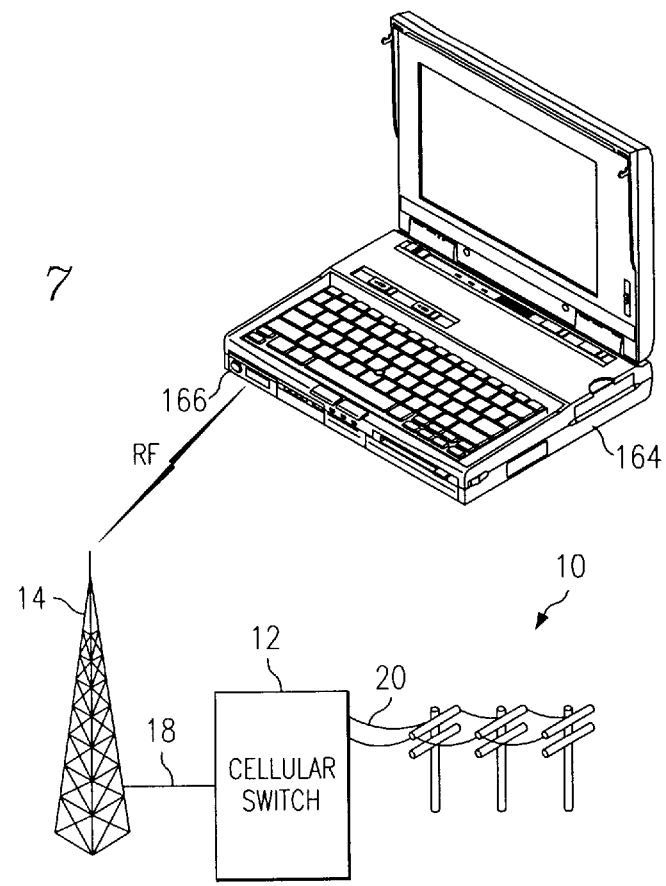
FIG. 7 illustrates a cellular telephone network according to a preferred embodiment of the invention.
Figure 8:
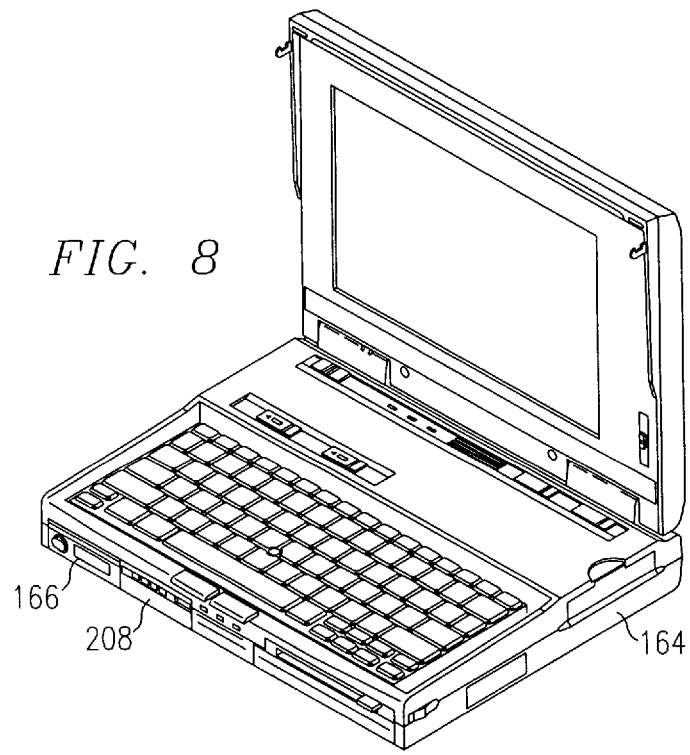
FIG. 8 illustrates a cellular telephone installed within a portable computer.
Figure 9:
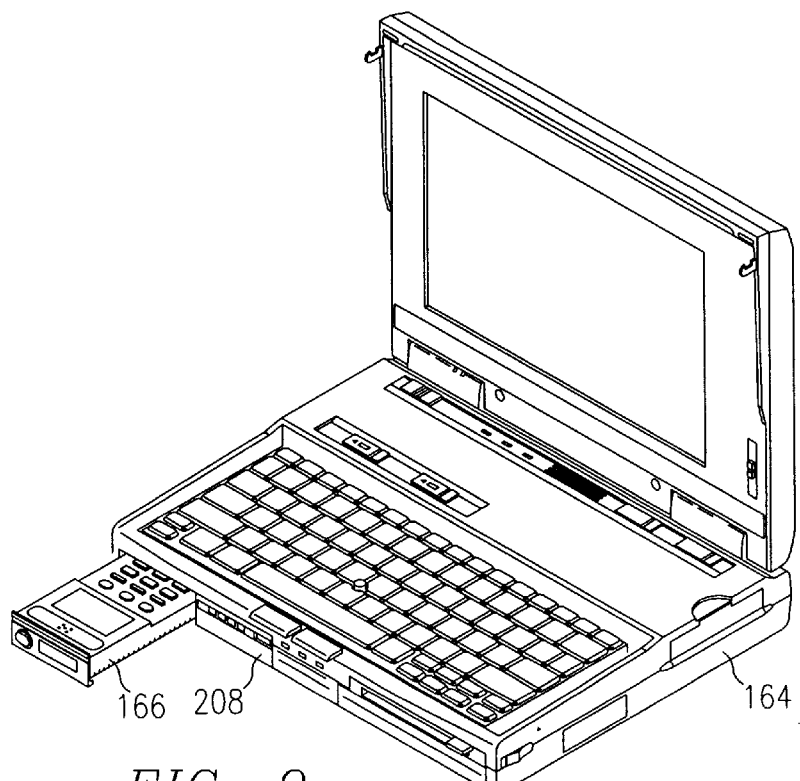
FIG. 9 illustrates a cellular telephone partially removed from a portable computer.
Figure 10:
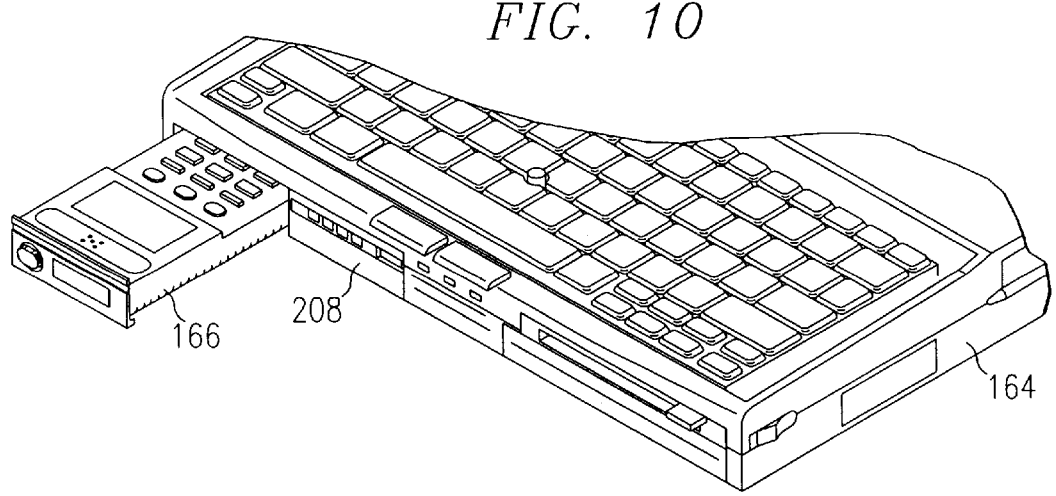
FIG. 10 illustrates an enlarged sectional view of a cellular telephone partially removed from a portable computer.
Figure 11:
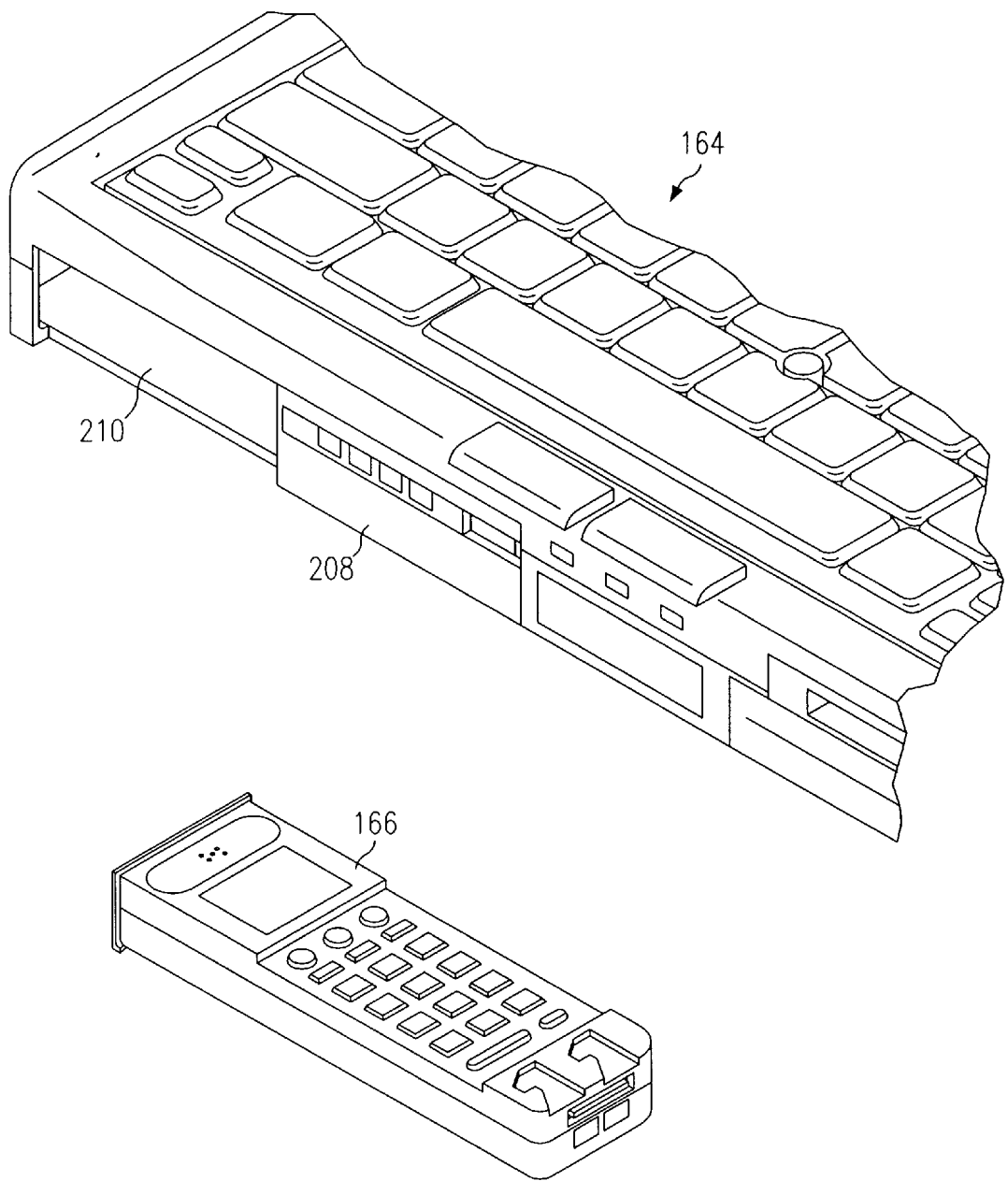
FIG. 11 illustrates the cellular telephone of FIG. 10 completely removed from the portable computer.
Figure 12:
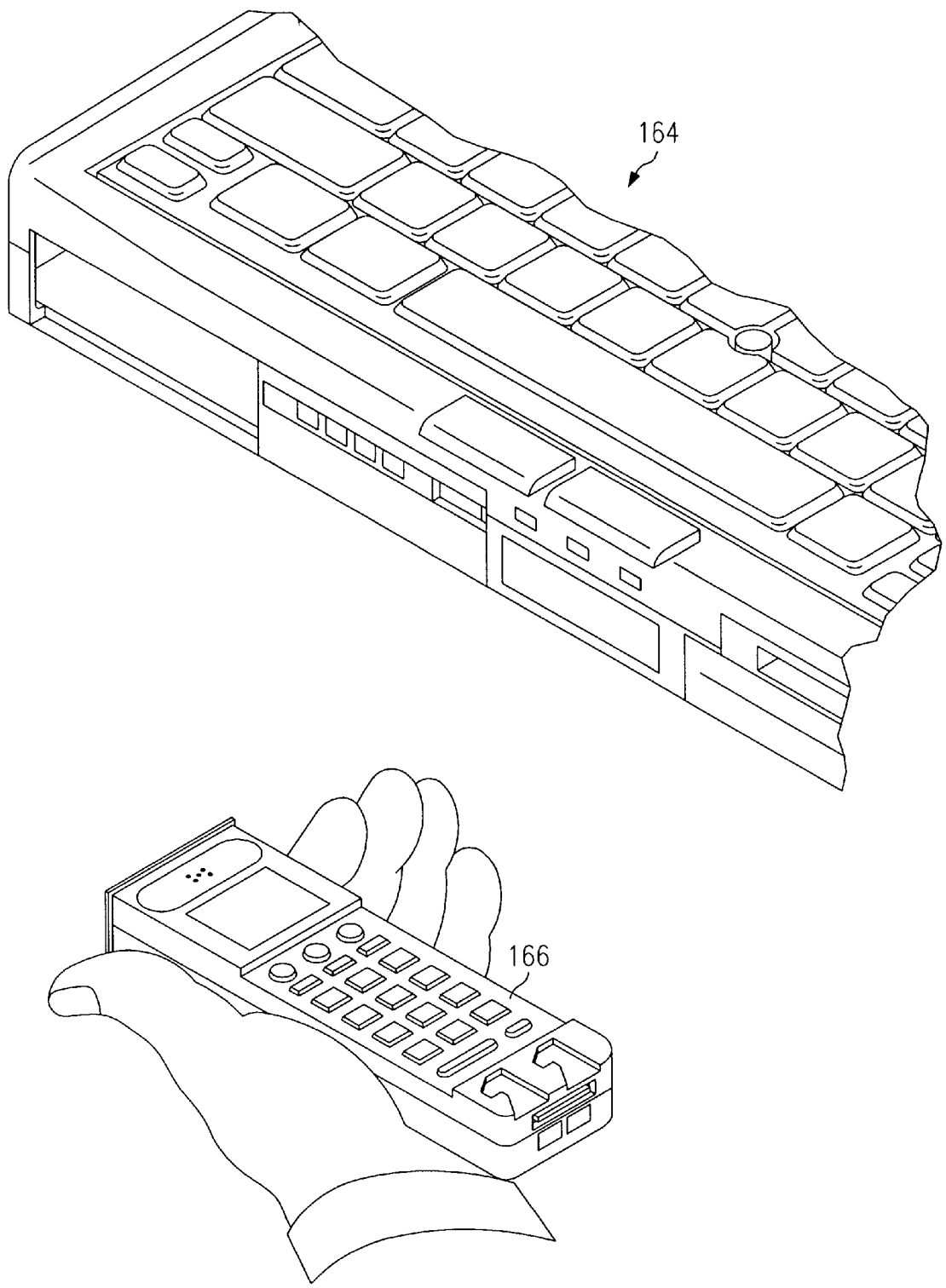
FIG. 12 illustrates the cellular telephone of FIG. 11 in the hand of a user.

FIG. 7 illustrates a portable telephone (cellular in the present case) constructed in such a fashion as to fit within a cavity within a portable computer (in the present case, a cavity that otherwise accepts a battery pack—such as a front loading battery pack for the Texas Instruments TM-5000 portable computer—or other device when not utilized as a portable telephone port). FIG. 8 illustrates an enlarged view of the portable computer/portable telephone combination (A portable telephone and Texas Instrument Inc.'s TM-5000 portable computer), as shown in FIG. 7. FIG. 9 illustrates the portable telephone partially removed from the portable computer. FIG. 10 illustrates an enlarged view of the portable telephone partially removed from the portable computer. FIG. 11 illustrates the portable telephone completely removed from the portable computer. FIG. 12 illustrates the portable telephone in the hand of a user.

Figure 13:
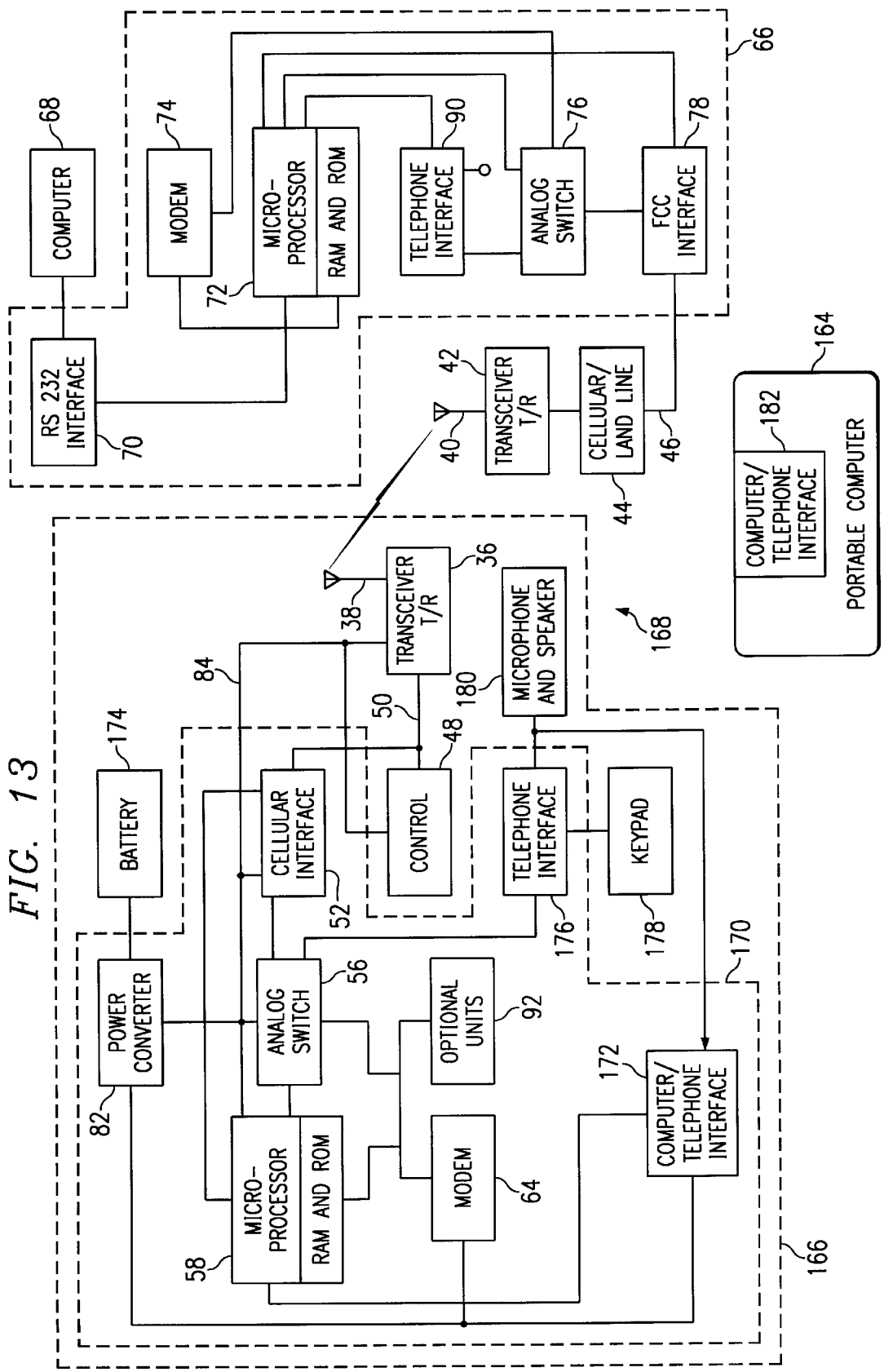
FIG. 13 illustrates a block diagram of a cellular telephone voice/data communication system according to one embodiment of the invention.

One embodiment of the invention for transmitting voice/data over a cellular telephone network is indicated generally at 168 in FIG. 13. The cellular telephone, in this case a compact and self contained portable unit, conventionally includes a transceiver 36 which transmits or receives voice signals in the radio frequency range by means of an antenna 38. Voice signals transmitted by the antenna 38 are received by an antenna 40 connected to a transceiver 42 located in a specific cell area of the cellular telephone network. The transceiver 42 is connected to the cellular land line equipment 44 which is operative to transmit the received signal over conventional telephone lines 46. Voice signals from the telephone lines 46 may also be transmitted by the transceiver 42 and the antenna 40 back to the antenna 38 to and through the transceiver 36 of the cellular telephone unit. The transceiver 36 is controlled by a cellular telephone system control unit 48 which is connected to the transceiver by means of a cellular telephone bus 50.

A cellular interface 52 renders the remainder of the mobile data programming interface 170 compatible with the cellular bus 50. For example, with AMPS compatible cellular telephones, the cellular interface 52 would consist of an eight bit parallel I/O, port party line drivers and receivers, operational amplifiers providing differential driving and receiving analog conversion between the −20 dbV signal on the cellular bus and the defined levels required by an analog switch and condition system 56. Cellular interfaces of this type are known, commercially available items, as exemplified by cellular interfaces sold by Motorola Corporation of Schaumberg, Ill. or Oki of Japan.

The analog switch and conditioning system 56 is implemented using currently known switching technology. The system may incorporate CMOS analog switches operative in response to microprocessor generated control signals to switch the state of signal processing operational amplifiers. Basically, this analog switch and condition system operates to selectively connect various components of the cellular phone to the cellular interface 52. Microprocessor 58 provides control functions for the cellular interface 52 and analog switch and conditioning system 56 as well as for other portions of the cellular phone. Microprocessor 58 may be a conventional 8/16 bit microprocessor, such as the Intel 8088 manufactured by Intel Corporation, or a digital signal processor "DSP", such as the TMS 320C52 manufactured by Texas Instruments Incorporated. The microprocessor includes random access (RAM) memory, read only (ROM) memory, and flash memory storage systems which contain the control and data error programs necessary to adapt computer data for cellular telephone transmission.

A serial data stream is provided to the microprocessor 58 from an external portable computer 164 by means of a computer/portable telephone interface 172, to be described later in more detail, included within cellular telephone 166, according to a preferred embodiment of the invention. Data received by the microprocessor from the portable computer 164 is provided with unique error correction signal information.

The modem 64 may be one of a number of conventional modems used for telephone wire line transmission which has test mode capabilities for deactivating certain modem functions. A particular commercially available modem suitable of use as the modem 64 is the AMI 3530 modem manufactured by Gould Advanced Semiconductors of 3800 Hemstead Road, Santa Clara, Calif. Modems of this type, when employed for data transmission over conventional telephone lines, will disconnect immediately in response to a carrier loss. When such modems sense a channel blanked status occasioned by a carrier loss, they provide a "break bit" output and disconnect. Also, for normal use such modems include a scrambler system which assures that the data modulated signal is continuously changing, and this signal change is used by the modem PLL circuitry to provide synchronization. A non-scrambled modulated signal may be interpreted by the telephone operating equipment as a valid switch command, and this is particularly true when the modem is in the static condition. Normally this scrambler system in the modem prevents this tactic condition where loss of synchronization by the PLL or the interpretation of the static signal as a switch command is most likely to occur. However, modems such as the AMI 3530 incorporate a test mode of operation wherein the modem is prevented from disconnecting in response to carrier loss and wherein the modem scrambler can be deactivated or defeated. Normally, such modems would be incapable of effective operation in this test mode, but it is the availability of this test mode that renders modems of this type suitable for use as the modem 64.

The data stream from the microprocessor 58, including error correction data from the microprocessor, is transmitted by the modem 64 through the analog switch 56 and cellular interface 52 to the transceiver 36. This data is then transmitted as a radio frequency signal by the antenna 38 to the antenna 40, where it is converted by the transceiver 42 and cellular land line equipment 44 to a signal suitable for transmission over conventional telephone lines 46. These telephone lines connect the signal to the second portion of the cellular transmission system of the present invention which is a static data programming interface 66 operative to pass data signals to and from the telephone line 46. The data signals which are passed to the telephone line originate at a host computer 68.

For transmission purposes, the computer 68 provides data to an RS 232 interface 70 which in turn provides the data to a microprocessor 72. This microprocessor preferably is identical in construction and function the microprocessor 58, and is programmed with the same control and error correction and other programming. The microprocessor 72 adds error correction and control signal to the data provided from the RS 232 interface, and then provides the modified data stream to a modem 74. The modem 74 preferably is identical in construction and function to the modem 64, and operates to transmit the data stream by means of an analog switch and conditioning system 76 to a conventional FCC interface 78. The FCC interface provides the data stream to the telephone lines 46 where they are sent by means of the cellular land line equipment 44 to the transceiver 42. The data is then transmitted to the transceiver 36 which provides it by means of the cellular interface 52 and the analog switch 56 to the microprocessor 58. The microprocessor then removes the error correction and control signals from the data stream and provides the data through the coupled computer/portable telephone interfaces 172 and 182 for display and use by portable computer 164.

The static data programming interface 66 receives data transmitted over the cellular telephone line, and this incoming data from the FCC interface 78 is fed by means of the analog switch 76 to the microprocessor 72. Here the error and control signals are removed from the data and the data is then displayed and/or used by the computer 68. It will be noted that the static data programming interface 66 and the mobile data programming interface 170 are similar in structure and operation with the exceptions that the static data programming interface is connected to a computer via a cable through an RS 232 interface while the mobile data programming interface utilizes a direct electrical connection to couple it to the portable computer. Additional differences are that the static data programming interface is connected to telephone lines by an FCC interface while the mobile data programming interface is connected to a cellular telephone system by a cellular interface. The portable telephone 166 may be powered from a battery 174 (and/or a battery substitute-power supply) which operates through a conventional power converter 82 to provide power to a power bus 84. This power bus 84 is connected to provide power to all of the operating units in the cellular telephone 166. The static programming interface 66 includes a similar power bus, not shown, which is connected to any conventional power supply such as the power supply in a building containing the computer 68.

Although the mobile data programming interface 170 and the static data programming interface 66 must communicate with one another to effectively transmit data over a cellular telephone system, both of these units can also transmit and receive conventional cellular telephone audio transmissions. The mobile data programming interface 170 includes a telephone interface 176 connected to a keypad 178 and a microphone and speaker 180, which operate in a conventional manner through the analog switch and conditioning system 56 and cellular interface 52 to transmit and receive audio communications by means of the transceiver 36. In a similar manner, the static data programming interface 66 includes a telephone interface 90 which may be connected to an external telephone to transmit and receive audio signals through the telephone interface, the analog switch 76 and the FCC interface 78. Thus, both the mobile data programming interface 166 and the static data programming interface 66 are adapted for normal audio communication. Like the mobile data programming interface, the static data programming interface includes a control and display section (not shown) which is connected to the microprocessor 72 and which operates to receive data from which the microprocessor has extracted the control and error signals.

Both the mobile data programming interface 170 and the static data programming interface 66 will operate with optional equipment, and an optional equipment block 92 is shown for the mobile data programming interface in FIG. 13. This optional equipment might include other modems and various memory and encrypting devices known to the art to accomplish automatic dialing and other similar functions.

Computer/portable telephone interface 172 replaces the RS 232 interface 62 (may also supplement the RS 232 interface is specific situations) in the mobile data programming interface 54 of FIG. 3, and cellular telephone 166 is a self-contained and compact unit (versus the multi-component unit of FIG. 3) having a keypad 178 and microphone and speaker 180 (instead of the cellular phone 88 of FIG. 3) connected to telephone interface 176.

Figure 14:
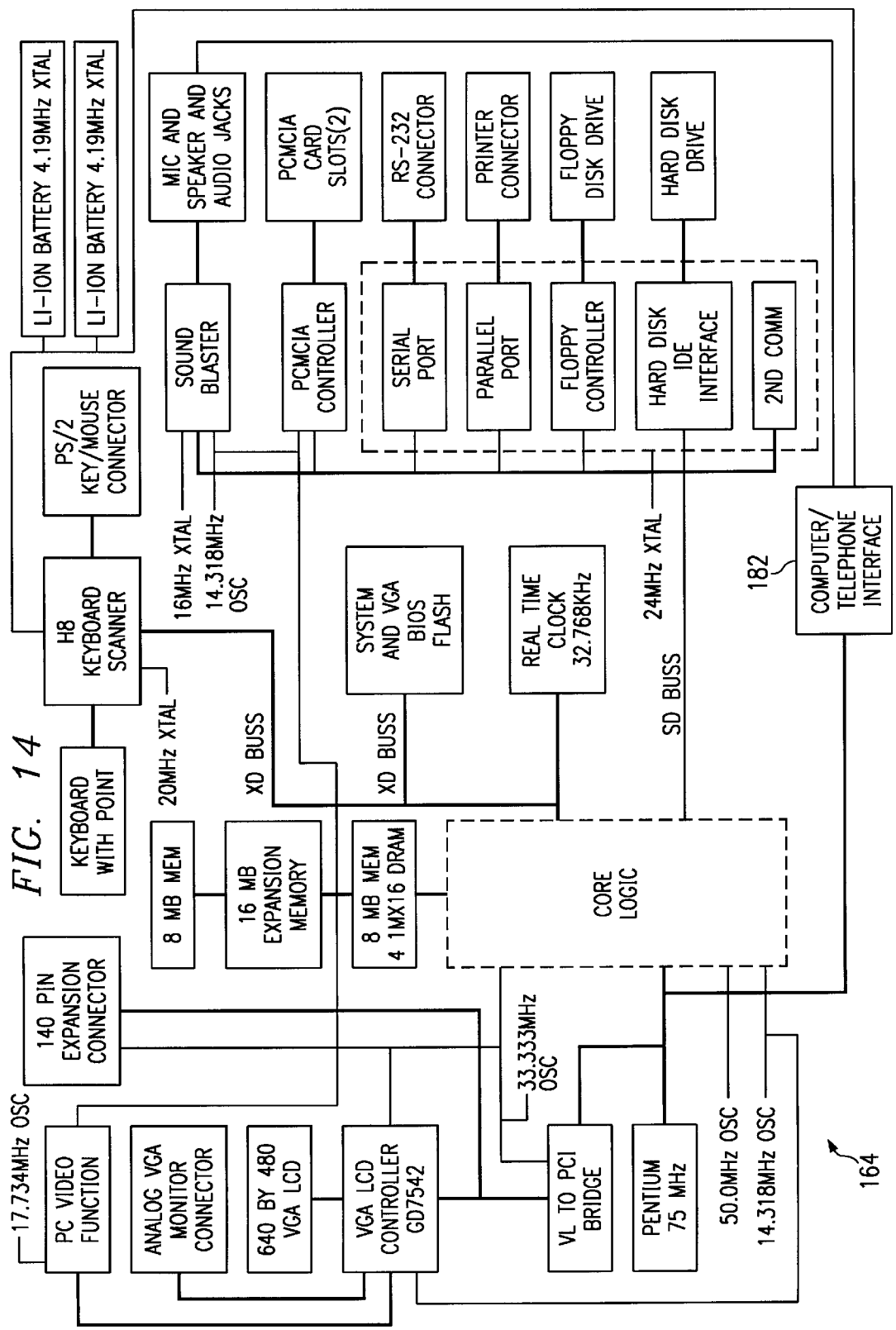
FIG. 14 illustrates a block diagram of a portable computer according to one embodiment of the invention.

FIG. 14 is a block diagram of one embodiment of portable computer 164. Portable computer 164 is a color portable notebook computer based upon the Intel Pentium microprocessor. Operating speed of the Pentium is 75 Mhz internal to the processor but with a 50 Mhz external bus speed. A 50 Mhz oscillator is supplied to the ACC Microelectronics 2056 core logic chip which in turn uses this to supply the microprocessor. This 50 Mhz CPU clock is multiplied by a phase locked loop internal to the processor to achieve the 75 Mhz CPU speed. The management features of the present invention may cause the CPU clock to stop periodically to conserve power consumption which reduces CPU temperature. The processor contains 16 KB of internal cache and 256 KB of external cache on the logic board.

The 50 Mhz bus of the CPU is connected to a VL to PCI bridge chip from ACC microelectronics to generate the PCI bus. The bridge chip takes a 33.333 Mhz oscillator to make the PCI bus clock. The Cirrus Logic GD7542 video controller is driven from this bus and this bus has an external connector for future docking options. The GD542 video controller has a 14.318 Mhz oscillator input which it uses internally to synthesize the higher video frequencies necessary to drive an internal 10.4" TFT panel or external CRT monitors. When running in VGA resolution modes the TFT panel may be operated at the same time as the external analog monitor. For Super VGA resolutions only the external CRT may be used.

Operation input to portable computer 164 is made through the keyboard. An internal pointing device is imbedded in the keyboard. External connections are provided for a parallel device, a serial device, a PS/2 mouse or keyboard, a VGA monitor, and the expansion bus. Internal connections are made for a Hard Disk Drive, a Floppy Disk Drive, and additional memory. Portable computer 164 contains 8 Megabytes of standard memory which may be increased by the user up to 32 Megabytes by installing optional expansion memory boards. The first memory expansion board can be obtained with either 8 or 16 Megabytes of memory. With the first expansion board installed another 8 Megabytes of memory may be attaches to this board to make the maximum amount. The two batteries of portable computer 164 are Lithium Ion and have internal controllers which monitor the capacity of the battery. These controllers use a 4.19 Mhz crystal internal to the battery.

Figure 174:
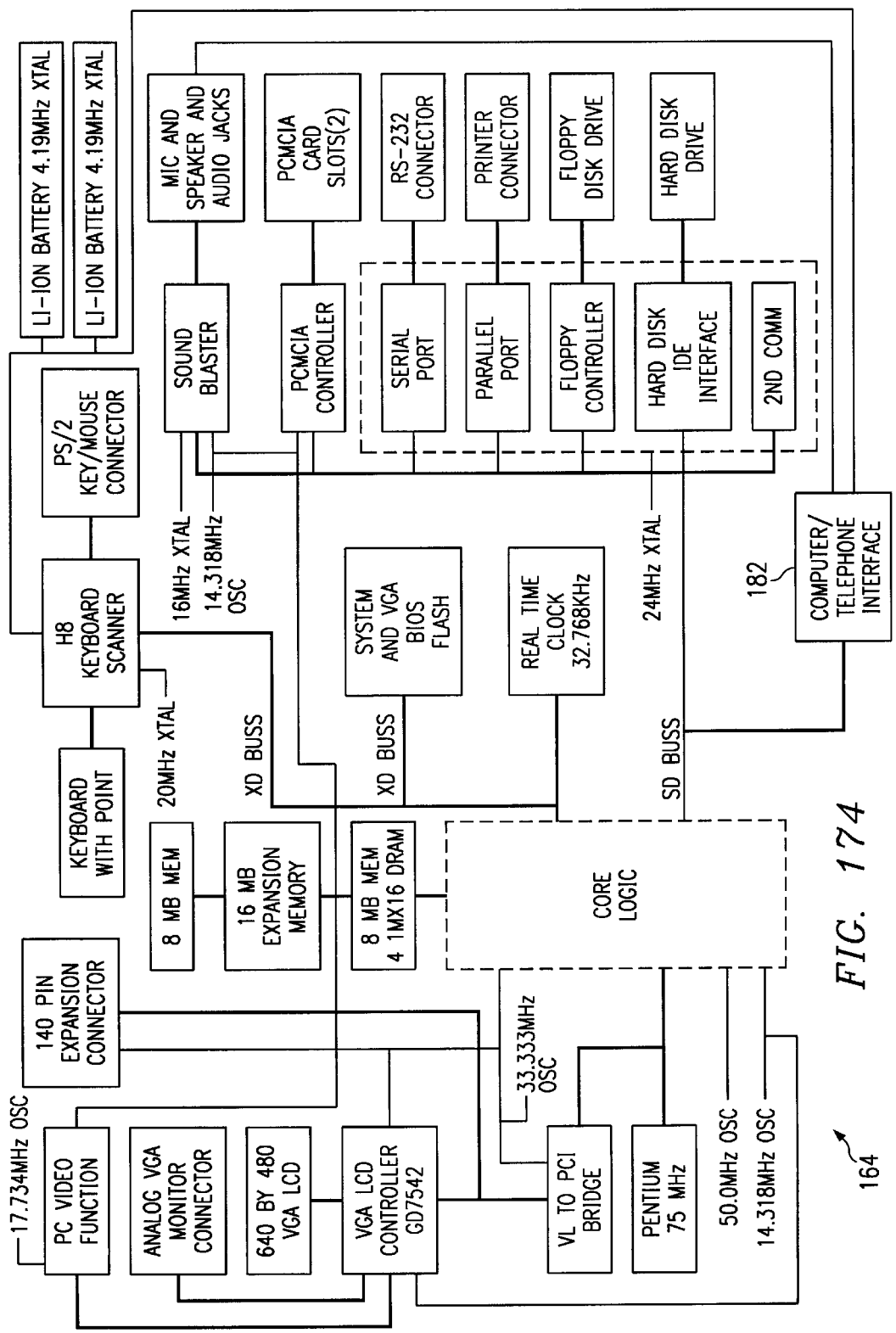
FIG. 174 illustrates a block diagram of a portable computer according to another embodiment of the invention.
Figure 175:
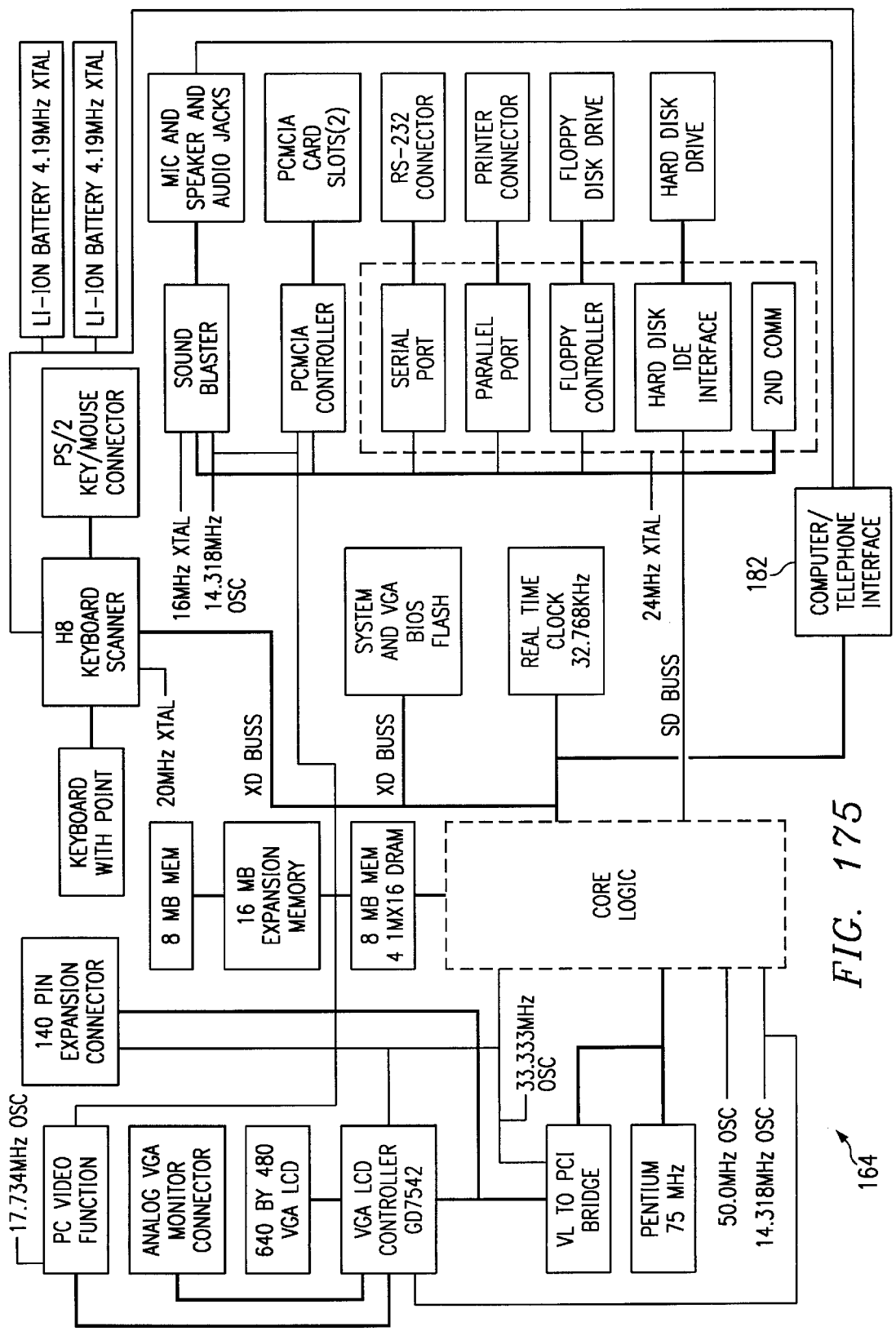
FIG. 175 illustrates a block diagram of a portable computer according to yet another embodiment of the invention.

Portable computer 164 has two slots for PCMCIA cards. These slots may be used with third party boards to provide various expansion options. Portable computer 164 also has an internal sound chip set which can be used to generate or record music and/or sound effects. An internal speaker and microphone built into the notebook. In addition, three audio jacks are provide for external microphones, audio input, and audio output. Block diagrams of other embodiments of portable computer 164 are illustrated in FIGS. 174 and 175.

Figure 15:
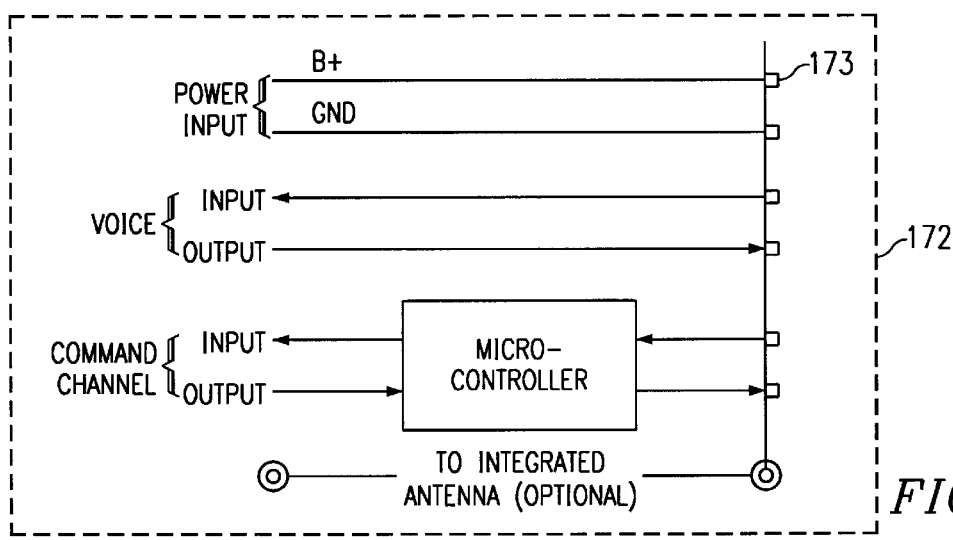
FIGS. 15–166 illustrate various embodiments of computer/portable telephone interfaces for the portable telephone and portable computer of FIG. 13.
Figure 16:
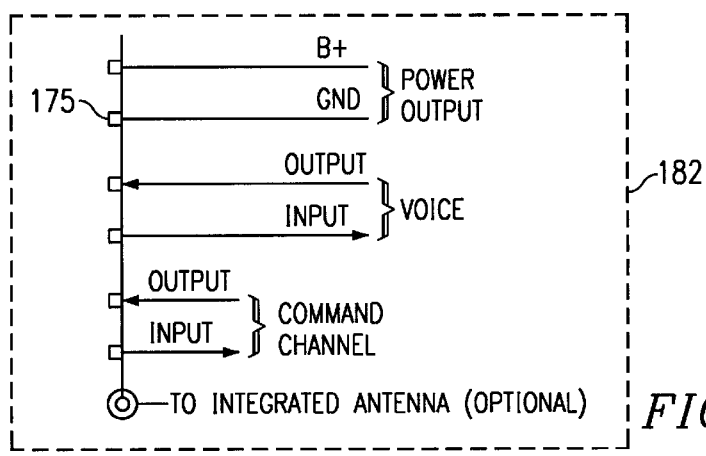
Figure 17:
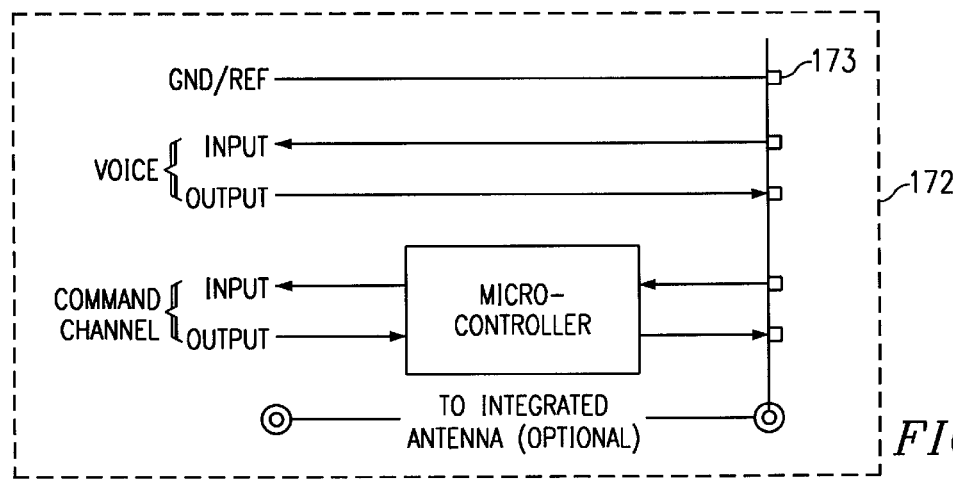
Figure 18:
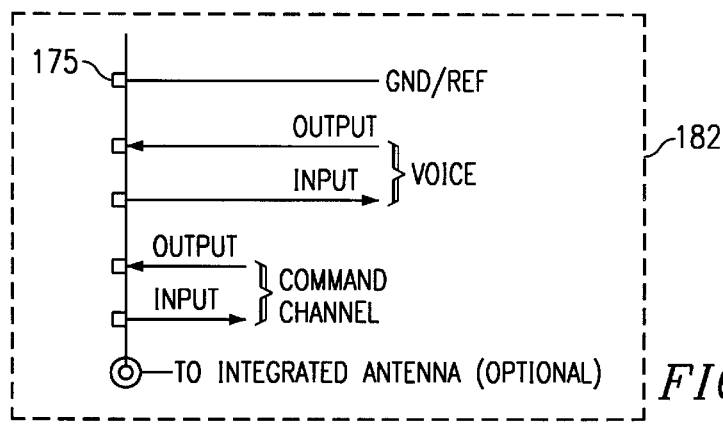

In the embodiment of the invention illustrated in FIG. 15, computer/portable telephone interface 172 comprises: power leads for charging the portable telephone's battery(s) while connected to the computer; two signal lines (voice input and output) for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 16. In the embodiment of the invention illustrated in FIG. 17, computer/portable interface 172 comprises: a ground/reference signal line; two signal lines (voice input and output) for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 18.

Figure 19:
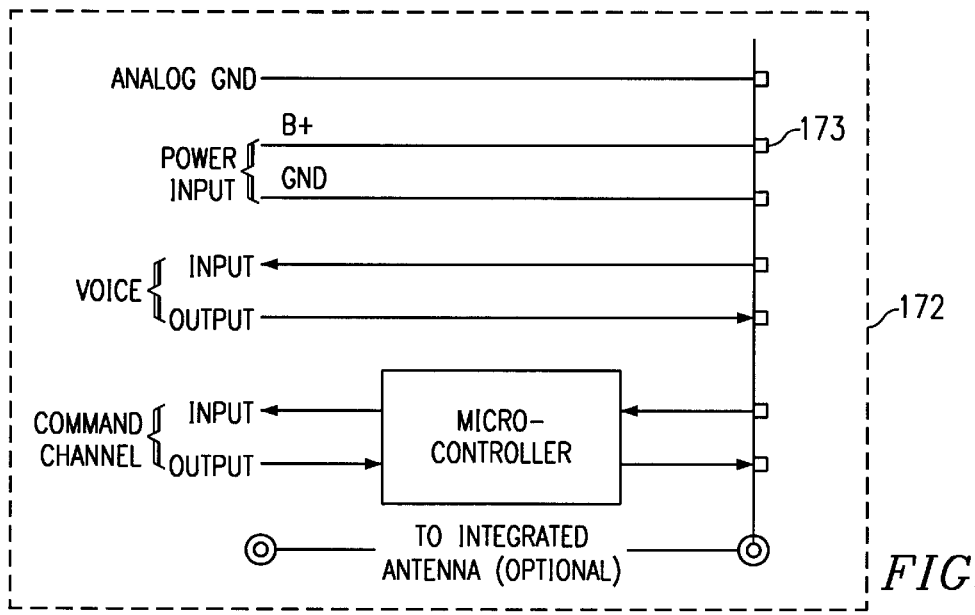
Figure 20:
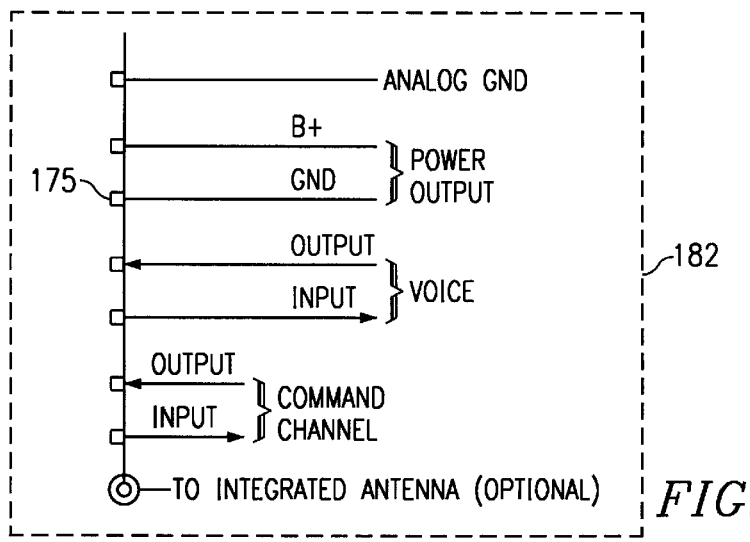
Figure 21:
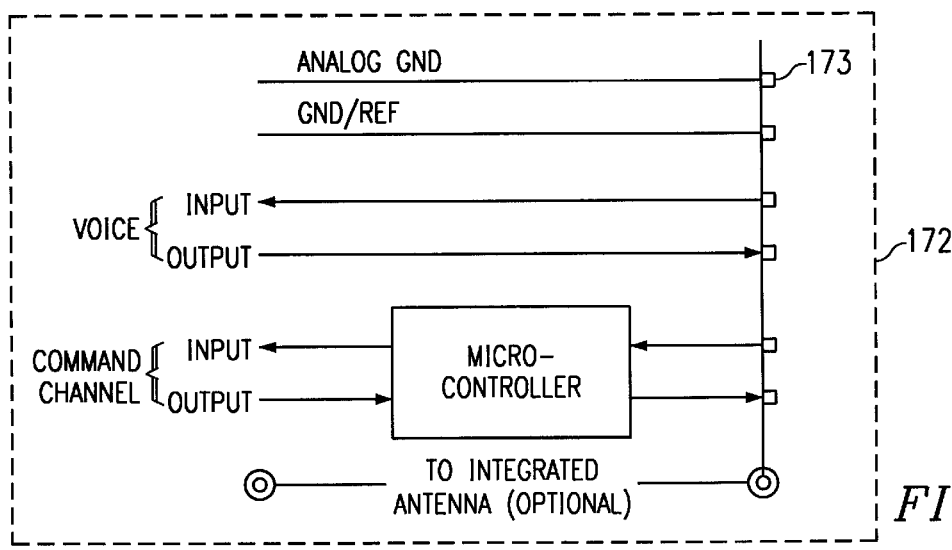
Figure 22:
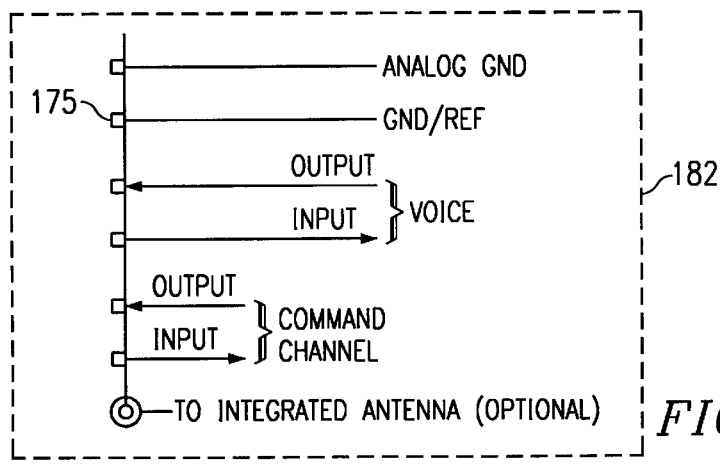

In the embodiment of the invention illustrated in FIG. 19, computer/portable telephone interface 172 comprises: an analog ground lead line; power leads for charging the portable telephone's battery(s) while connected to the computer; two signal lines (voice input and output) for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 20. In the embodiment of the invention illustrated in FIG. 21, computer/portable interface 172 comprises: an analog ground lead line; a ground/reference signal line; two signal lines (voice input and output) for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 22. Power leads are not necessary in embodiments of the invention where computer charging of the portable telephone's battery(s) is not desired.

Figure 23:
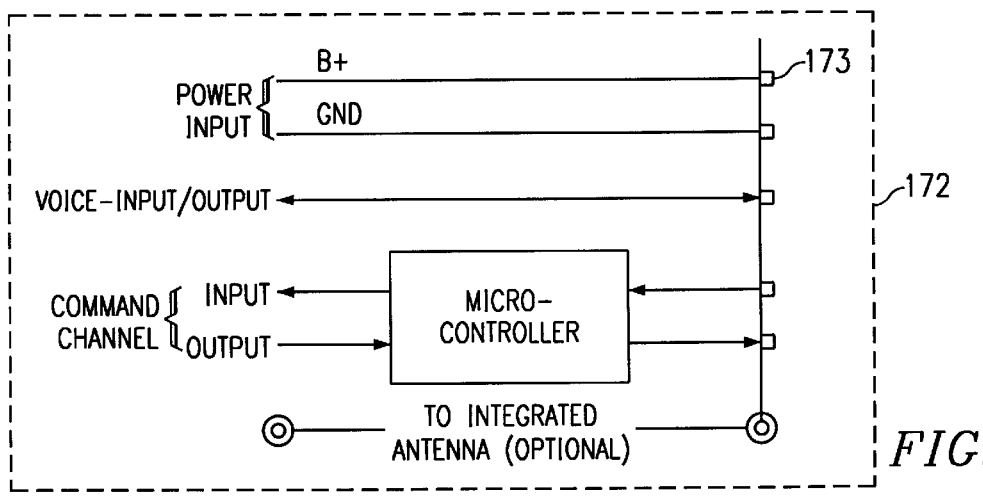
Figure 24:
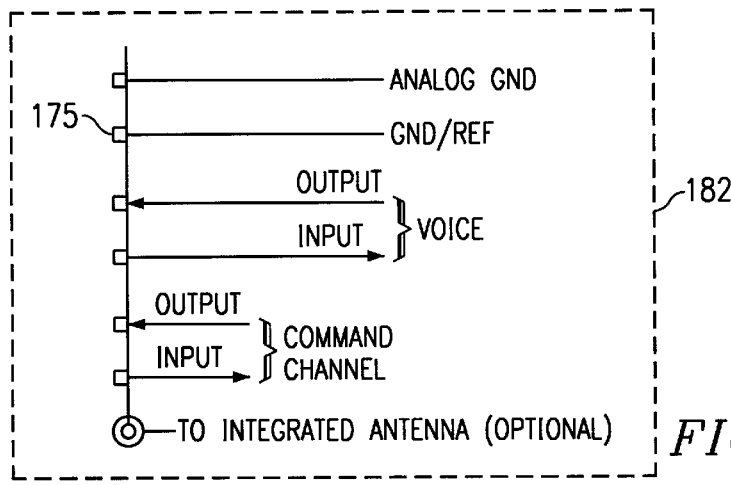
Figure 25:
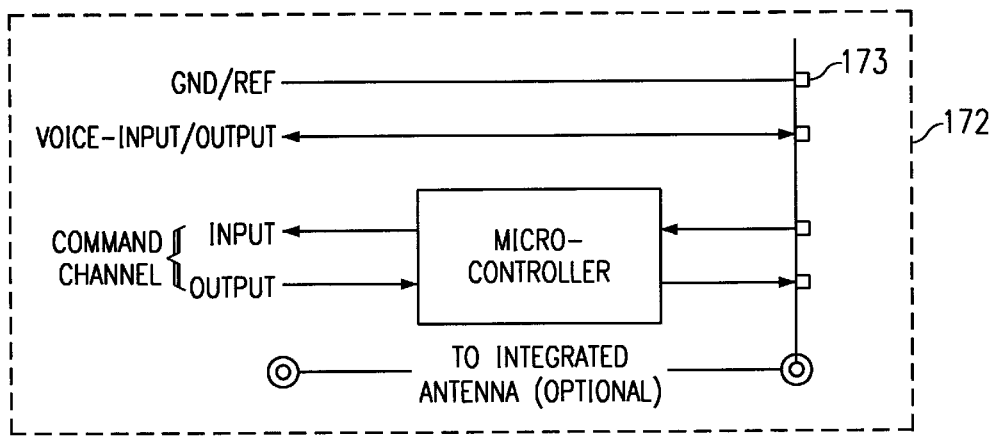
Figure 26:
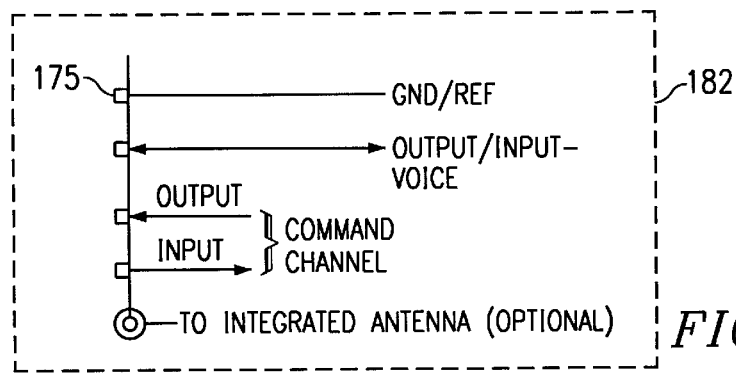

In the embodiment of the invention illustrated in FIG. 23, computer/portable interface 172 comprises: power leads for charging the portable telephone's battery(s) while connected to the computer; one signal line (voice input and output) for operating in a bidirectional half duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 24. In the embodiment of the invention illustrated in FIG. 25, computer/portable interface 172 comprises: a ground/reference signal line; one signal line (voice input and output) for operating in a bidirectional half duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 26. Power leads are not necessary in embodiments of the invention where computer charging of the portable telephone's battery(s) is not desired.

Figure 27:
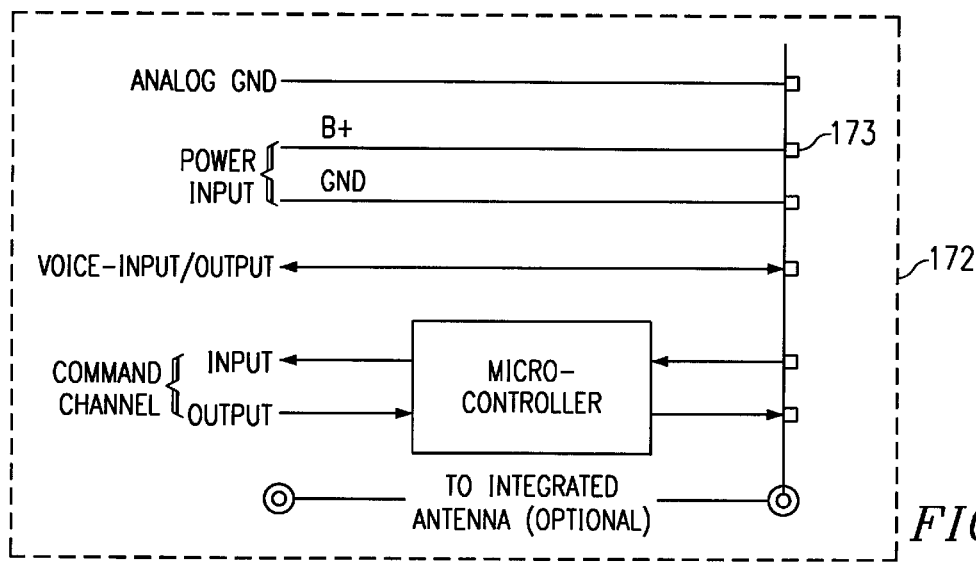
Figure 28:
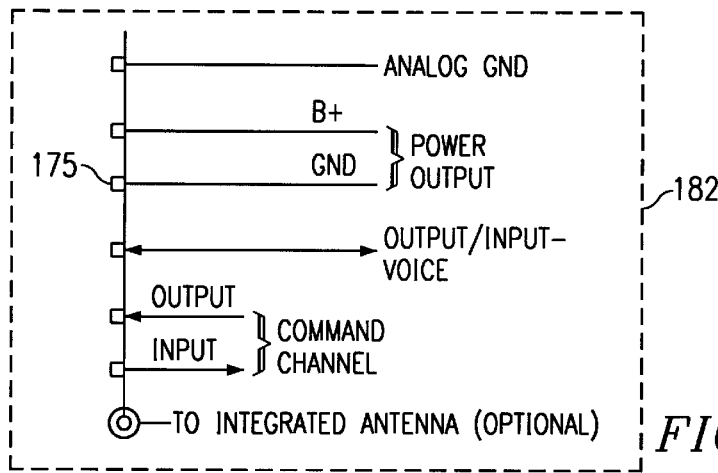
Figure 29:
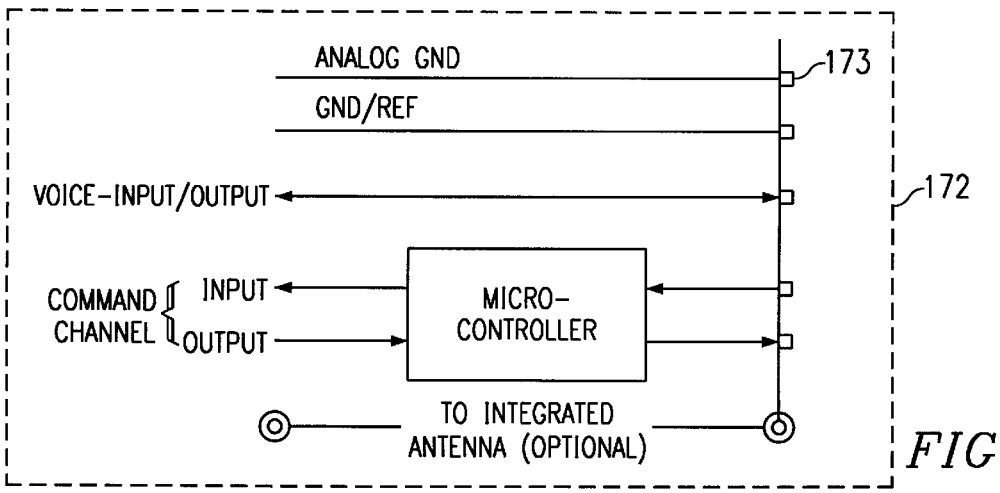
Figure 30:
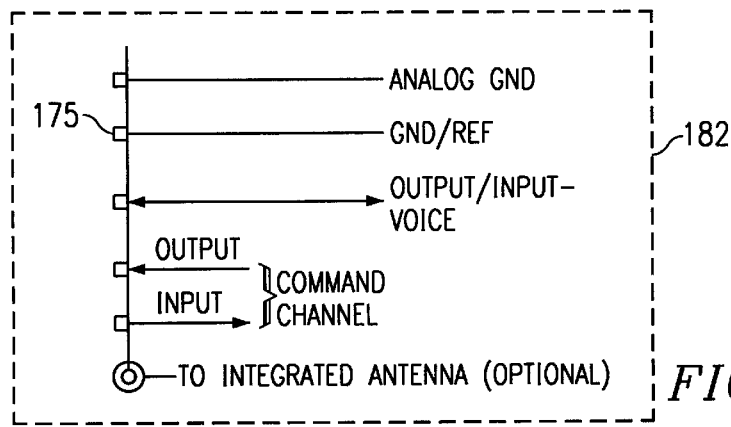

In the embodiment of the invention illustrated in FIG. 27, computer/portable telephone interface 172 comprises: an analog ground lead line; power leads for charging the portable telephone's battery(s) while connected to the computer; one signal line (voice input and output) for operating in a bidirectional half duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 28. In the embodiment of the invention illustrated in FIG. 29, computer/portable interface 172 comprises: an analog ground lead line; a ground/reference signal line; two signal lines (voice input and output) for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 30. Power leads are not necessary in embodiments of the invention where computer charging of the portable telephone's battery(s) is not desired.

Figure 31:
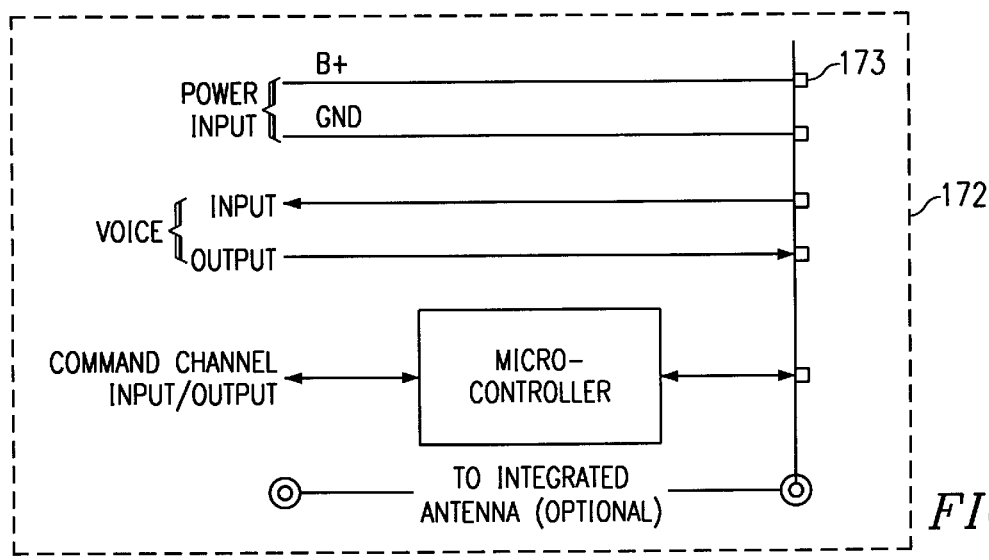
Figure 32:
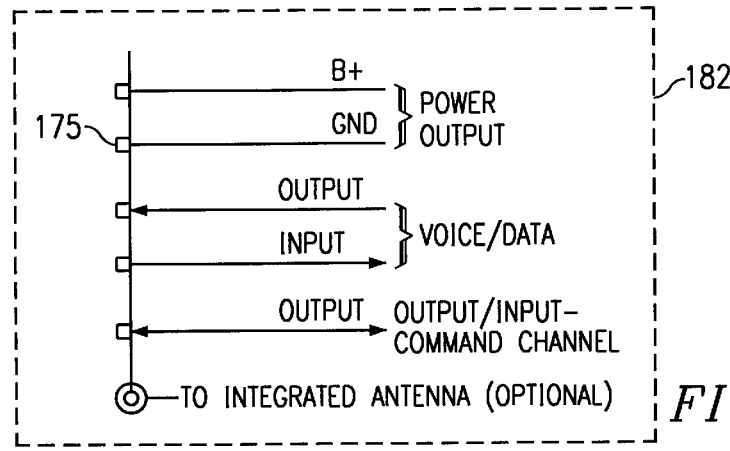
Figure 33:
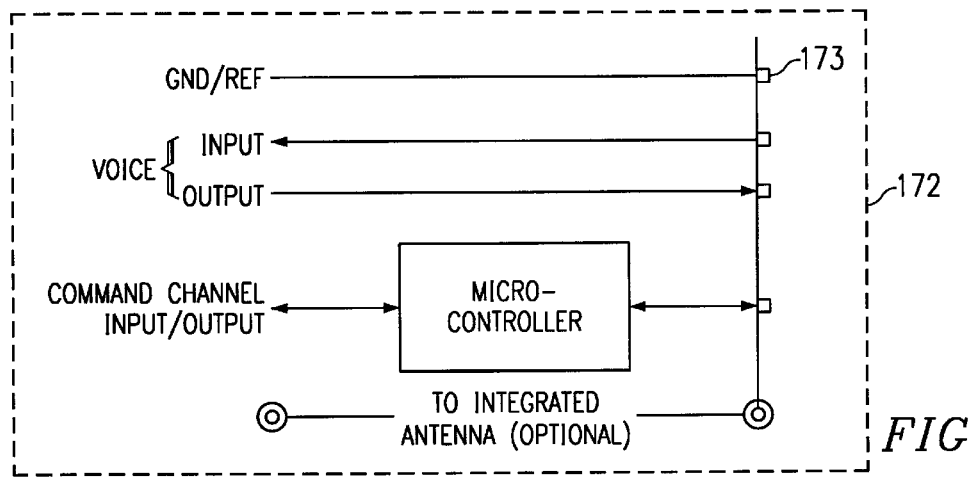
Figure 34:
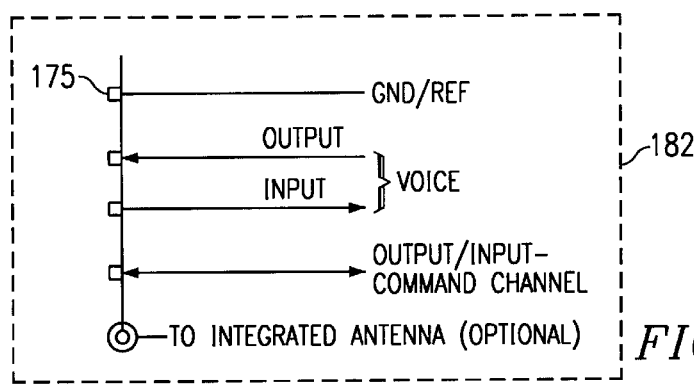

In the embodiment of the invention, illustrated in FIG. 31, computer/portable telephone interface 172 comprises: power leads for charging the portable telephone's battery(s) while connected to the computer; two signal lines (voice input and output) for full duplex mode; a microcontroller having one input/output command channel lead line for operating in a bidirectional half duplex mode; a signal line (optional) for coupling to an antenna integrated in the computer; and electrical contacts for coupling the leads to corresponding electrical contacts and leads in computer/portable telephone interface 182 in portable computer 164, as illustrated in FIG. 32. In the embodiment of the invention illustrated in FIG. 33, computer/portable interface 172 comprises: a ground/reference signal line; two signal lines (voice input and output) for full duplex mode; a microcontroller having one input/output command channel lead line for operating in a bidirectional half duplex mode; a signal line (optional) for coupling to an antenna integrated in the computer; and electrical contacts for coupling the leads to corresponding electrical contacts and leads in computer/portable telephone interface 182 in portable computer 164, as illustrated in FIG. 34. Power leads are not necessary in embodiments of the invention where computer charging of the portable telephone's battery(s) is not desired.

Figure 35:
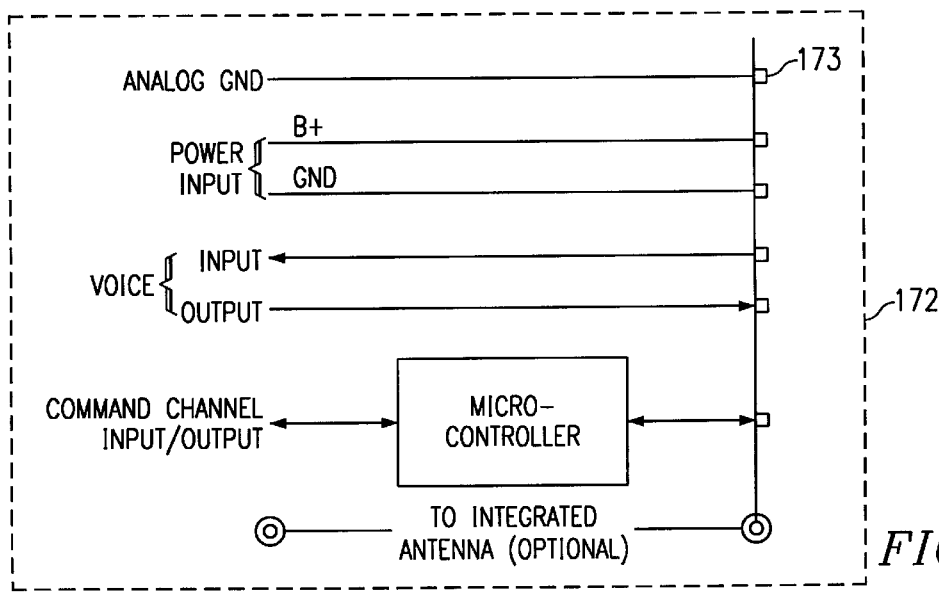
Figure 36:
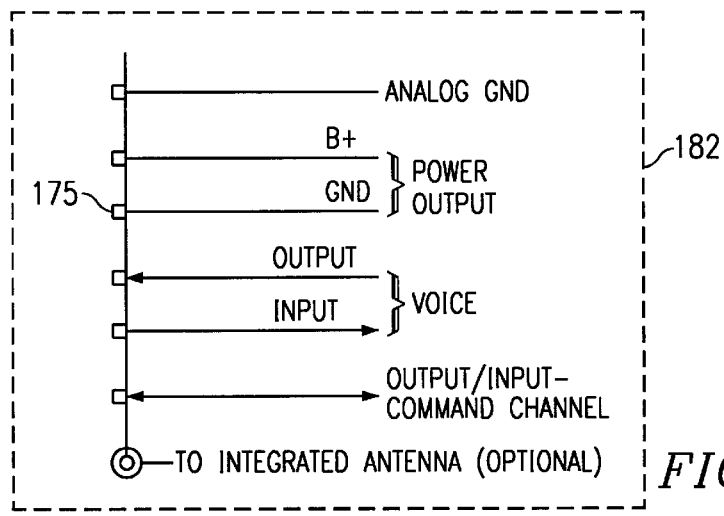
Figure 37:
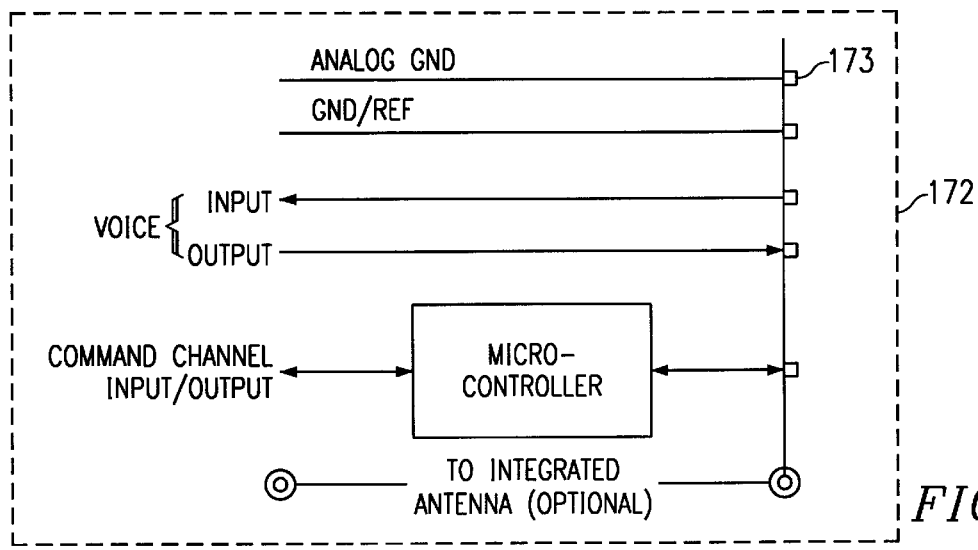
Figure 38:
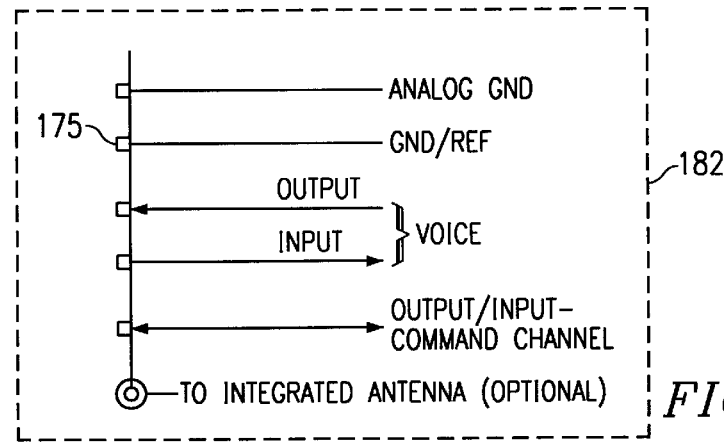

In the embodiment of the invention illustrated in FIG. 35, computer/portable telephone interface 172 comprises: an analog ground lead line; power leads for charging the portable telephone's battery(s) while connected to the computer; two signal lines (voice input and output) for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 36. In the embodiment of the invention illustrated in FIG. 37, computer/portable interface 172 comprises: an analog ground lead line; a ground/reference signal line; two signal lines (voice input and output) for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 38.

Figure 39:
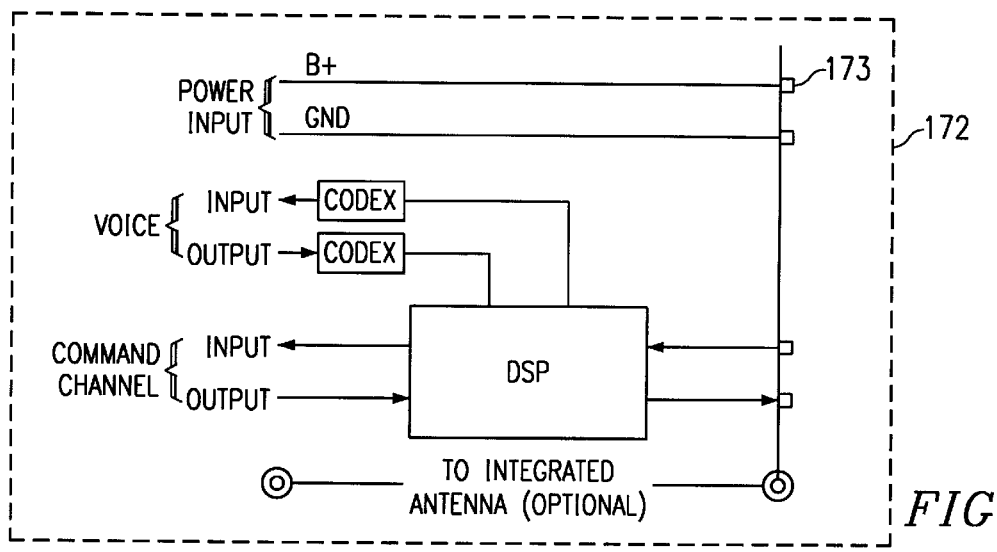
Figure 40:
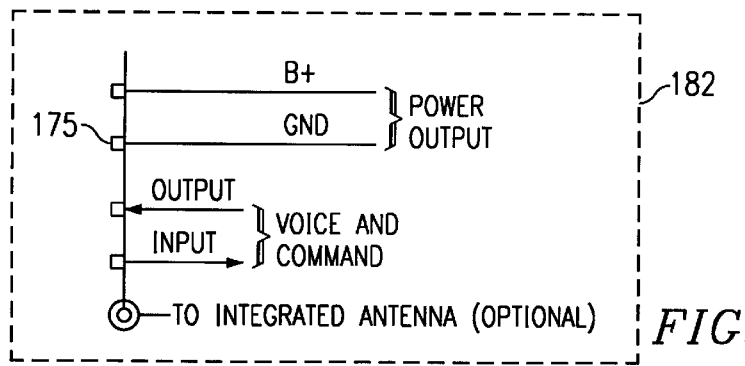
Figure 41:
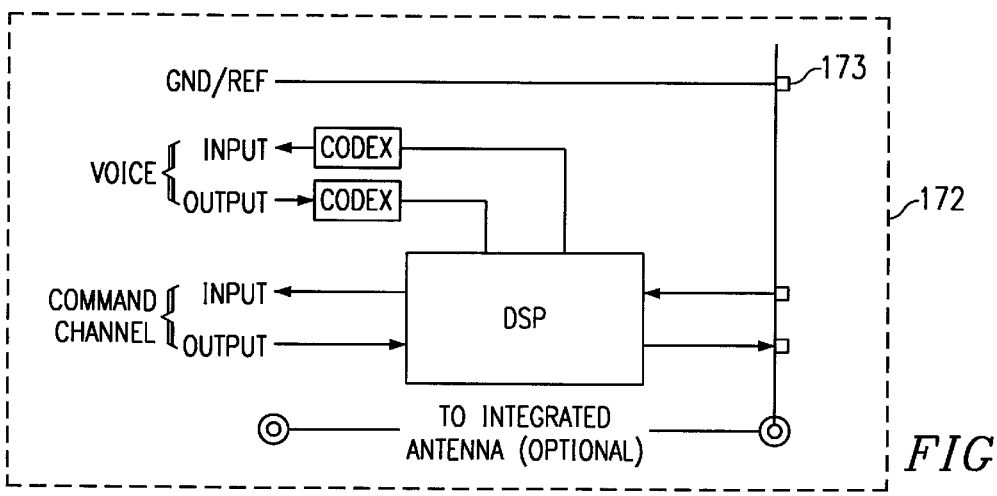
Figure 42:
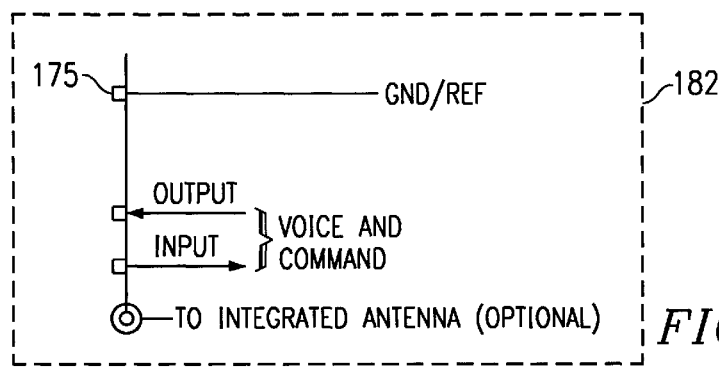

In the embodiment of the invention illustrated in FIG. 39, computer/portable telephone interface 172 comprises: power leads for charging the portable telephone's battery(s) while connected to the computer; two codex circuits for coupling two signal lines (voice input and output) to a digital signal processor (DSP); input and output command channel leads; a signal line (optional) for coupling to an antenna integrated in the computer; and electrical contacts for coupling the power leads and at least two input/output leads coupled to the DSP, to corresponding electrical contacts and leads in computer/portable telephone interface 182 in portable computer 164, as illustrated in FIG. 40. In the embodiment of the invention illustrated in FIG. 41, computer/portable interface 172 comprises: a ground/reference signal line; two codex circuits for coupling two signal lines (voice input and output) to a digital signal processor (DSP); input and output command channel leads; a signal line (optional) for coupling to an antenna integrated in the computer; and electrical contacts for coupling the power leads and at least two input/output leads coupled to the DSP, to corresponding electrical contacts and leads in computer/portable telephone interface 182 in portable computer 164, as illustrated in FIG. 42.

Figure 43:
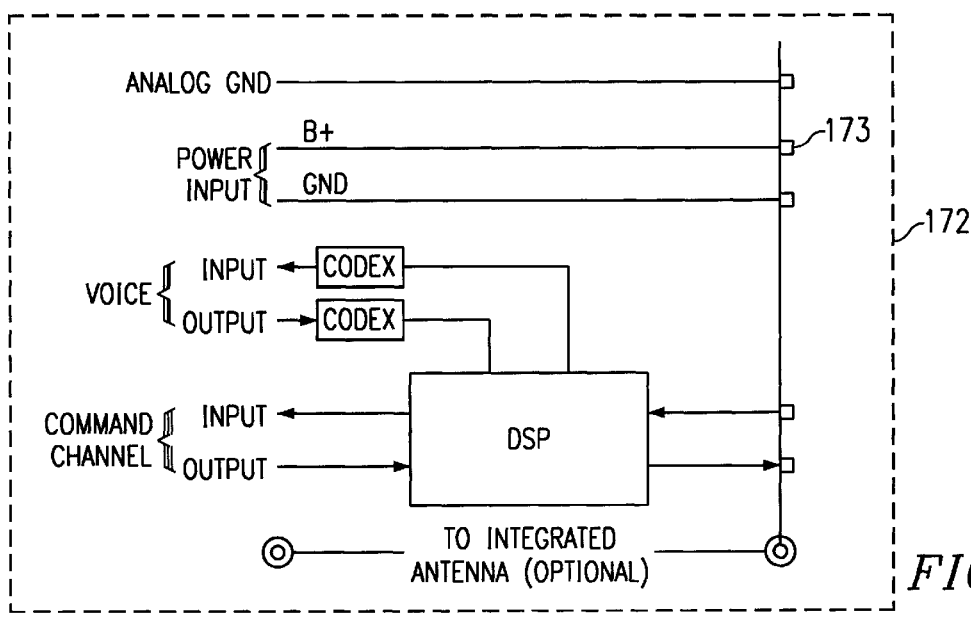
Figure 44:
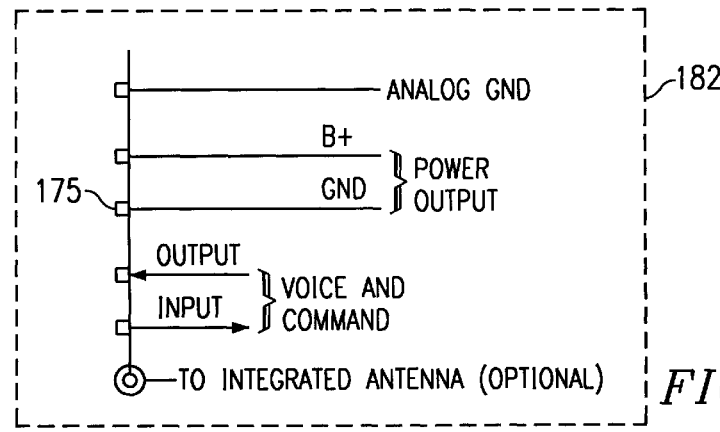
Figure 45:
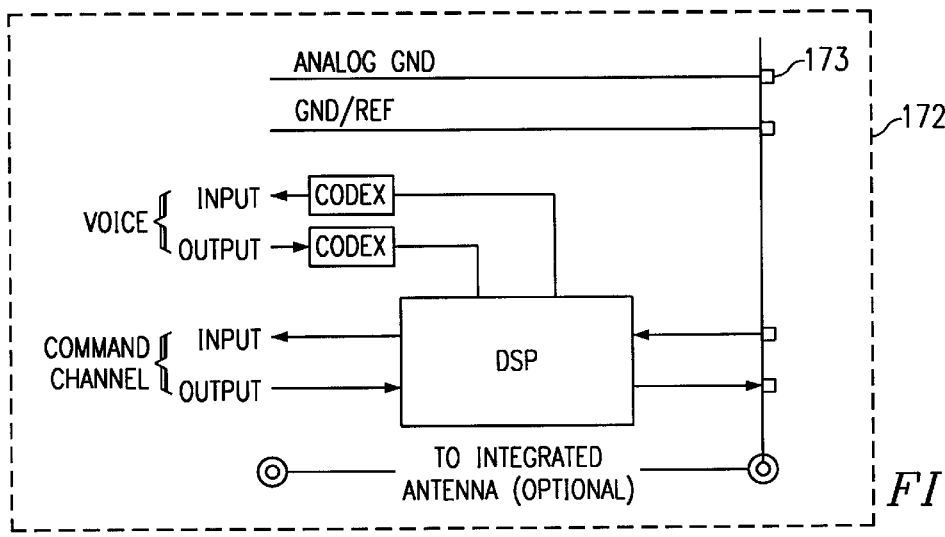
Figure 46:
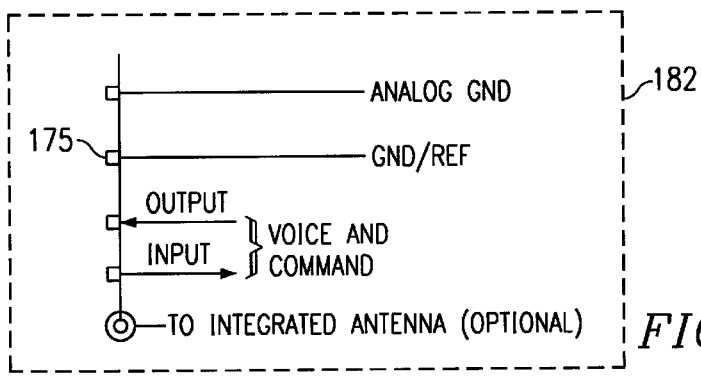

In the embodiment of the invention illustrated in FIG. 43, computer/portable telephone interface 172 comprises: an analog ground lead line; two codex circuits for coupling two signal lines (voice input and output) to a digital signal processor (DSP); input and output command channel leads; a signal line (optional) for coupling to an antenna integrated in the computer; and electrical contacts for coupling the power leads and at least two input/output leads coupled to the DSP, to corresponding electrical contacts and leads in computer/portable telephone interface 182 in portable computer 164, as illustrated in FIG. 44. In the embodiment of the invention illustrated in FIG. 45, computer/portable interface 172 comprises: an analog ground lead line; a ground/reference signal line; two codex circuits for coupling two signal lines (voice input and output) to a digital signal processor (DSP); input and output command channel leads; a signal line (optional) for coupling to an antenna integrated in the computer; and electrical contacts for coupling the power leads and at least two input/output leads coupled to the DSP, to corresponding electrical contacts and leads in computer/portable telephone interface 182 in portable computer 164, as illustrated in FIG. 46. Power leads are not necessary in embodiments of the invention where computer charging of the portable telephone's battery(s) is not desired.

Figure 47:
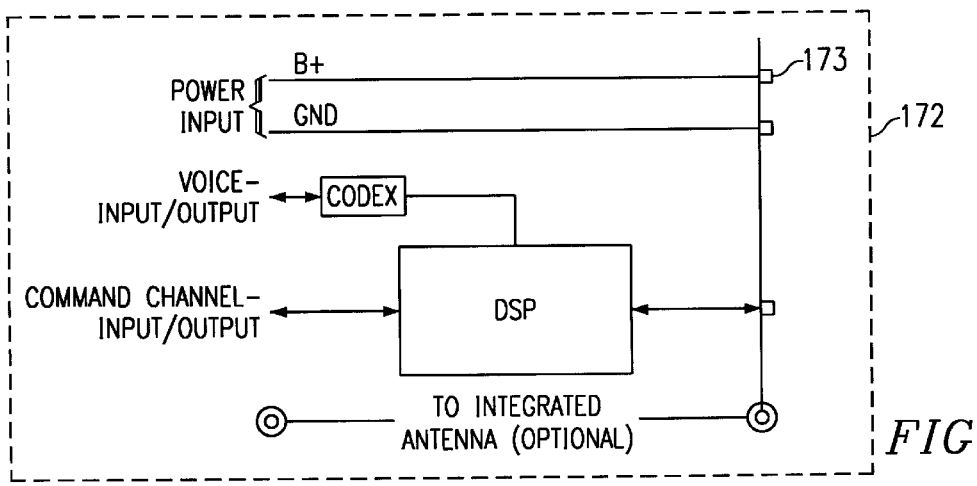
Figure 48:
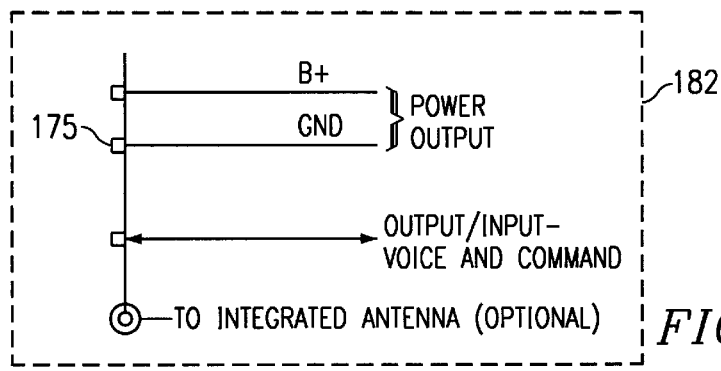
Figure 49:
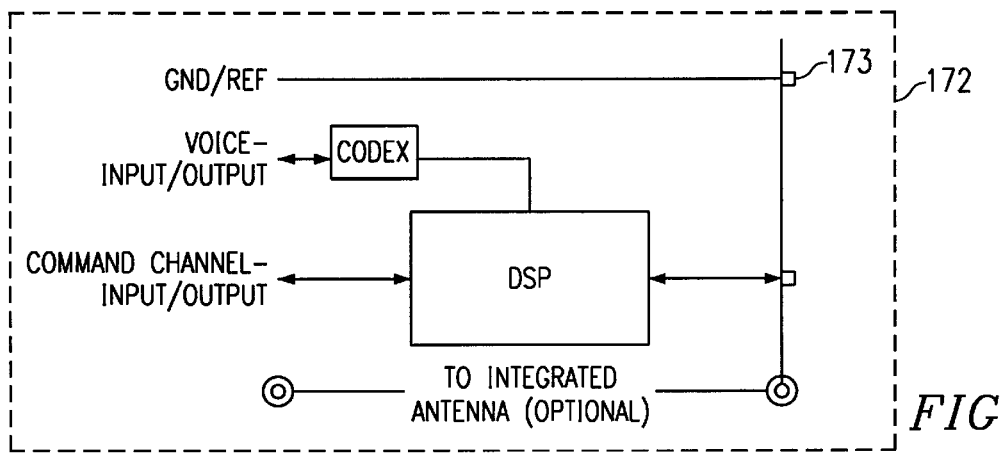
Figure 50:
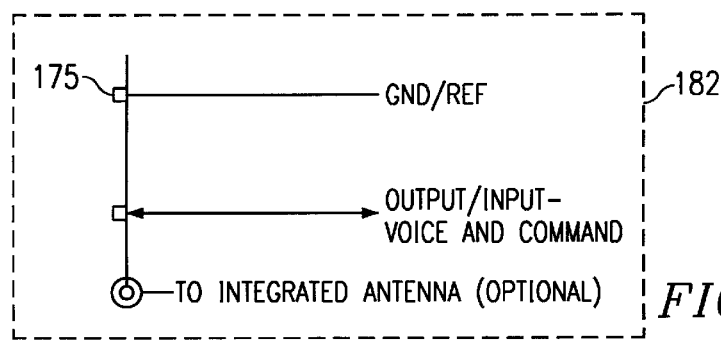

In the embodiment of the invention illustrated in FIG. 47, computer/portable interface 172 comprises: power leads for charging the portable telephone's battery(s) while connected to the computer; a codex circuit for coupling a signal line (voice input and output for operating in a bidirectional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts and leads in computer/portable telephone interface 182 in portable computer 164, as illustrated in FIG. 48. In the embodiment of the invention illustrated in FIG. 49, computer/portable interface 172 comprises: a ground/reference signal line; a codex circuit for coupling a signal line (voice input and output for operating in a bidirectional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts and leads in computer/portable telephone interface 182 in portable computer 164, as illustrated in FIG. 50.

Figure 51:
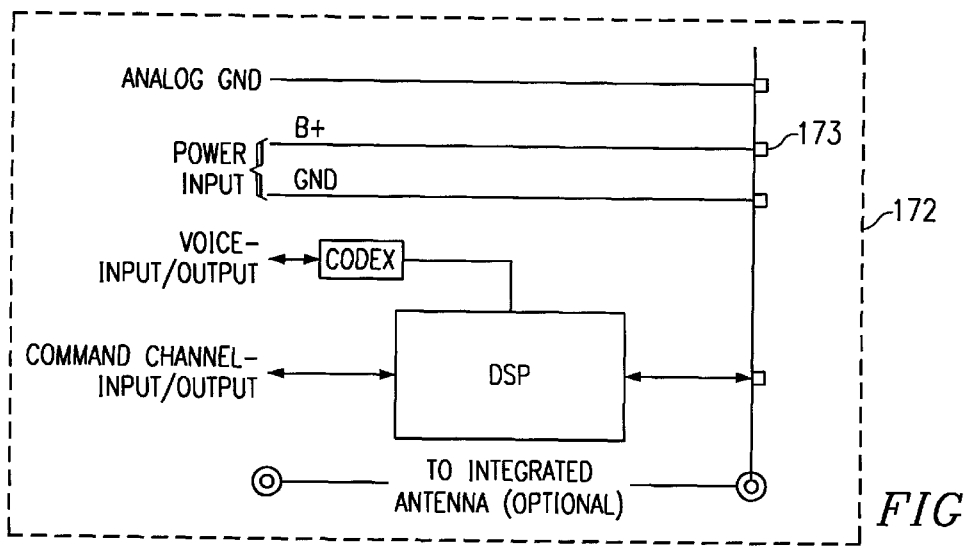
Figure 52:
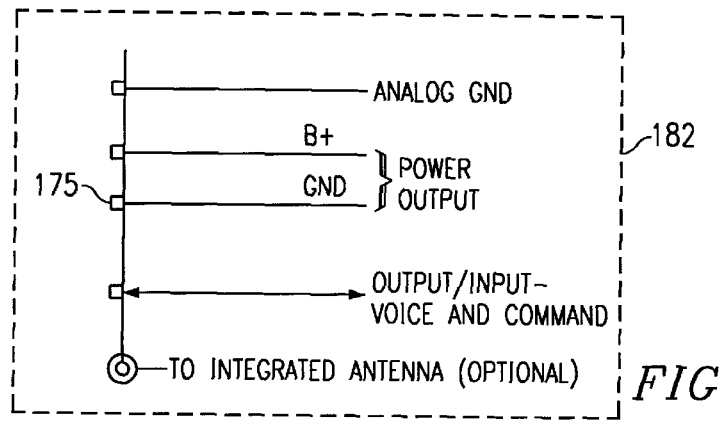
Figure 53:
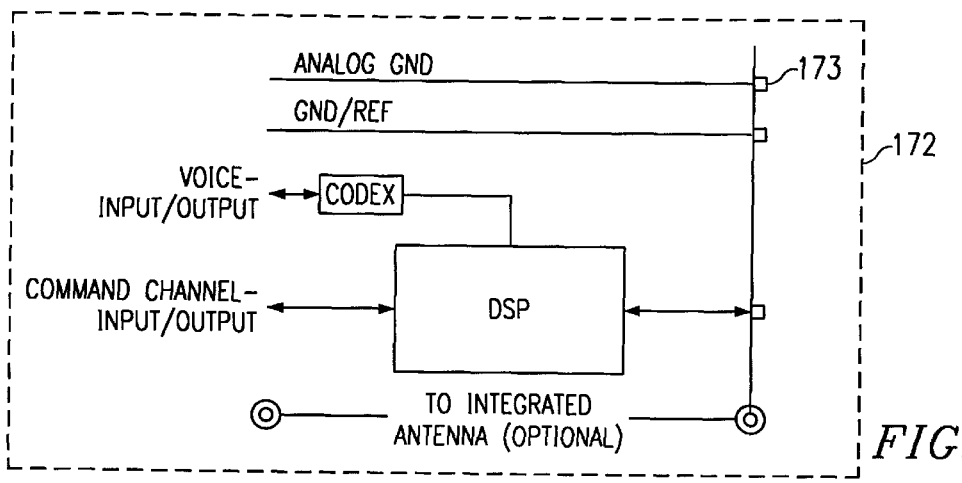
Figure 54:
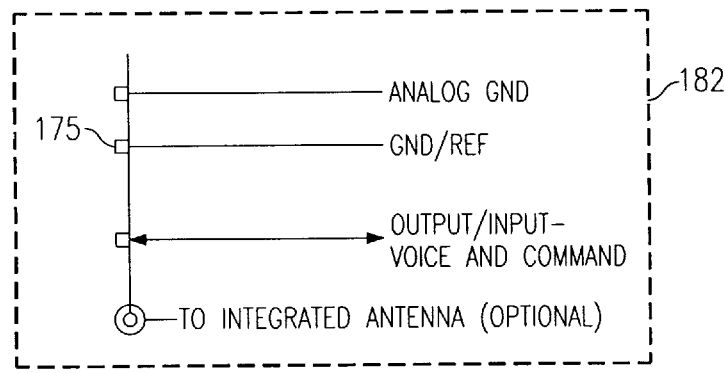

In the embodiment of the invention illustrated in FIG. 51, computer/portable interface 172 comprises: an analog ground lead line; power leads for charging the portable telephone's battery(s) while connected to the computer; a codex circuit for coupling a signal line (voice input and output for operating in a bidirectional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts and leads in computer/portable telephone interface 182 in portable computer 164, as illustrated in FIG. 52. In the embodiment of the invention illustrated in FIG. 53, computer/portable interface 172 comprises: an analog ground lead line; a ground/reference signal line; a codex circuit for coupling a signal line (voice input and output for operating in a bidirectional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts and leads in computer/portable telephone interface 182 in portable computer 164, as illustrated in FIG. 54.

Figure 55:
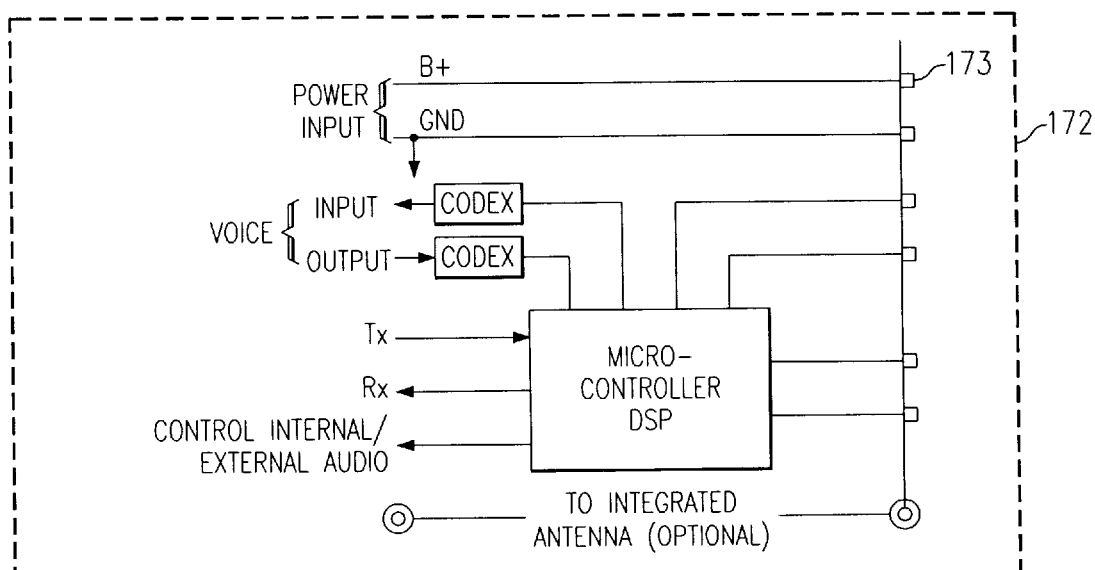
Figure 56:
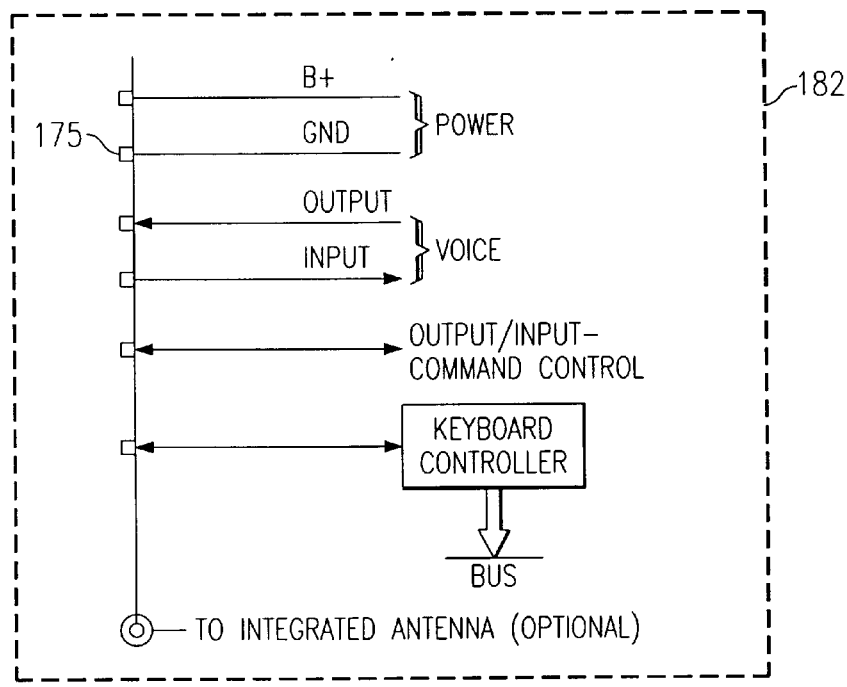
Figure 57:
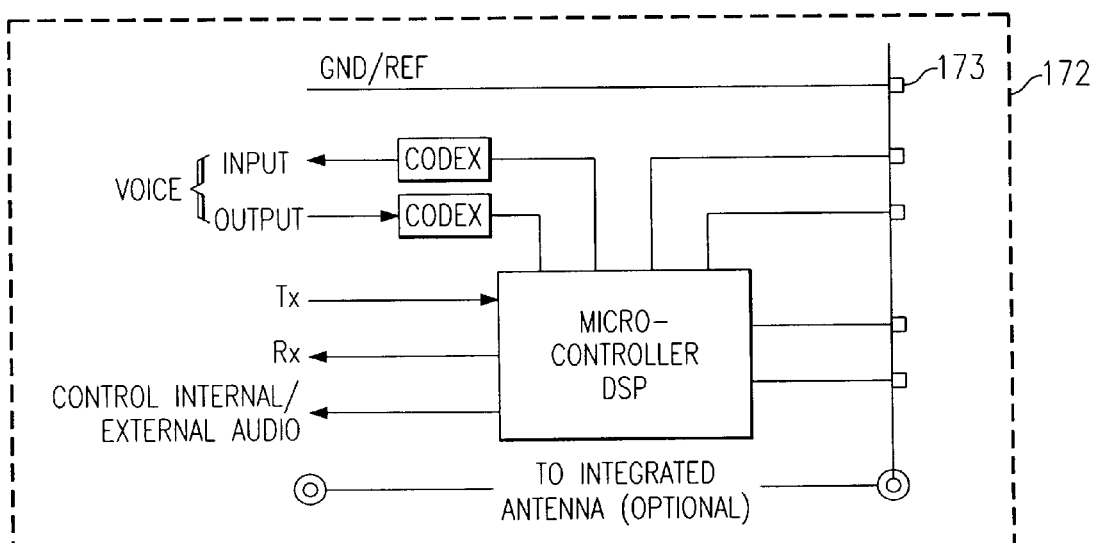
Figure 58:
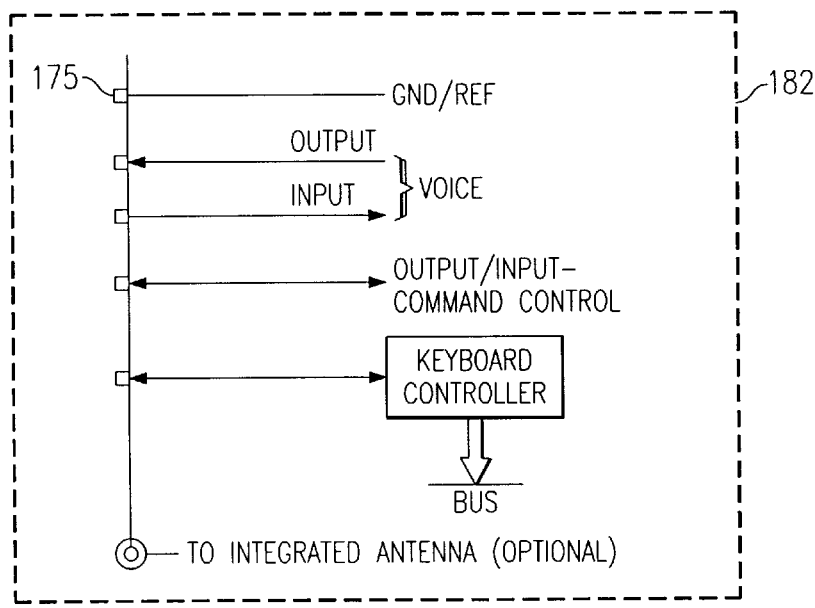

In the embodiment of the invention illustrated in FIG. 55, computer/portable telephone interface 172 comprises: power leads for charging the portable telephone's battery(s) while connected to the computer; two codex circuits for coupling two signal lines (voice input and output) to a microcontroller DSP; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 56. In the embodiment of the invention illustrated in FIG. 57, computer/portable telephone interface 172 comprises: a ground/reference signal line; two codex circuits for coupling two signal lines (voice input and output) to a microcontroller DSP; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 58.

Figure 59:
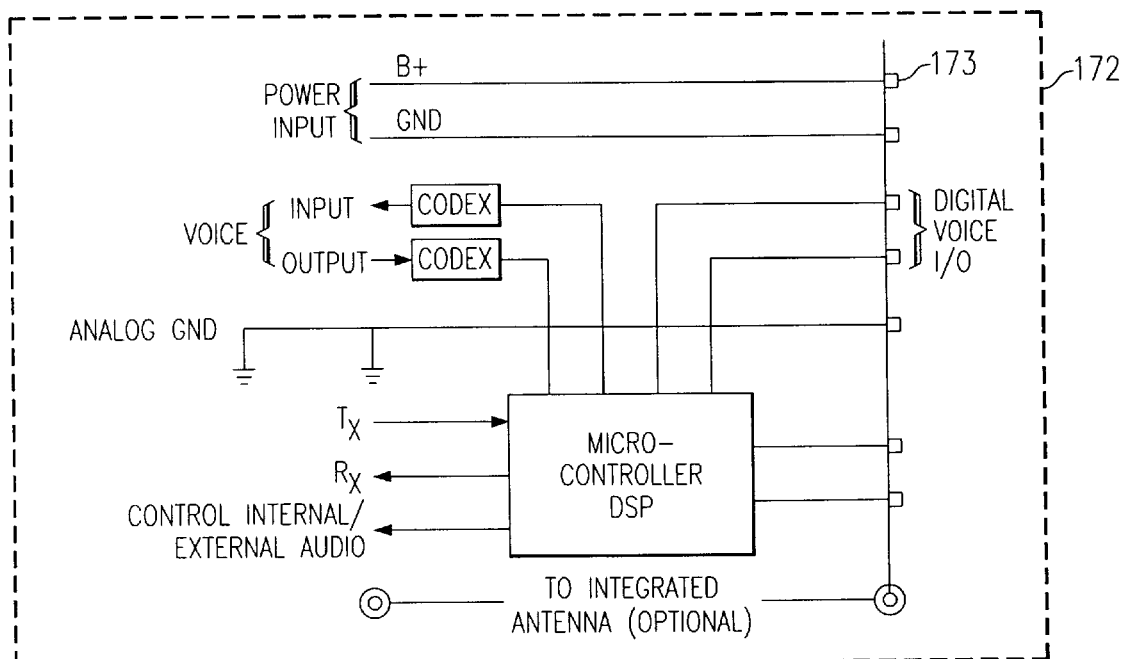
Figure 60:
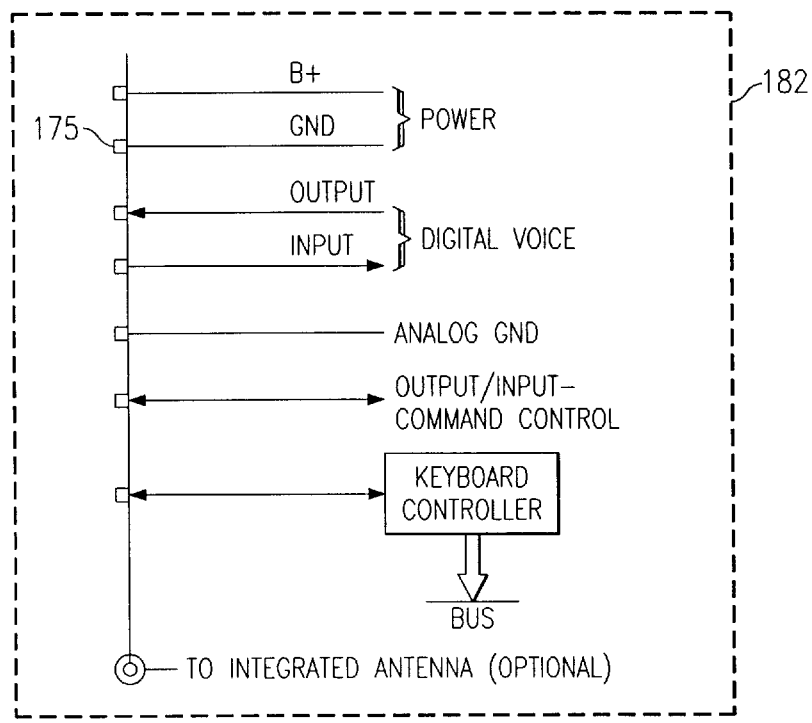
Figure 61:
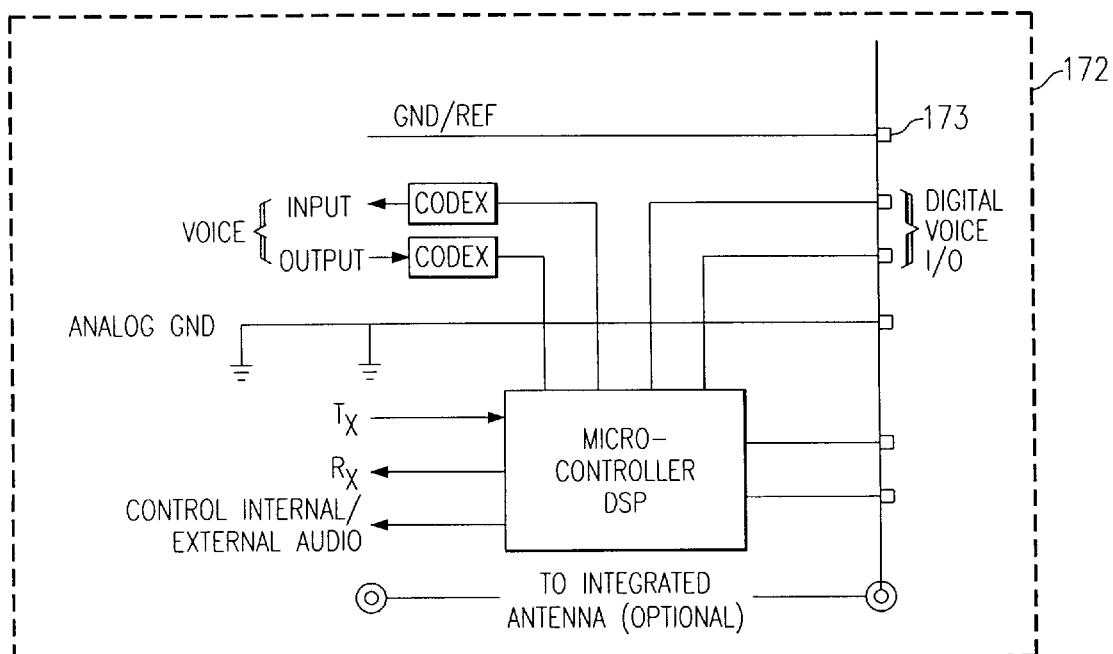
Figure 62:
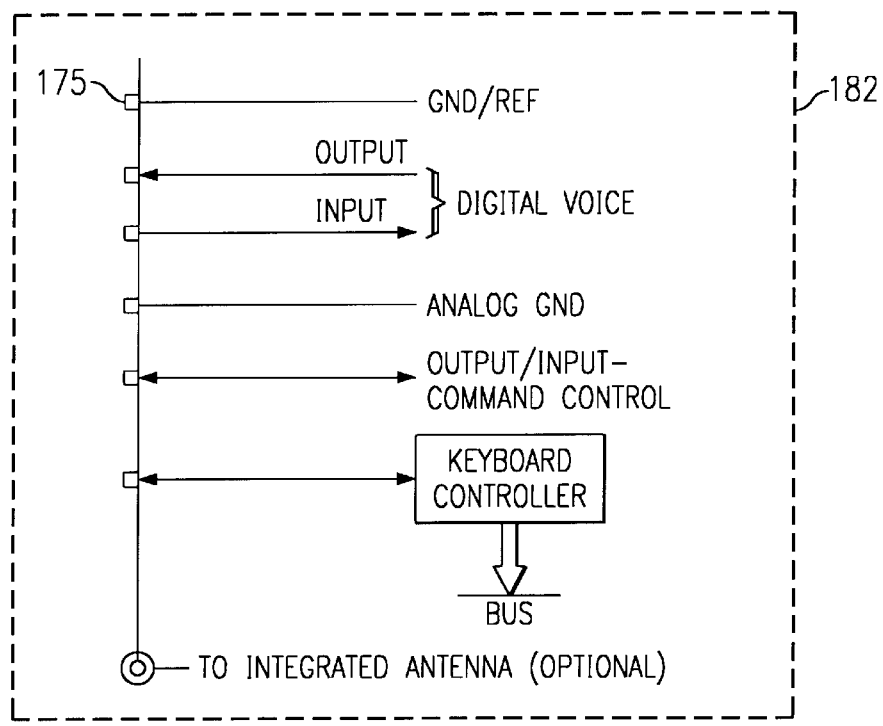

In the embodiment of the invention illustrated in FIG. 59, computer/portable telephone interface 172 comprises: power leads for charging the portable telephone's battery(s) while connected to the computer; two codex circuits for coupling two signal lines (voice input and output) to a microcontroller DSP; an analog ground lead line: transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 60. In the embodiment of the invention illustrated in FIG. 61, computer/portable telephone interface 172 comprises: a ground/reference signal line; two codex circuits for coupling two signal lines (voice input and output) to a microcontroller DSP; an analog ground lead line; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 62.

Figure 63:
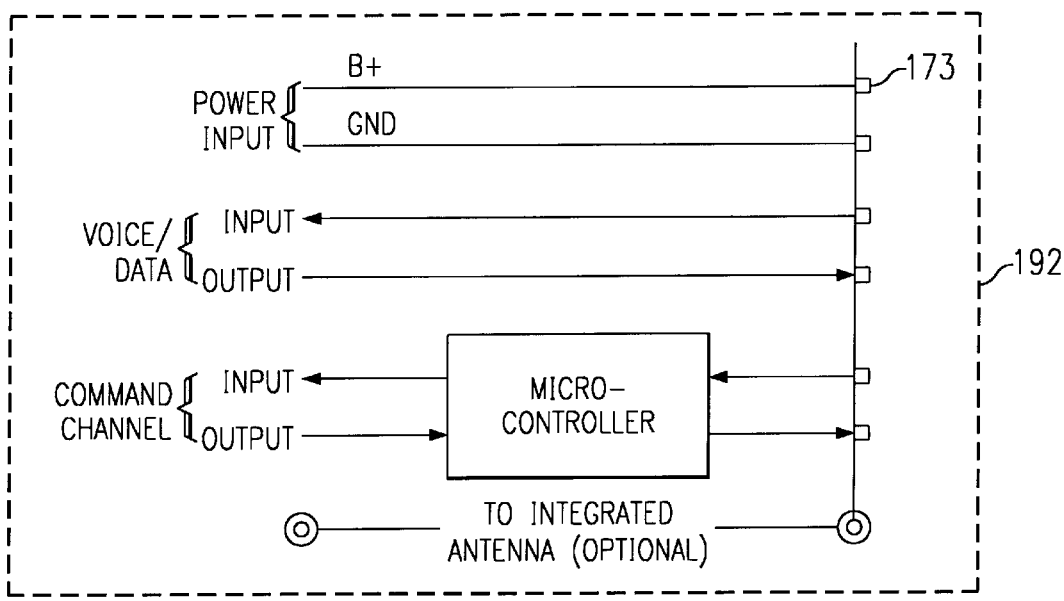
Figure 64:
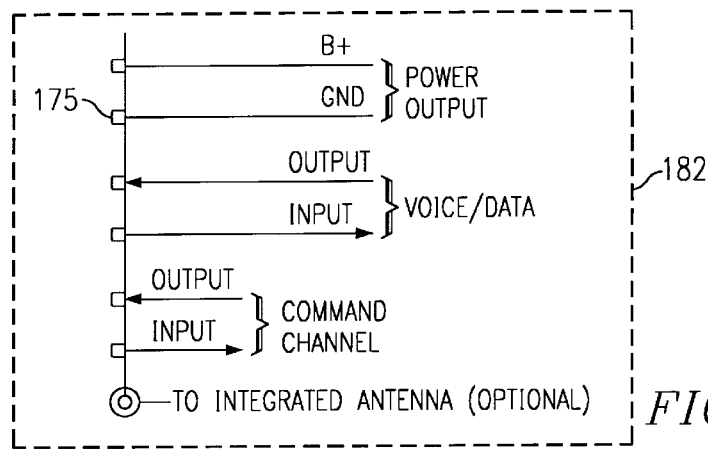
Figure 65:
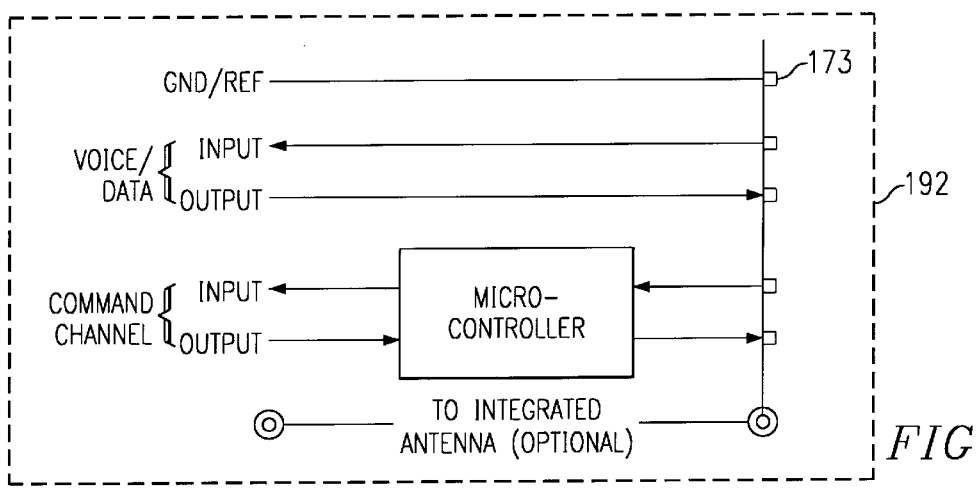
Figure 66:
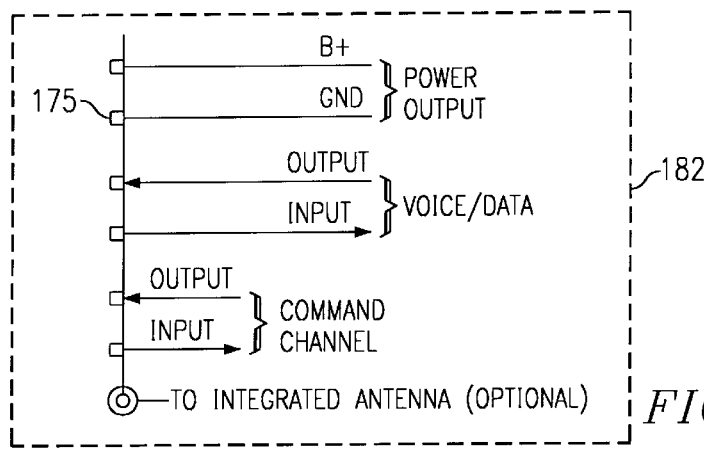

In the embodiment of the invention illustrated in FIG. 63, computer/portable telephone interface 172 comprises: power leads for charging the portable telephone's battery(s) while connected to the computer; two signal lines (voice/data input and output) for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 64. In the embodiment of the invention illustrated in FIG. 65, computer/portable interface 172 comprises: a ground/reference signal line; two signal lines (voice/data input and output) for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 66.

Figure 67:
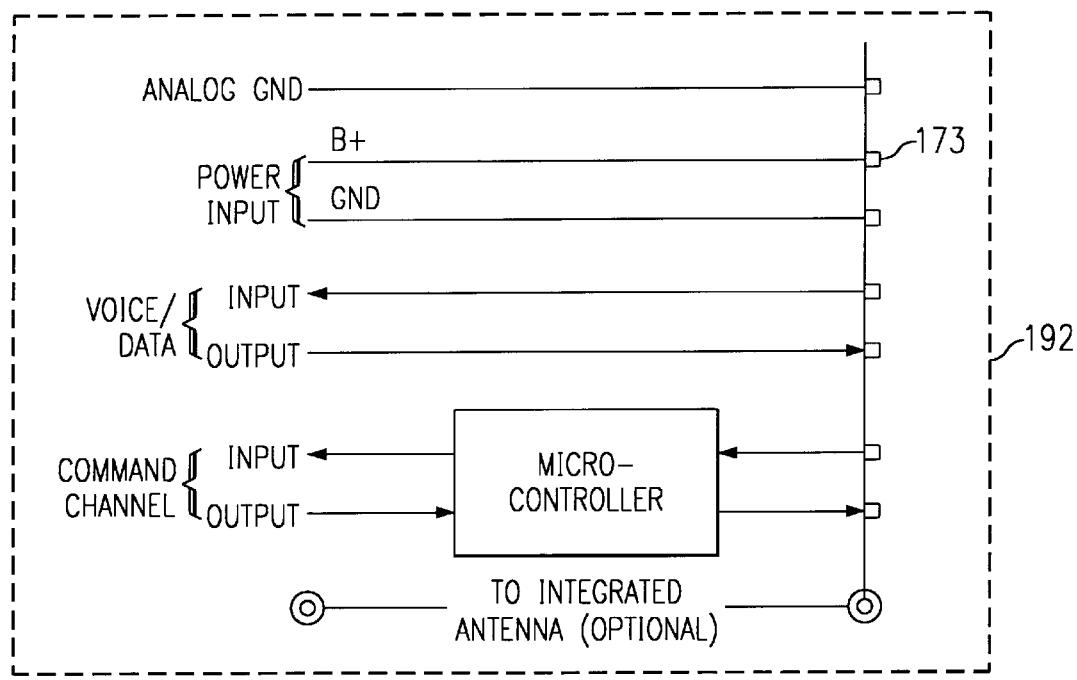
Figure 68:
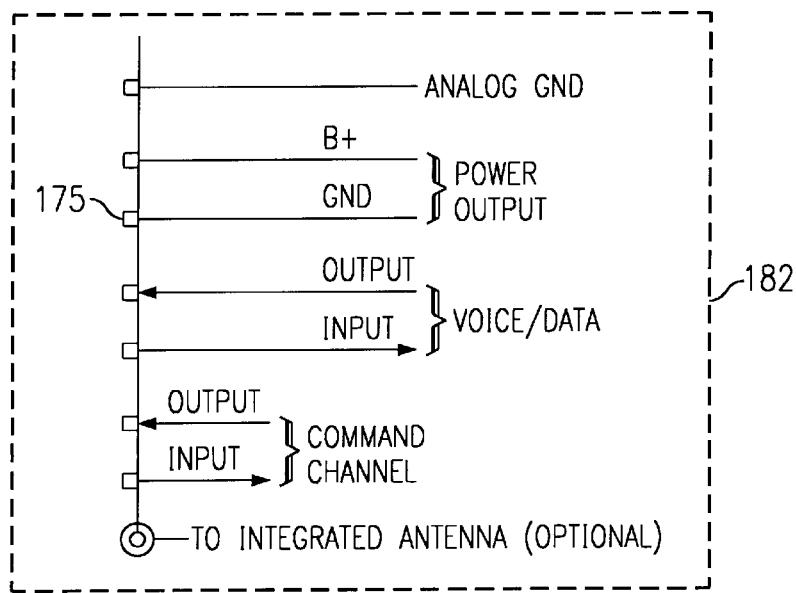
Figure 69:
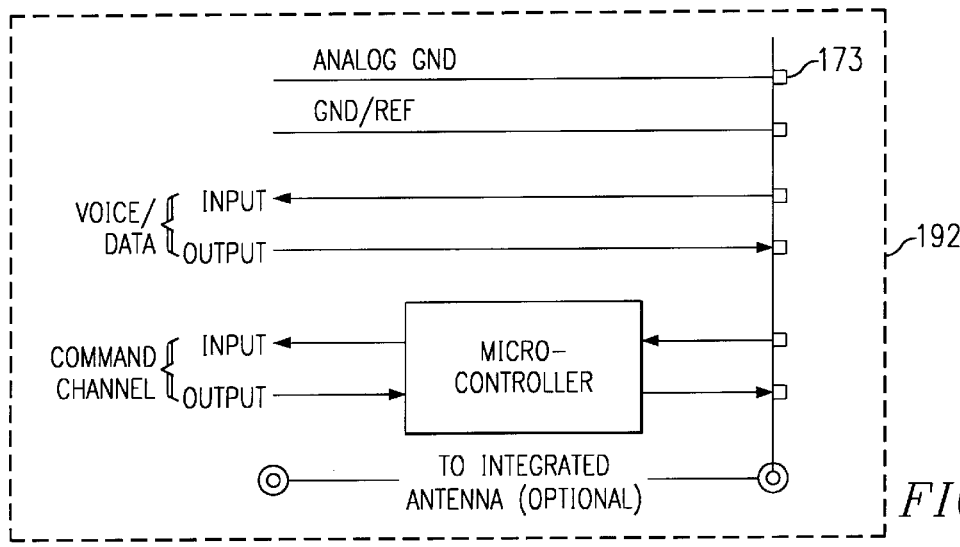
Figure 70:
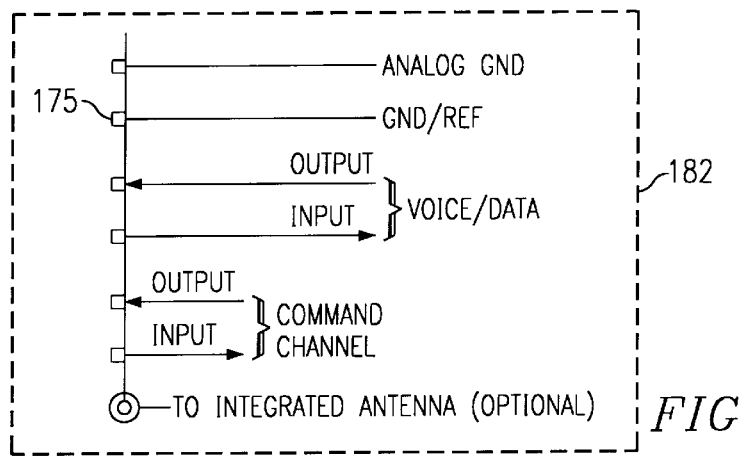

In the embodiment of the invention illustrated in FIG. 67, computer/portable telephone interface 172 comprises: an analog ground lead line; power leads for charging the portable telephone's battery(s) while connected to the computer; two signal lines (voice/data input and output) for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 68. In the embodiment of the invention illustrated in FIG. 69, computer/portable interface 172 comprises: an analog ground lead line; a ground/reference signal line; two signal lines (voice/data input and output) for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 70. Power leads are not necessary in embodiments of the invention where computer charging of the portable telephone's battery(s) is not desired.

Figure 71:
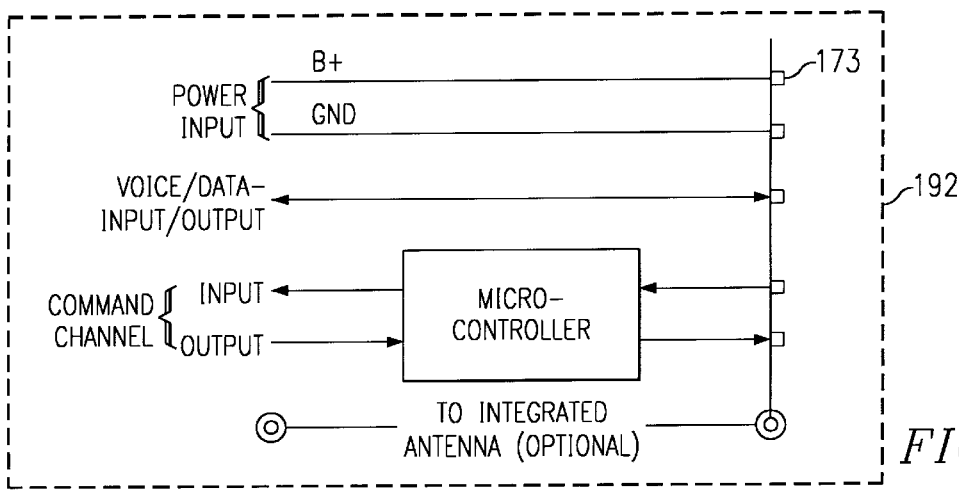
Figure 72:
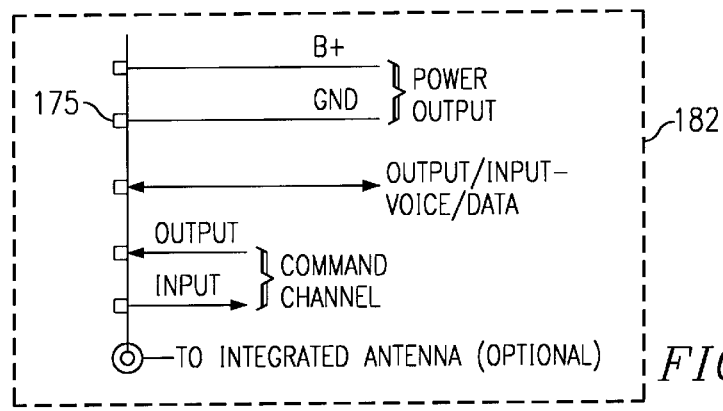
Figure 73:
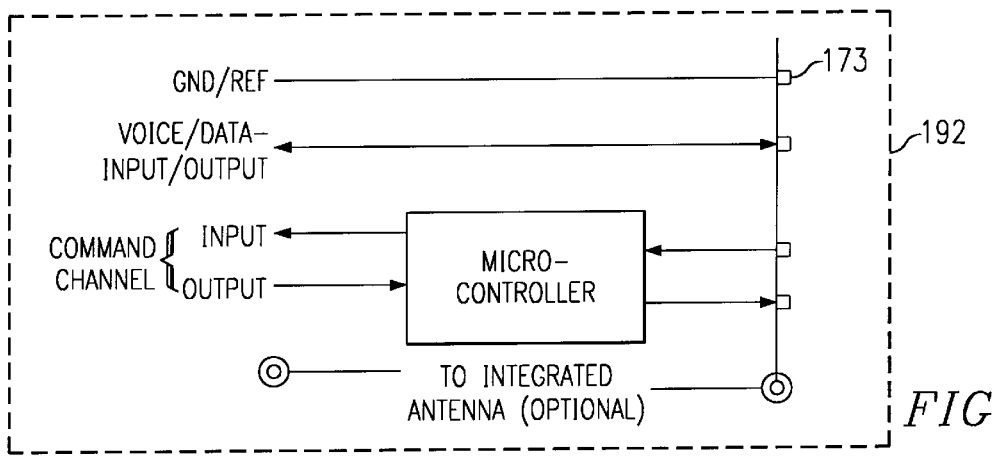
Figure 74:
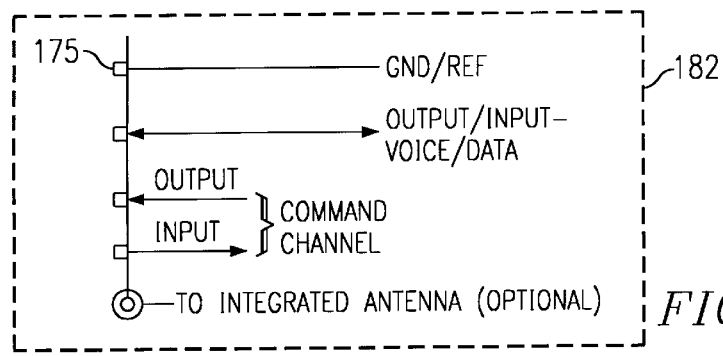

In the embodiment of the invention illustrated in FIG. 71, computer/portable interface 172 comprises: power leads for charging the portable telephone's battery(s) while connected to the computer; one signal line (voice/data input and output) for operating in a bidirectional half duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 72. In the embodiment of the invention illustrated in FIG. 73, computer/portable interface 172 comprises: a ground/reference signal line; one signal line (voice/data input and output) for operating in a bidirectional half duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 74. Power leads are not necessary in embodiments of the invention where computer charging of the portable telephone's battery(s) is not desired.

Figure 75:
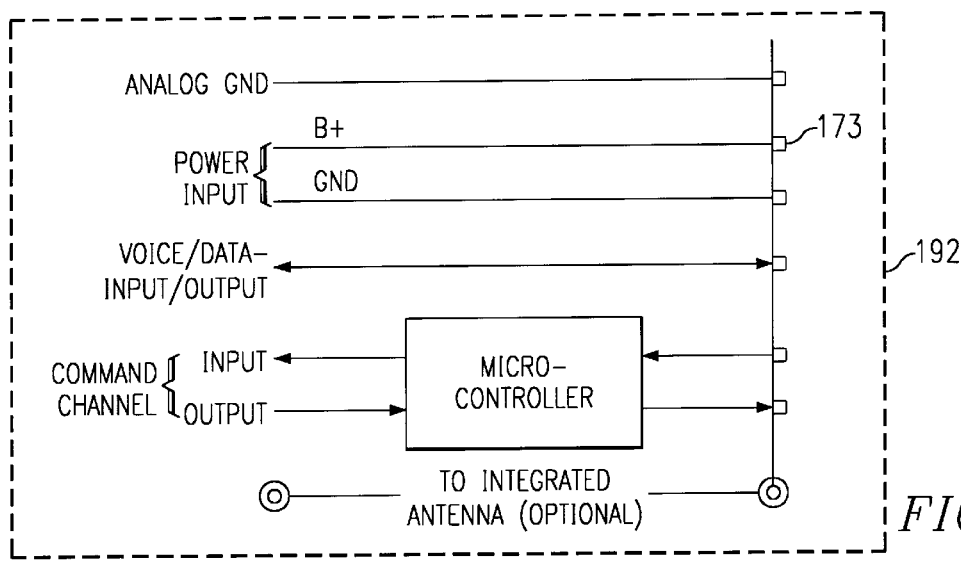
Figure 76:
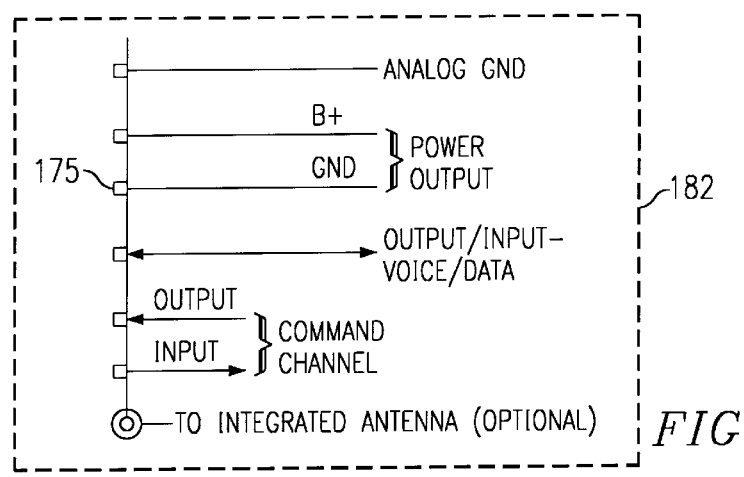
Figure 77:
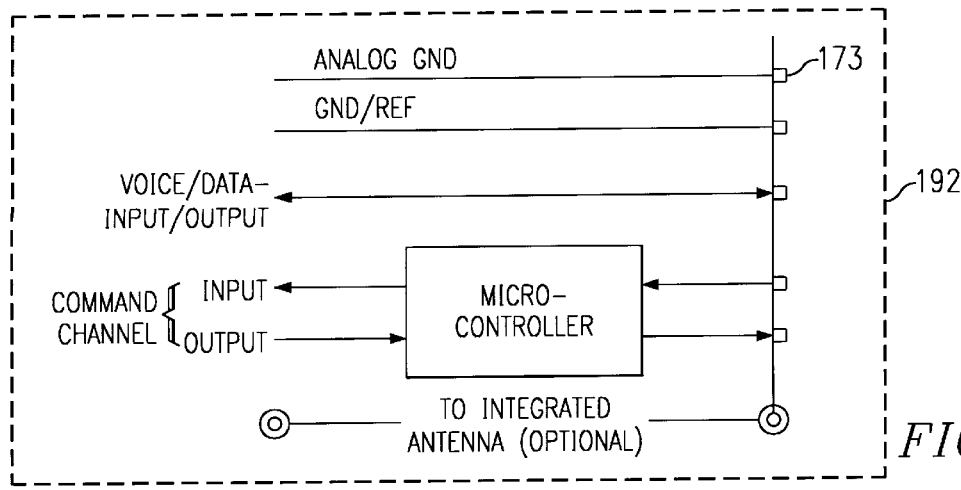
Figure 78:
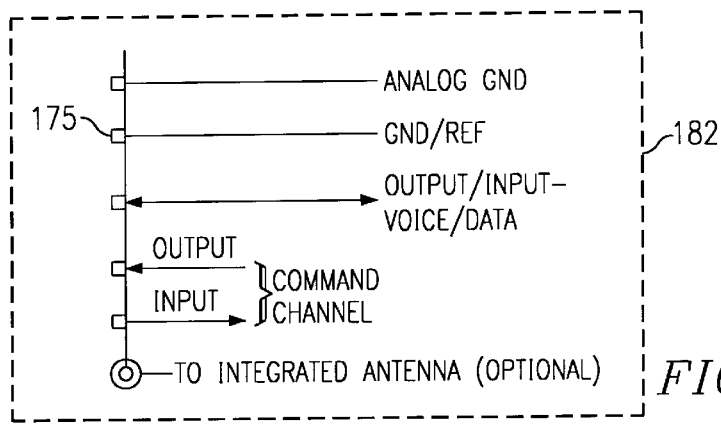

In the embodiment of the invention illustrated in FIG. 75, computer/portable telephone interface 172 comprises: an analog ground lead line; power leads for charging the portable telephone's battery(s) while connected to the computer; one signal line (voice/data input and output) for operating in a bidirectional half duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 76. In the embodiment of the invention illustrated in FIG. 77, computer/portable interface 172 comprises: an analog ground lead line; a ground/reference signal line; two signal lines (voice/data input and output) for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 78. Power leads are not necessary in embodiments of the invention where computer charging of the portable telephone's battery(s) is not desired.

Figure 79:
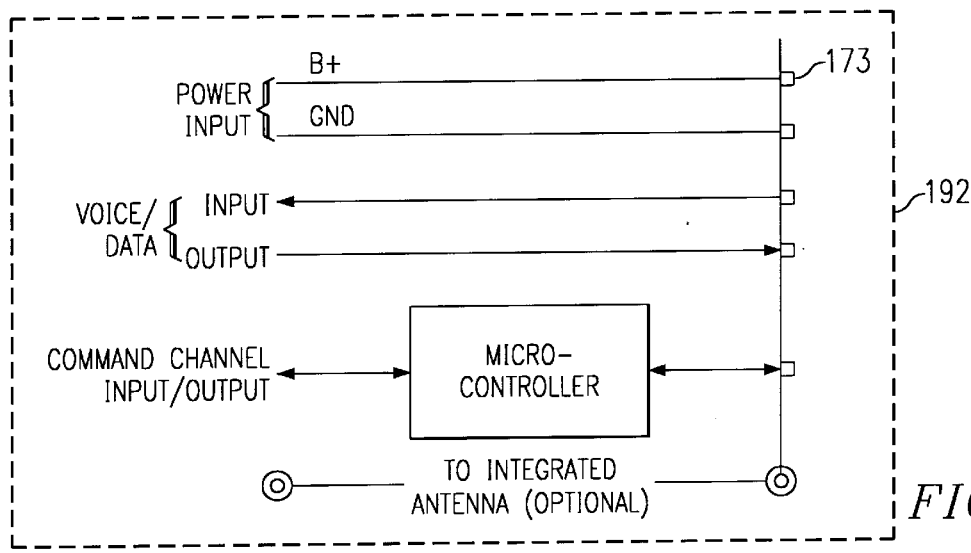
Figure 80:
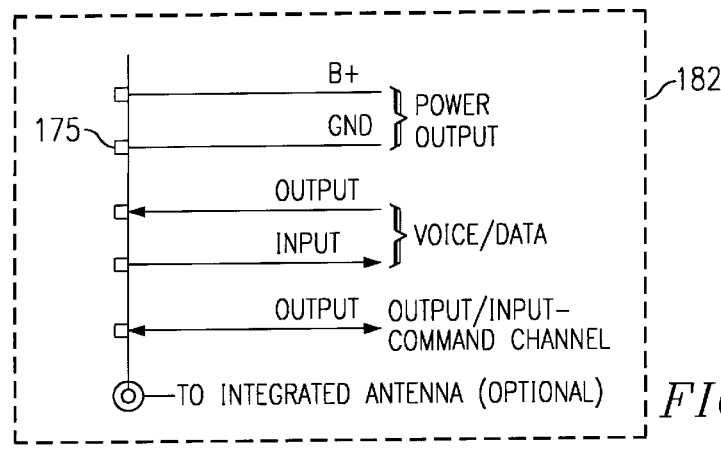
Figure 81:
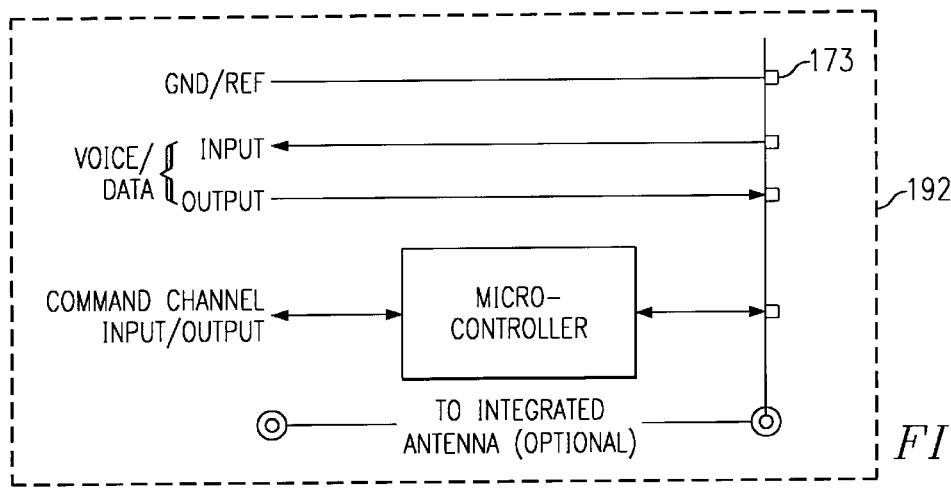
Figure 82:
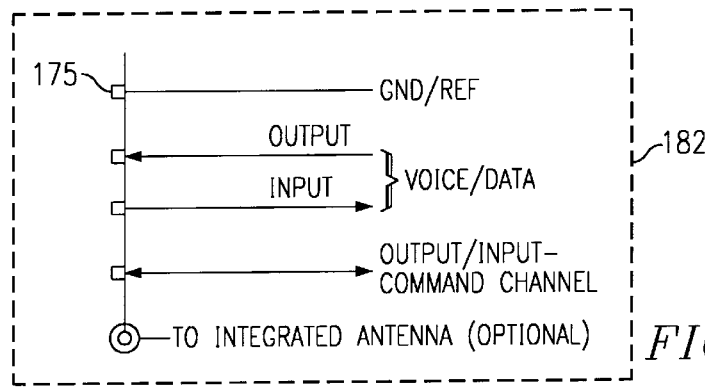

In the embodiment of the invention, illustrated in FIG. 79, computer/portable telephone interface 172 comprises: power leads for charging the portable telephone's battery(s) while connected to the computer; two signal lines (voice/data input and output) for full duplex mode; a microcontroller having one input/output command channel lead line for operating in a bidirectional half duplex mode; a signal line (optional) for coupling to an antenna integrated in the computer; and electrical contacts for coupling the leads to corresponding electrical contacts and leads in computer/portable telephone interface 182 in portable computer 164, as illustrated in FIG. 80. In the embodiment of the invention illustrated in FIG. 81, computer/portable interface 172 comprises: a ground/reference signal line; two signal lines (voice/data input and output) for full duplex mode; a microcontroller having one input/output command channel lead line for operating in a bidirectional half duplex mode; a signal line (optional) for coupling to an antenna integrated in the computer; and electrical contacts for coupling the leads to corresponding electrical contacts and leads in computer/portable telephone interface 182 in portable computer 164, as illustrated in FIG. 82. Power leads are not necessary in embodiments of the invention where computer charging of the portable telephone's battery(s) is not desired.

Figure 83:
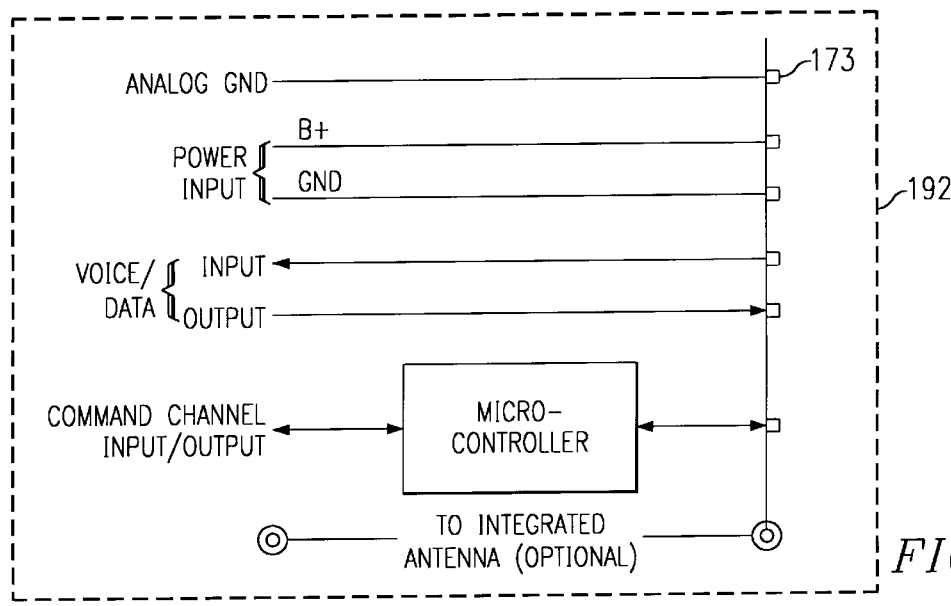
Figure 84:
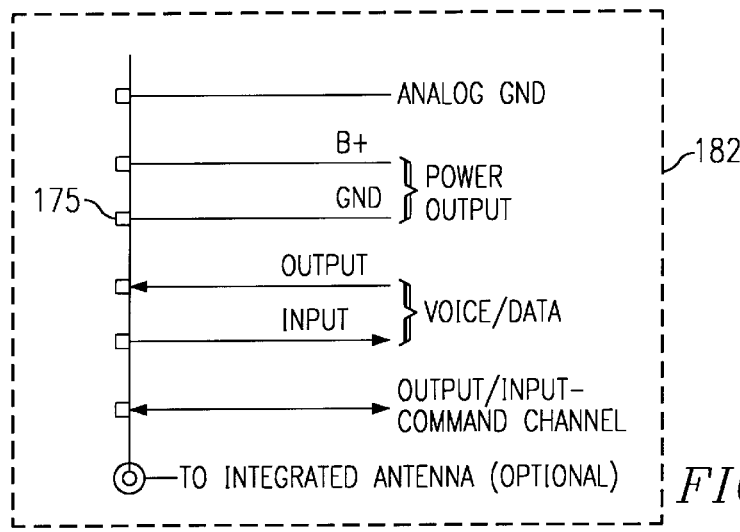
Figure 85:
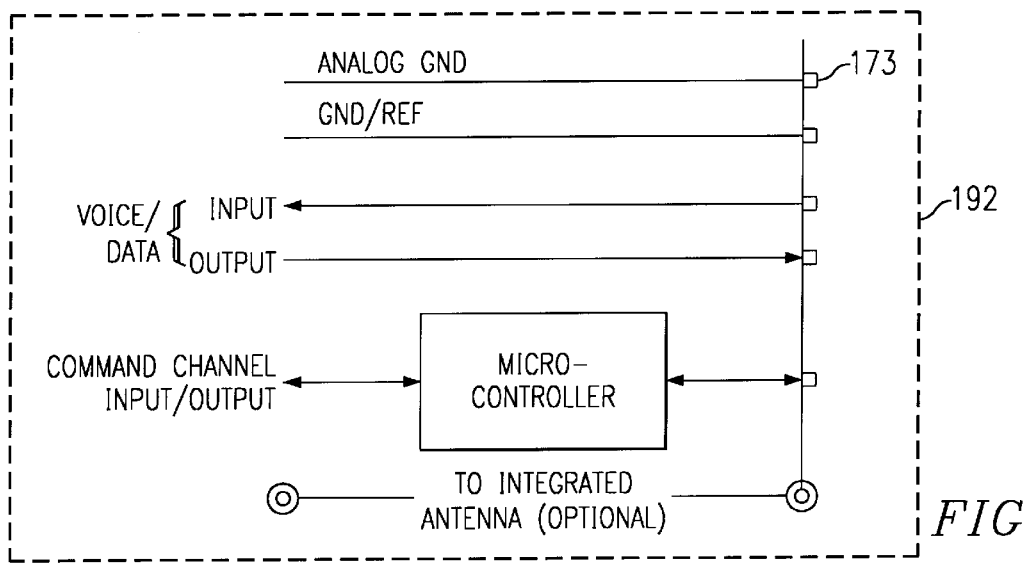
Figure 86:
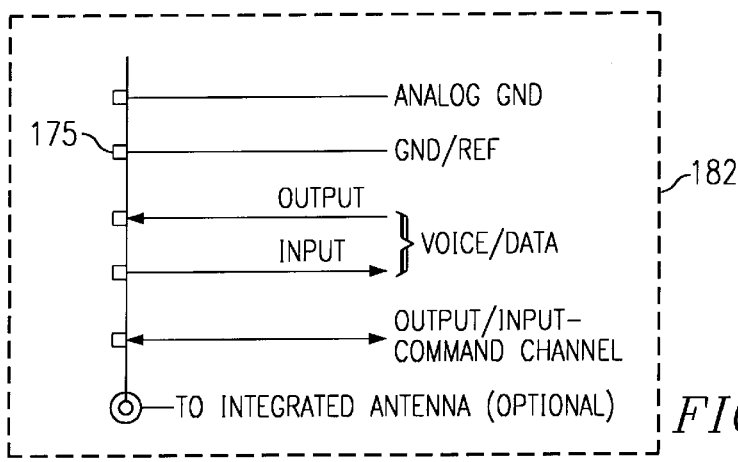

In the embodiment of the invention illustrated in FIG. 83, computer/portable telephone interface 172 comprises: an analog ground lead line; power leads for charging the portable telephone's battery(s) while connected to the computer; two signal lines (voice/data input and output) for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 84. In the embodiment of the invention illustrated in FIG. 85, computer/portable interface 172 comprises: an analog ground lead line; a ground/reference signal line; two signal lines (voice/data input and output) for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 86.

Figure 87:
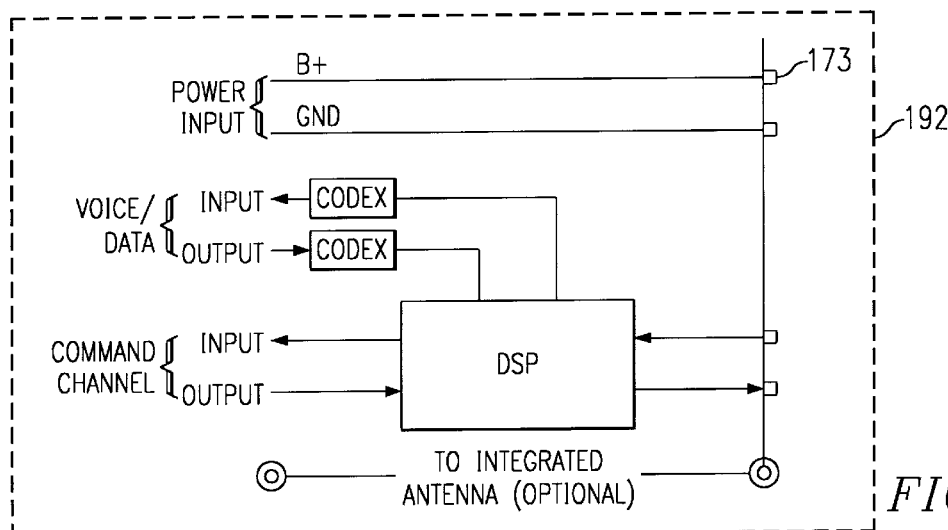
Figure 88:
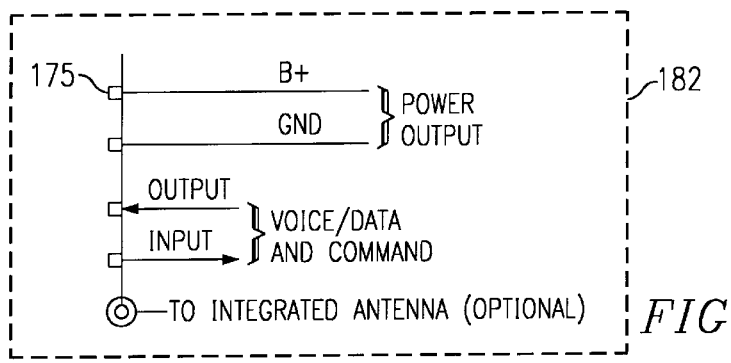
Figure 89:
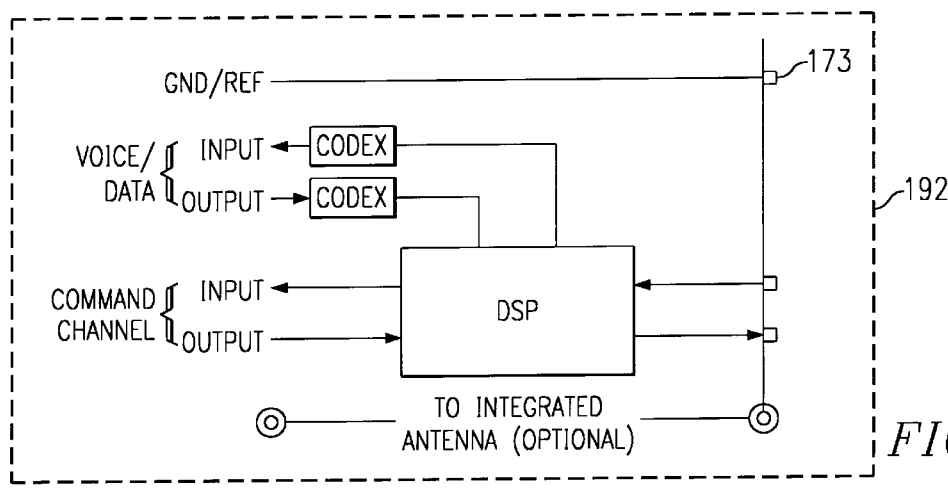
Figure 90:
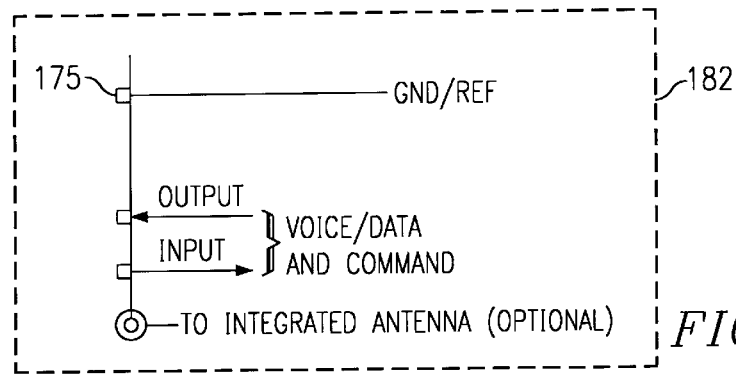

In the embodiment of the invention illustrated in FIG. 87, computer/portable telephone interface 172 comprises: power leads for charging the portable telephone's battery(s) while connected to the computer; two codex circuits for coupling two signal lines (voice/data input and output) to a digital signal processor (DSP); input and output command channel leads; a signal line (optional) for coupling to an antenna integrated in the computer; and electrical contacts for coupling the power leads and at least two input/output leads coupled to the DSP, to corresponding electrical contacts and leads in computer/portable telephone interface 182 in portable computer 164, as illustrated in FIG. 88. In the embodiment of the invention illustrated in FIG. 89, computer/portable interface 172 comprises: a ground/reference signal line; two codex circuits for coupling two signal lines (voice/data input and output) to a digital signal processor (DSP); input and output command channel leads; a signal line (optional) for coupling to an antenna integrated in the computer; and electrical contacts for coupling the power leads and at least two input/output leads coupled to the DSP, to corresponding electrical contacts and leads in computer/portable telephone interface 182 in portable computer 164, as illustrated in FIG. 90.

Figure 91:
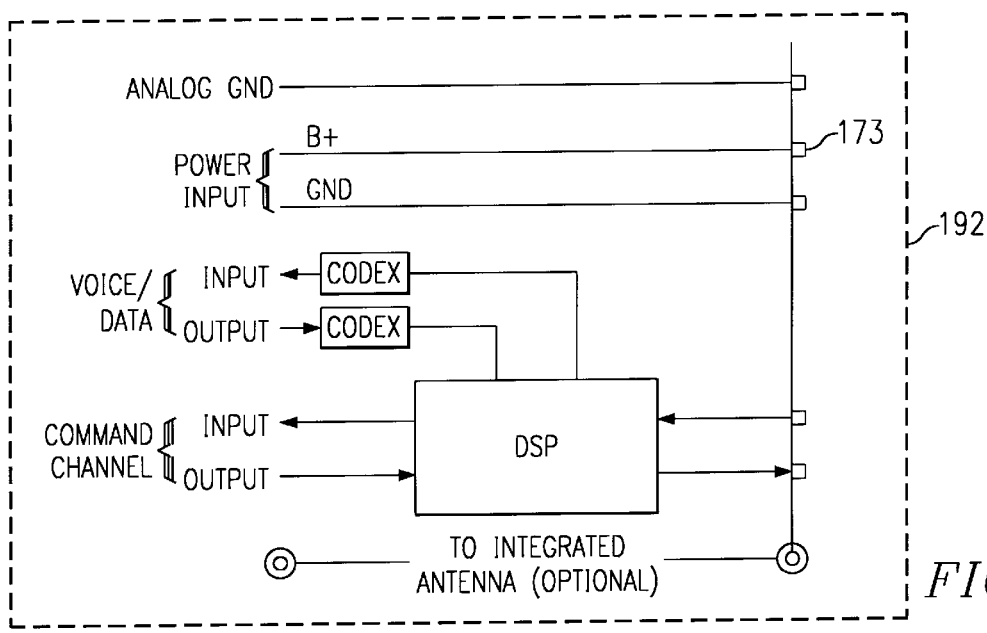
Figure 92:
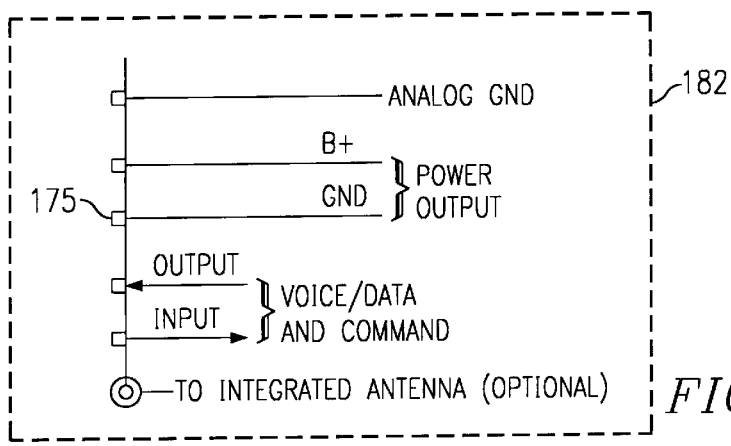
Figure 93:
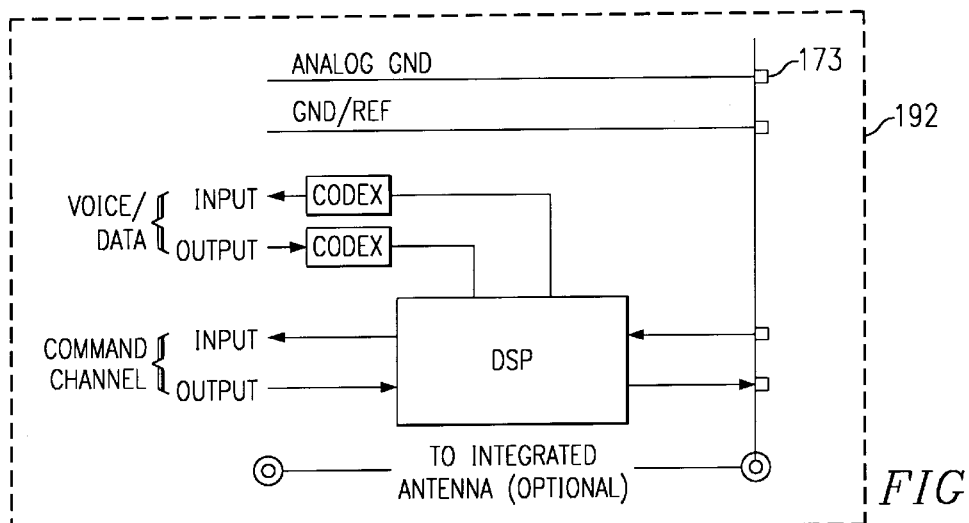
Figure 94:
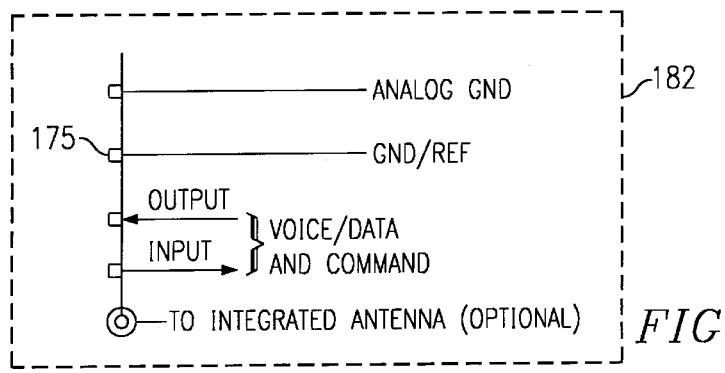

In the embodiment of the invention illustrated in FIG. 91, computer/portable telephone interface 172 comprises: an analog ground lead line; two codex circuits for coupling two signal lines (voice/data input and output) to a digital signal processor (DSP); input and output command channel leads; a signal line (optional) for coupling to an antenna integrated in the computer; and electrical contacts for coupling the power leads and at least two input/output leads coupled to the DSP, to corresponding electrical contacts and leads in computer/portable telephone interface 182 in portable computer 164, as illustrated in FIG. 92. In the embodiment of the invention illustrated in FIG. 93, computer/portable interface 172 comprises: an analog ground lead line; a ground/reference signal line; two codex circuits for coupling two signal lines (voice/data input and output) to a digital signal processor (DSP); input and output command channel leads; a signal line (optional) for coupling to an antenna integrated in the computer; and electrical contacts for coupling the power leads and at least two input/output leads coupled to the DSP, to corresponding electrical contacts and leads in computer/portable telephone interface 182 in portable computer 164, as illustrated in FIG. 94. Power leads are not necessary in embodiments of the invention where computer charging of the portable telephone's battery(s) is not desired.

Figure 95:
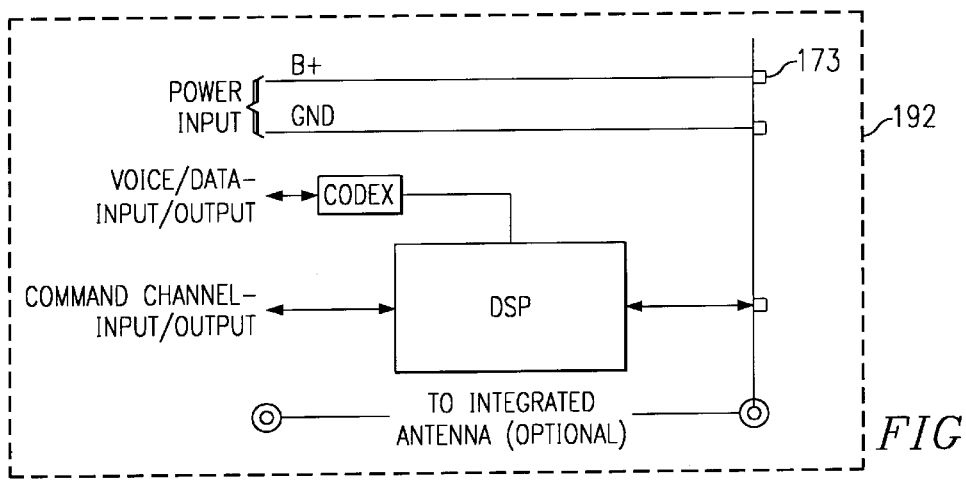
Figure 96:
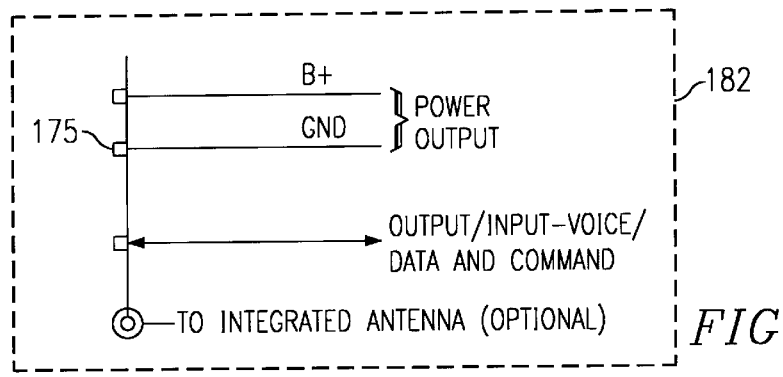
Figure 97:
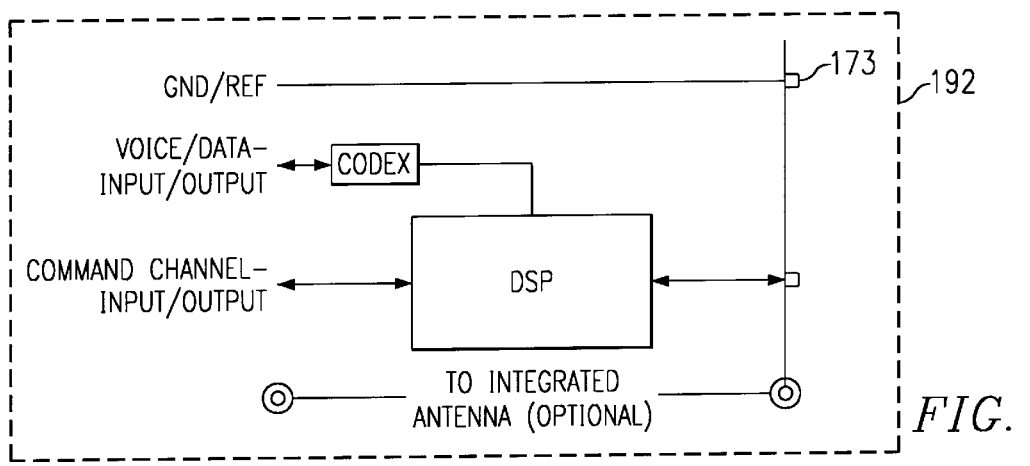
Figure 98:
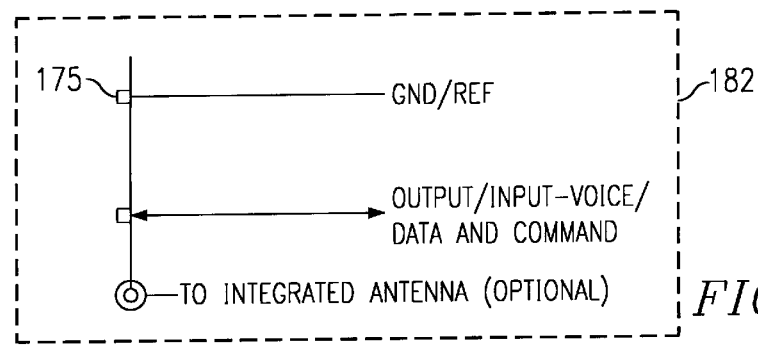

In the embodiment of the invention illustrated in FIG. 95, computer/portable interface 172 comprises: power leads for charging the portable telephone's battery(s) while connected to the computer; a codex circuit for coupling a signal line (voice/data input and output for operating in a bidirectional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts and leads in computer/portable telephone interface 182 in portable computer 164, as illustrated in FIG. 96. In the embodiment of the invention illustrated in FIG. 97, computer/portable interface 172 comprises: a ground/reference signal line; a codex circuit for coupling a signal line (voice/data input and output for operating in a bidirectional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts and leads in computer/portable telephone interface 182 in portable computer 164, as illustrated in FIG. 98.

Figure 99:
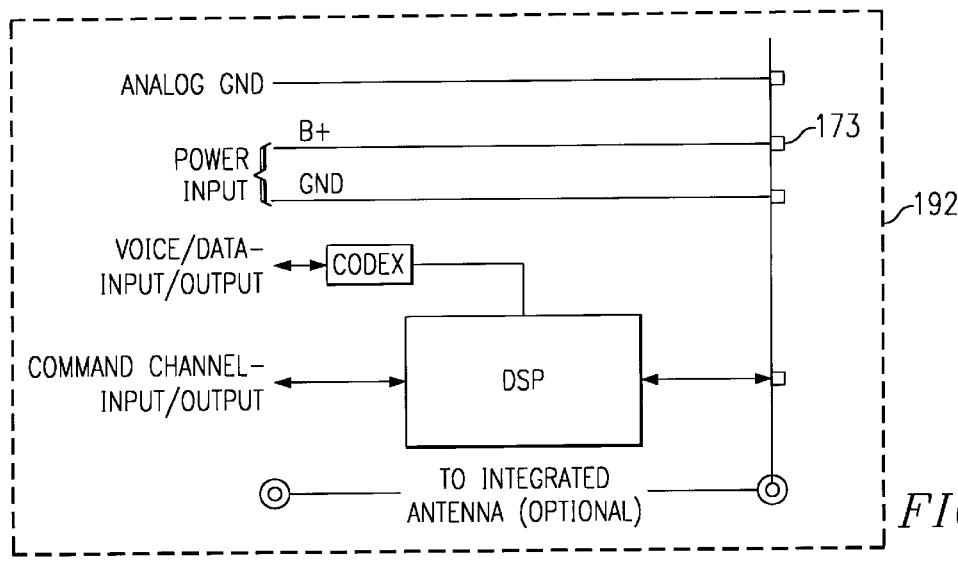
Figure 100:
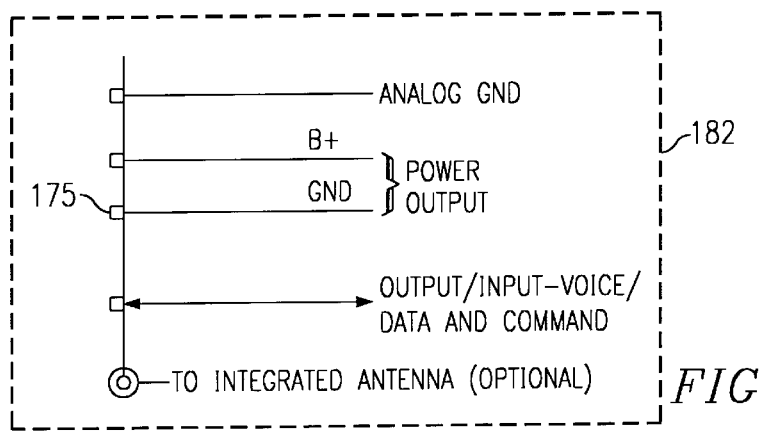
Figure 101:
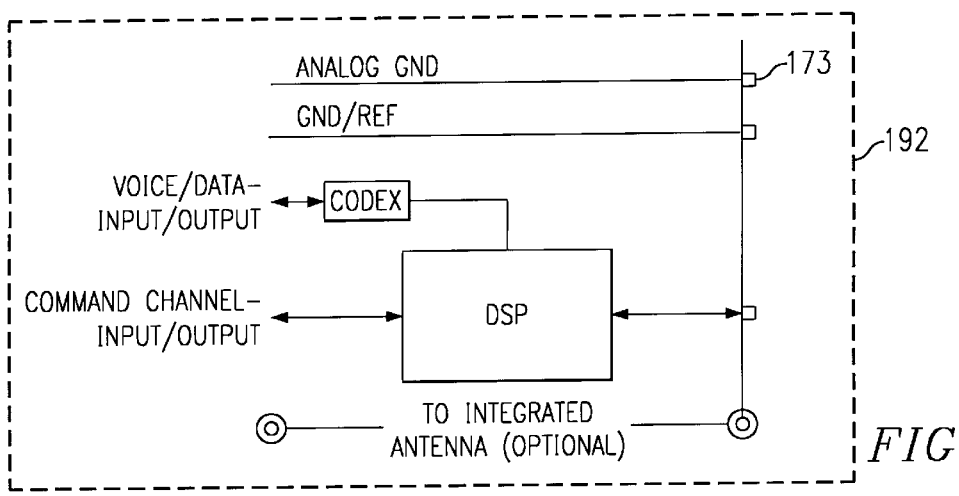
Figure 102:
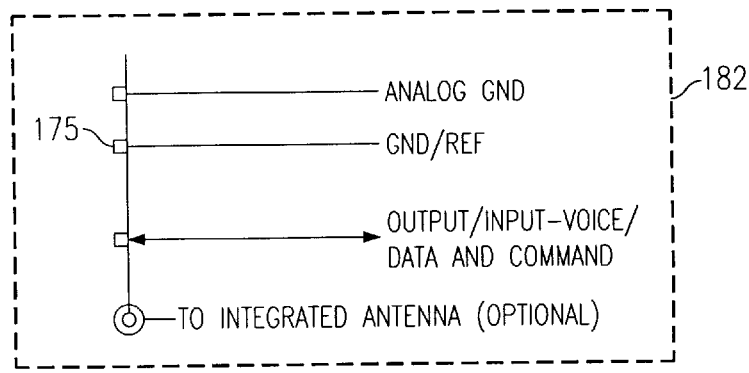

In the embodiment of the invention illustrated in FIG. 99, computer/portable interface 172 comprises: an analog ground lead line; power leads for charging the portable telephone's battery(s) while connected to the computer; a codex circuit for coupling a signal line (voice/data input and output for operating in a bidirectional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts and leads in computer/portable telephone interface 182 in portable computer 164, as illustrated in FIG. 100. In the embodiment of the invention illustrated in FIG. 101, computer/portable interface 172 comprises: an analog ground lead line; a ground/reference signal line; a codex circuit for coupling a signal a signal line (voice/data input and output for operating in a bidirectional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts and leads in computer/portable telephone interface 182 in portable computer 164, as illustrated in FIG. 102.

Figure 103:
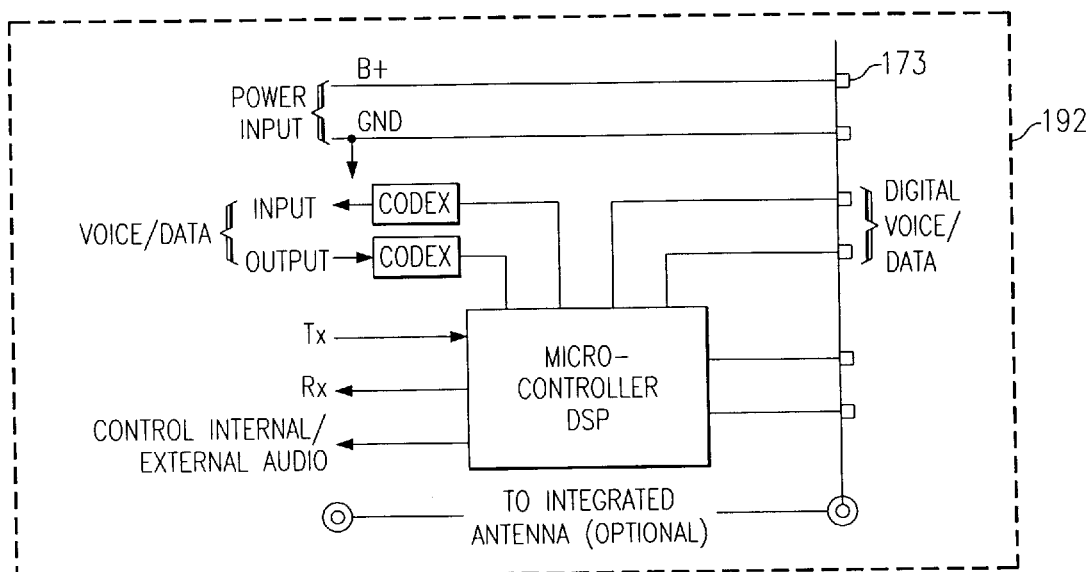
Figure 104:
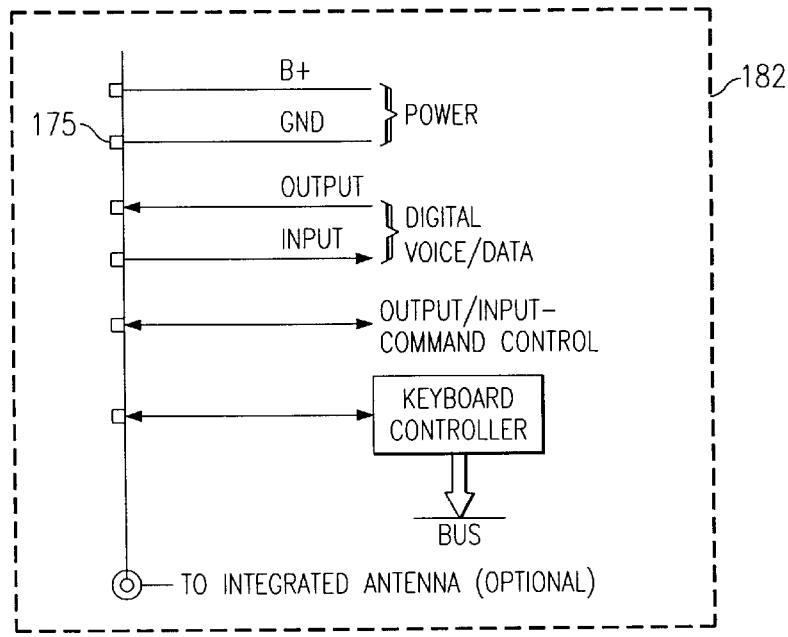
Figure 105:
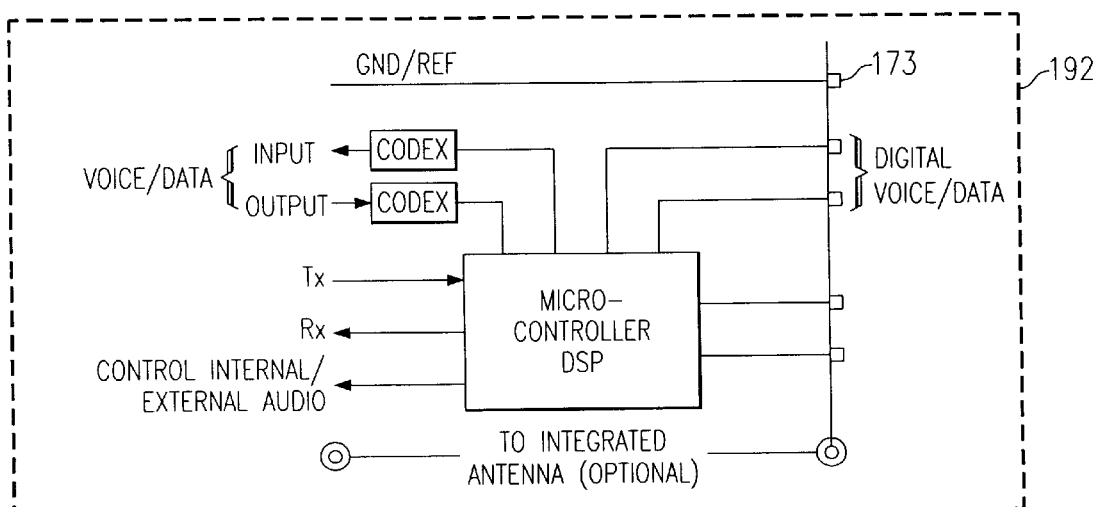
Figure 106:
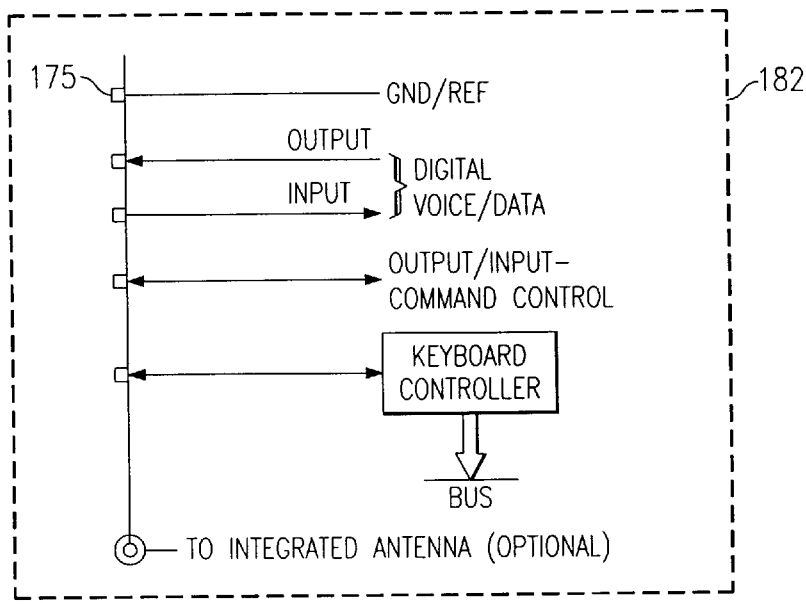

In the embodiment of the invention illustrated in FIG. 103, computer/portable telephone interface 172 comprises: power leads for charging the portable telephone's battery(s) while connected to the computer; two codex circuits for coupling two signal lines (voice/data input and output) to a microcontroller DSP; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 104. In the embodiment of the invention illustrated in FIG. 105, computer/portable telephone interface 172 comprises: a ground/reference signal line; two codex circuits for coupling two signal lines (voice/data input and output) to a microcontroller DSP; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 106.

Figure 107:
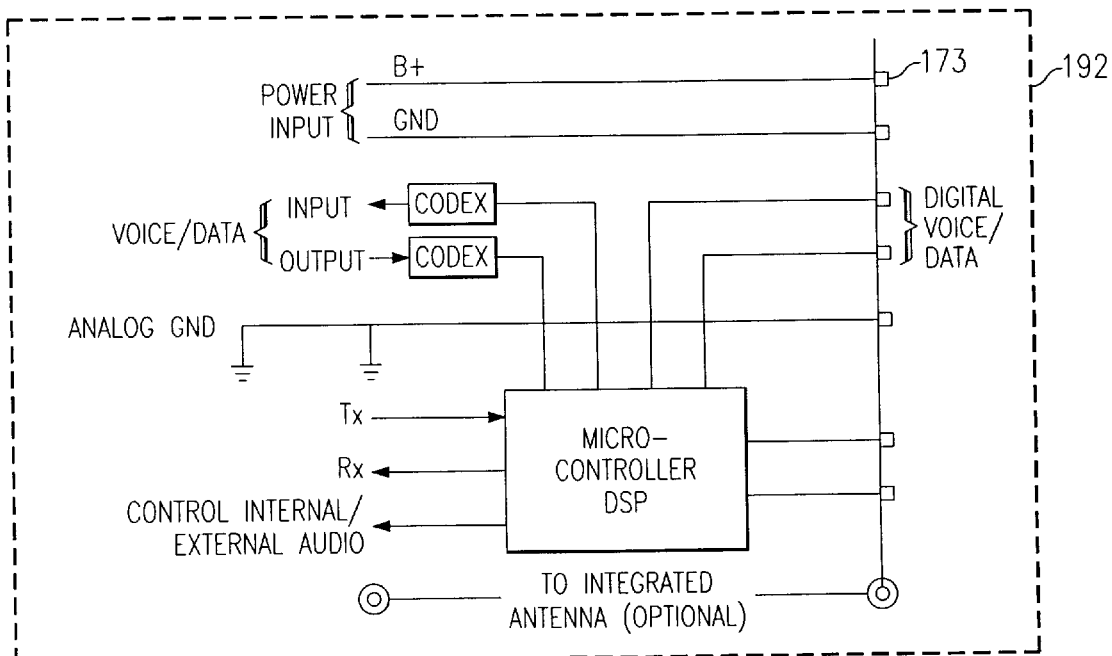
Figure 108:
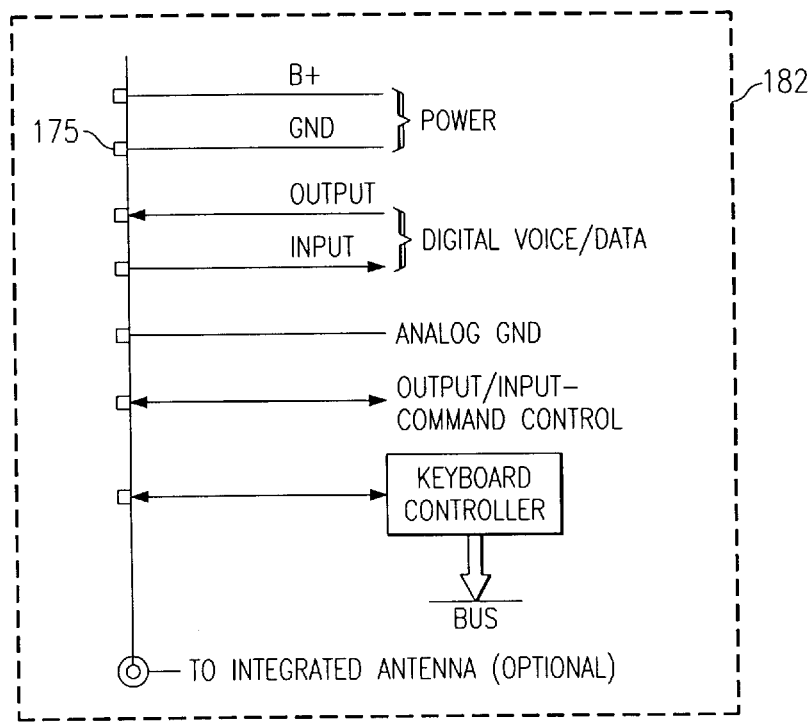
Figure 109:
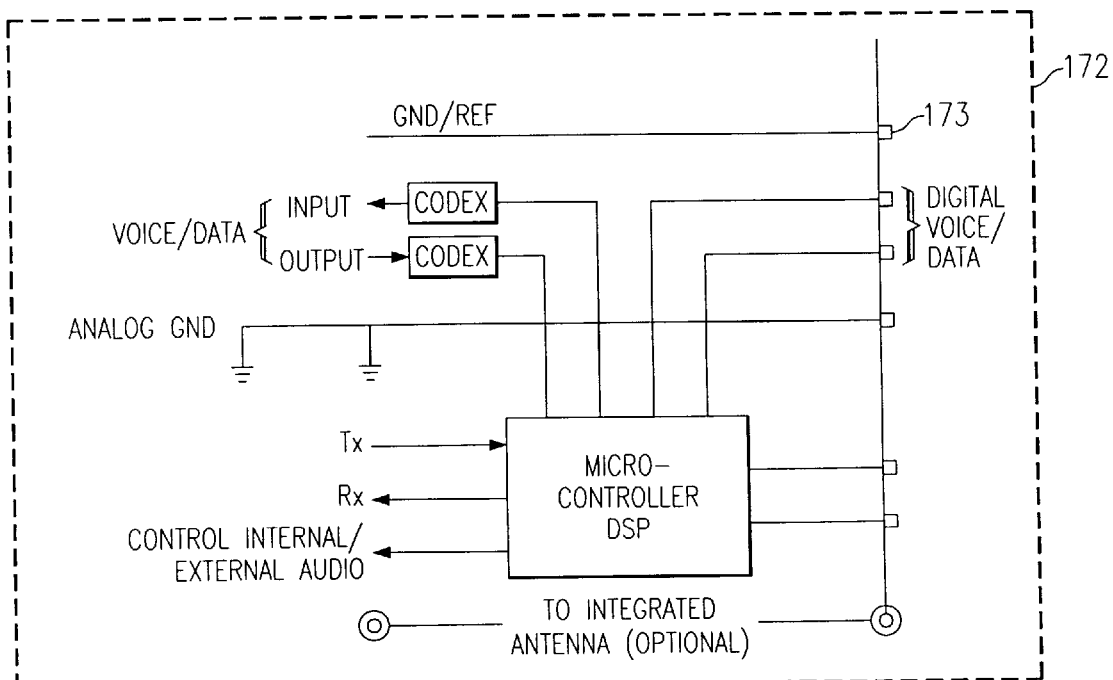
Figure 110:
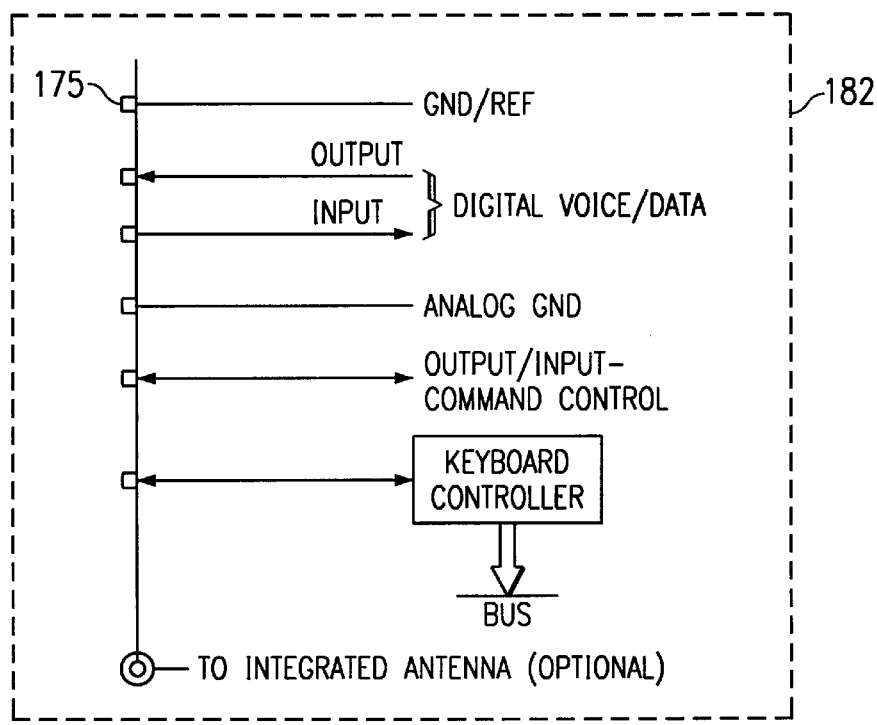

In the embodiment of the invention illustrated in FIG. 107, computer/portable telephone interface 172 comprises: power leads for charging the portable telephone's battery(s) while connected to the computer; two codex circuits for coupling two signal lines (voice/data input and output) to a microcontroller DSP; an analog ground lead line; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 108. In the embodiment of the invention illustrated in FIG. 109, computer/portable telephone interface 172 comprises: a ground/reference signal line; two codex circuits for coupling two signal lines (voice/data input and output) to a microcontroller DSP; an analog ground lead line; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 110.

Figure 111:
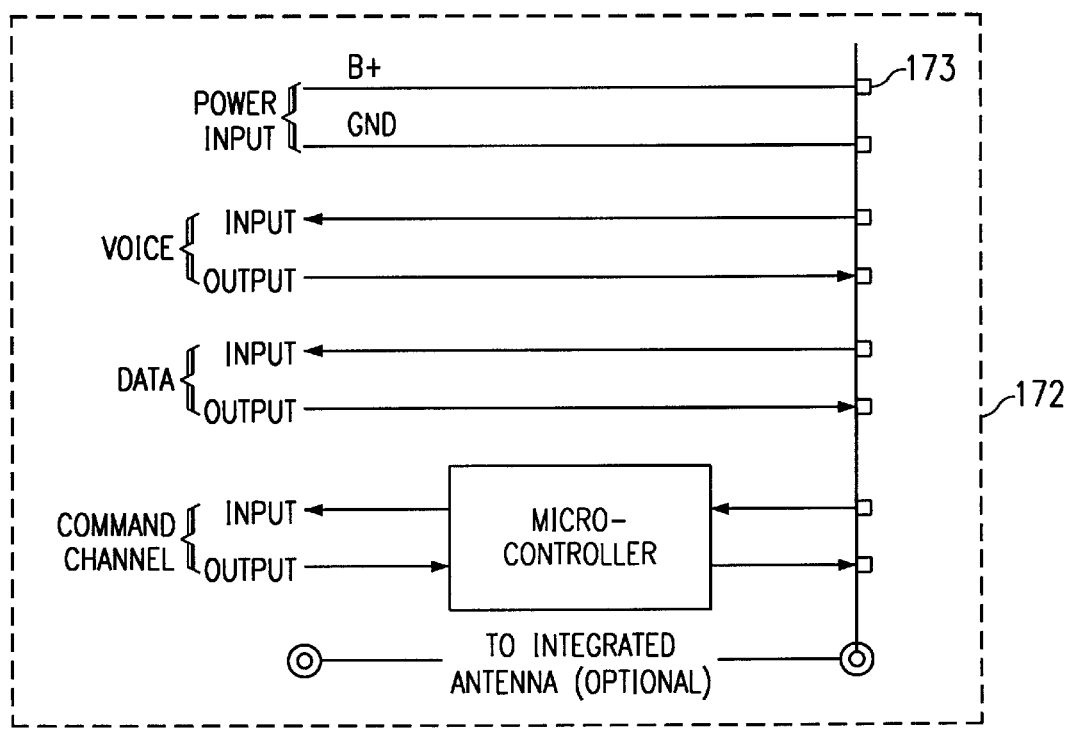
Figure 112:
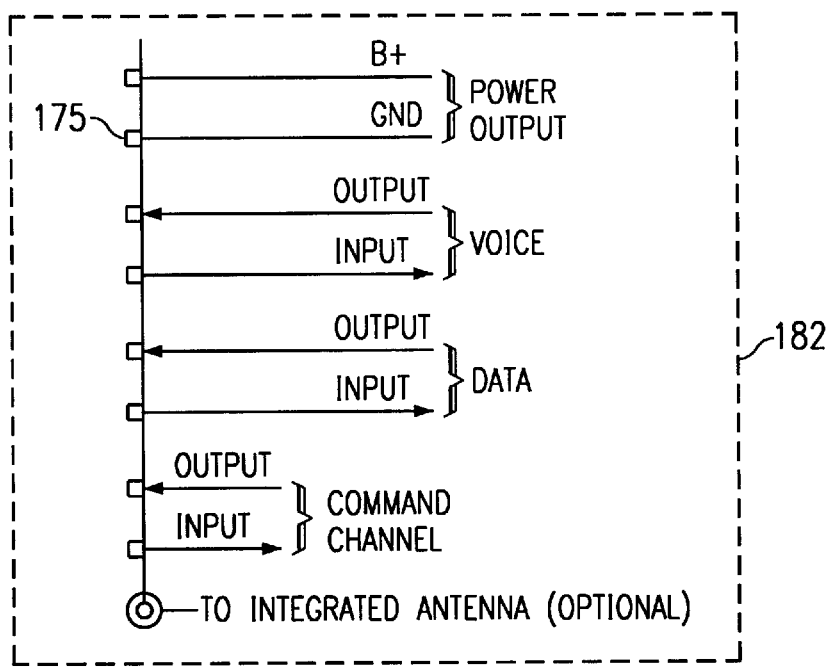
Figure 113:
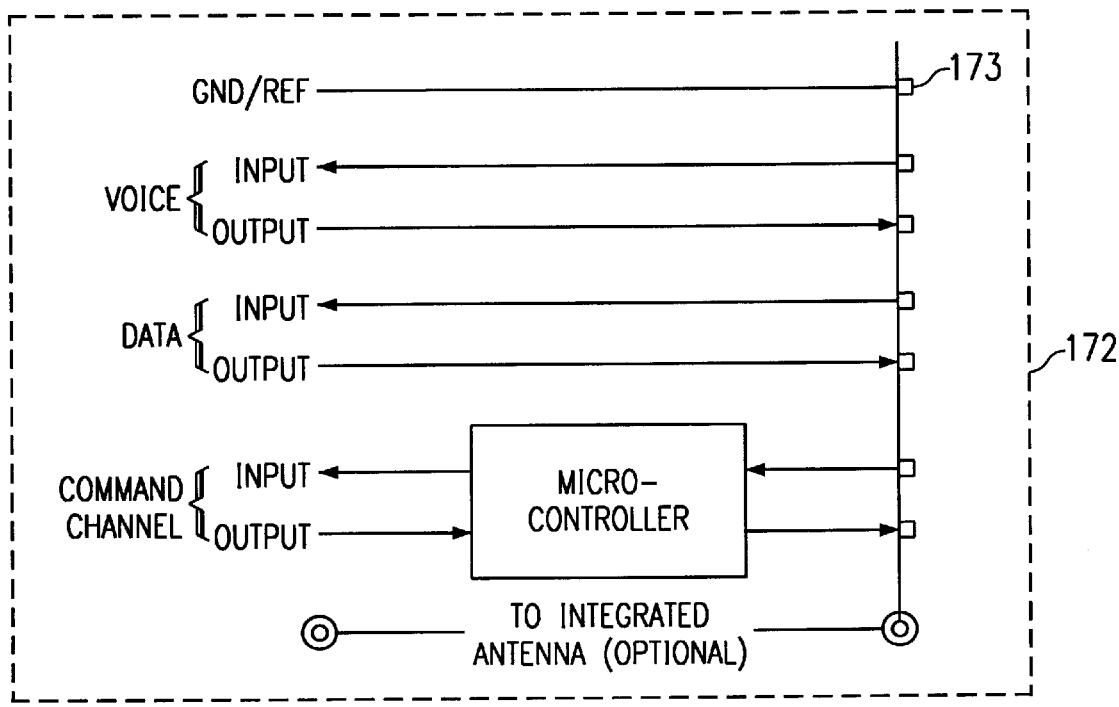
Figure 114:
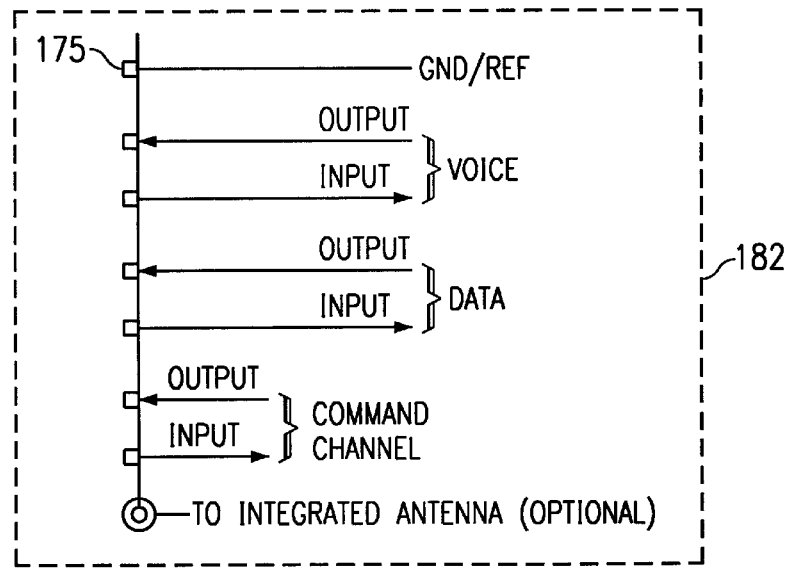

In the embodiment of the invention illustrated in FIG. 111, computer/portable telephone interface 172 comprises: power leads for charging the portable telephone's battery(s) while connected to the computer; two voice input and output signal lines for full duplex mode; two data input and output signal lines for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 112. In the embodiment of the invention illustrated in FIG. 113, computer/portable interface 172 comprises: a ground/reference signal line; two voice input and output signal lines for full duplex mode; two data input and output signal lines for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 114.

Figure 115:
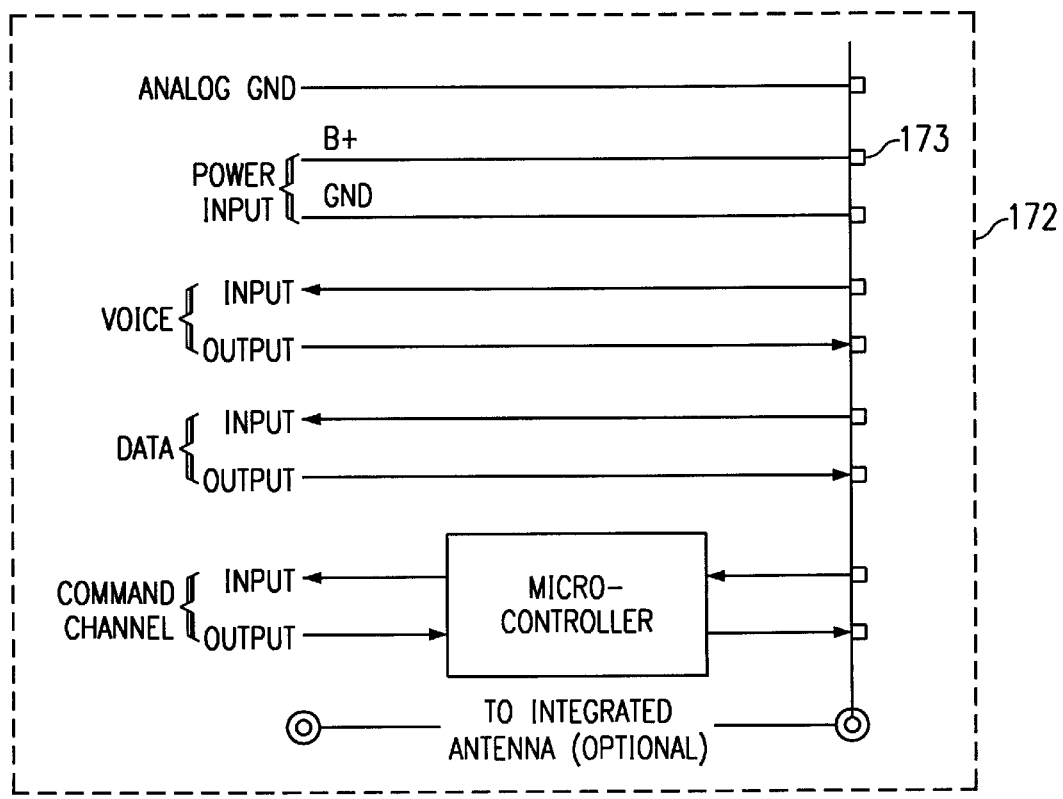
Figure 116:
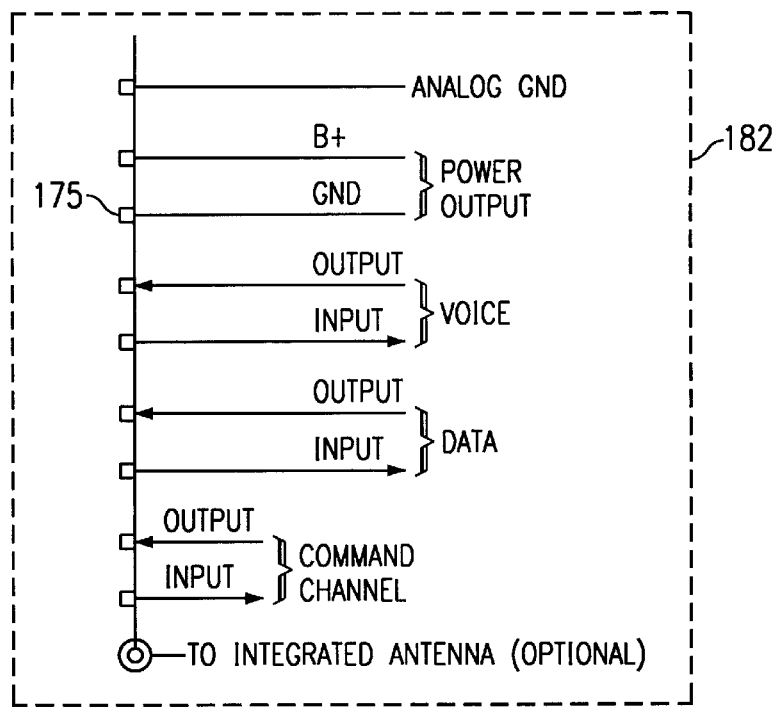
Figure 117:
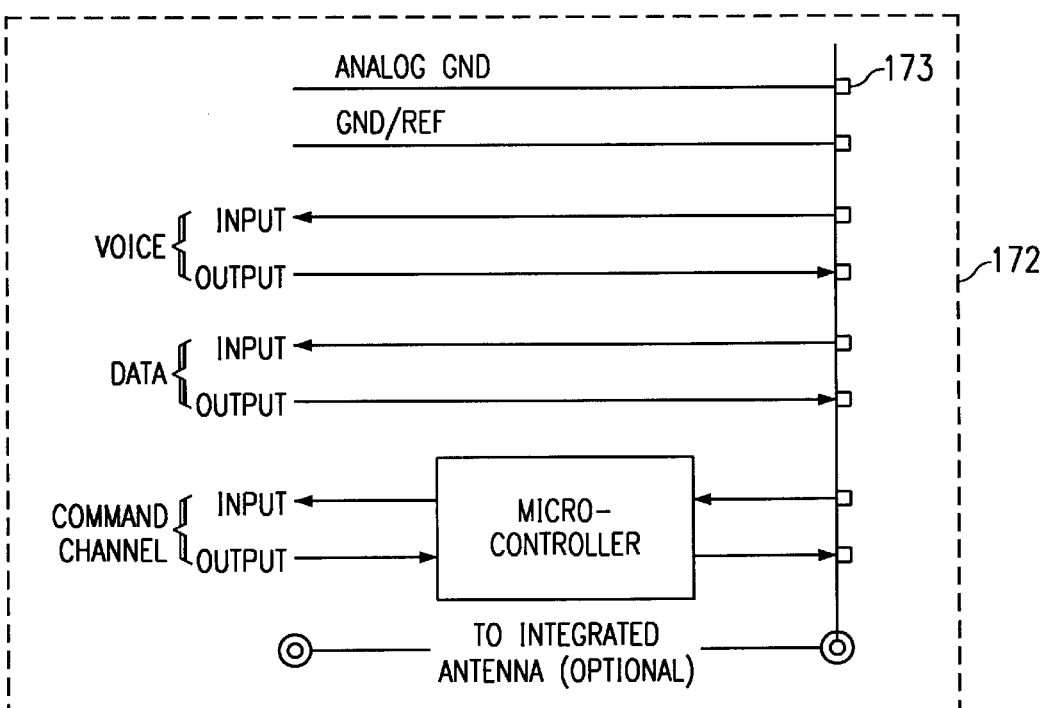
Figure 118:
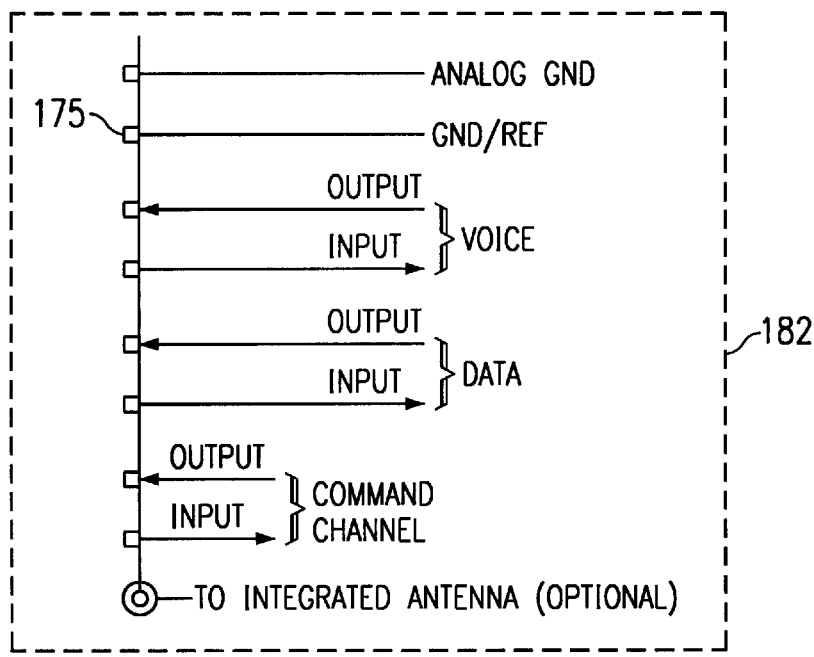
Figure 119:
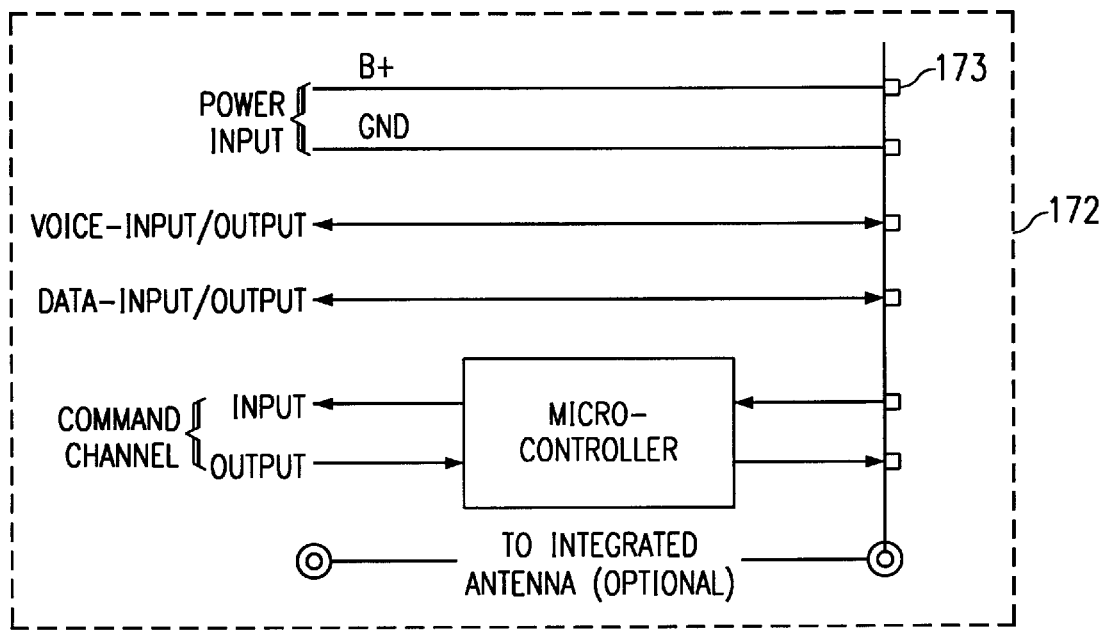

In the embodiment of the invention illustrated in FIG. 115, computer/portable telephone interface 172 comprises: an analog ground lead line; power leads for charging the portable telephone's battery(s) while connected to the computer; two voice input and output signal lines for full duplex mode; two data input and output signal lines for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 116. In the embodiment of the invention illustrated in FIG. 117, computer/portable interface 172 comprises: an analog ground lead line; a ground/reference signal line; two voice input and output signal lines for full duplex mode; two data input and output signal lines for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 118. Power leads are not necessary in embodiments of the invention where computer charging of the portable telephone's battery(s) is not desired.

Figure 120:
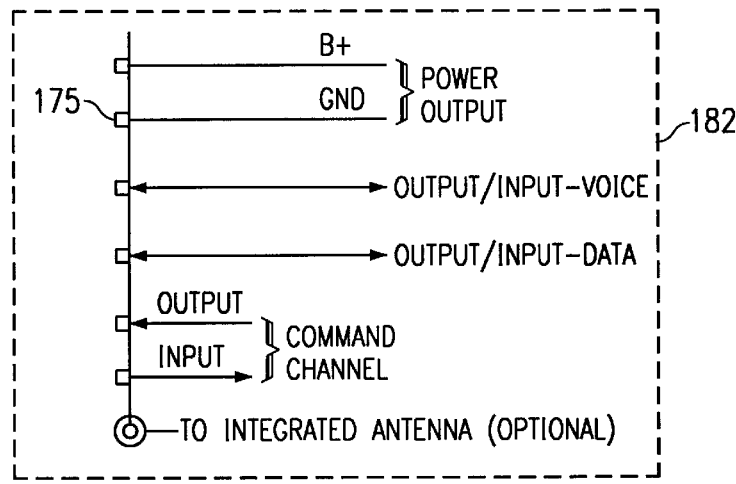
Figure 121:
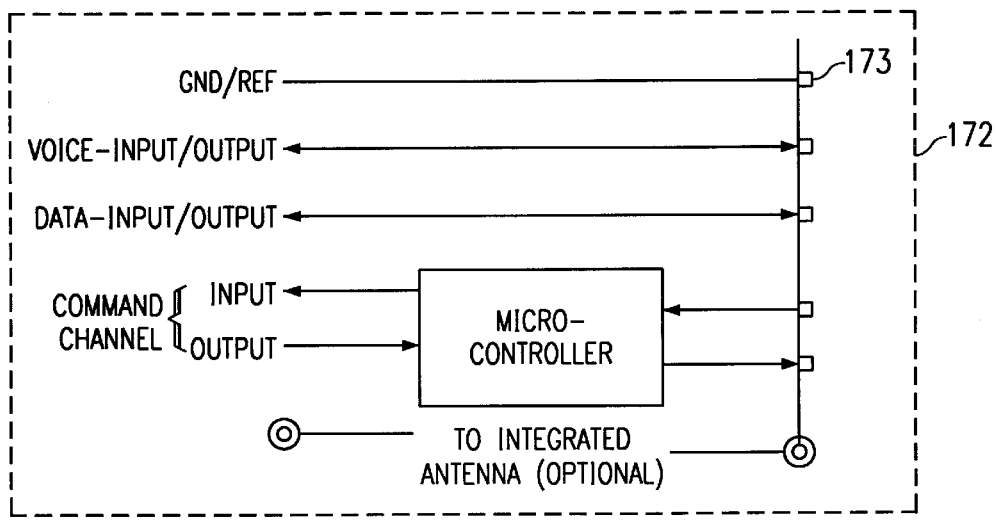
Figure 122:
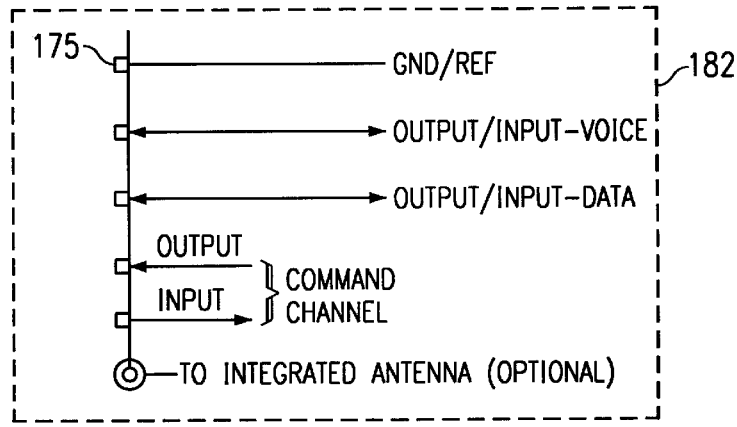

In the embodiment of the invention illustrated in FIG. 118, computer/portable interface 172 comprises: power leads for charging the portable telephone's battery(s) while connected to the computer; one voice input and output signal line for operating in a bidirectional half duplex mode and one data input and output signal line for operating in a bidirectional half duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 120. In the embodiment of the invention illustrated in FIG. 121, computer/portable interface 172 comprises: a ground/reference signal line; one voice input and output signal line for operating in a bidirectional half duplex mode and one data input and output signal line for operating in a bidirectional half duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 122. Power leads are not necessary in embodiments of the invention where computer charging of the portable telephone's battery(s) is not desired.

Figure 123:
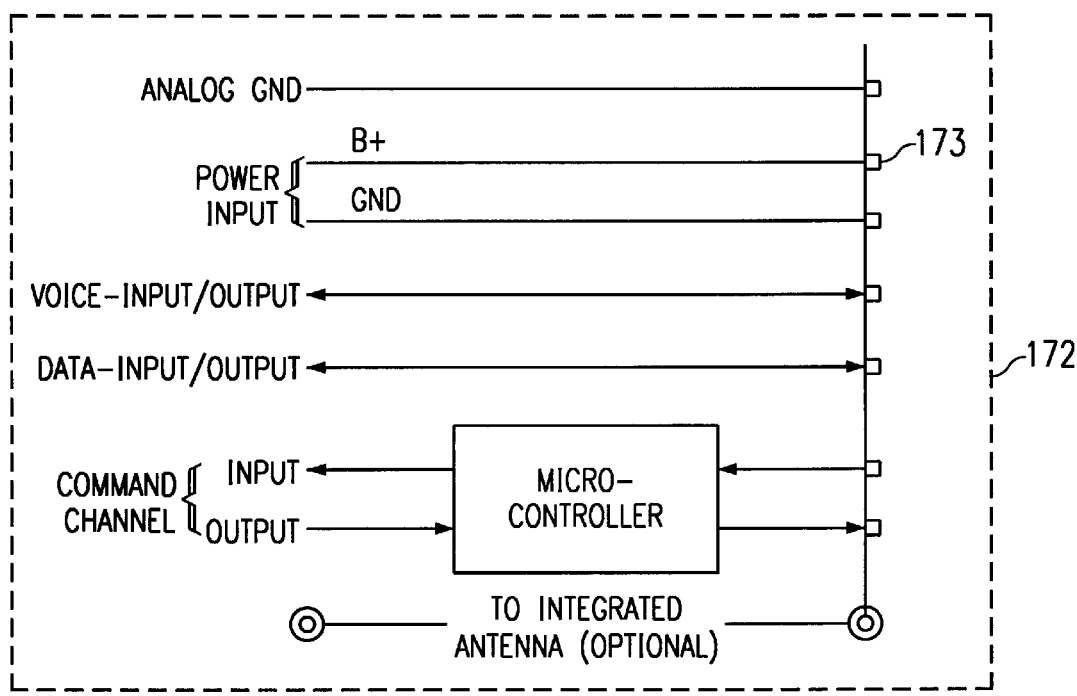
Figure 124:
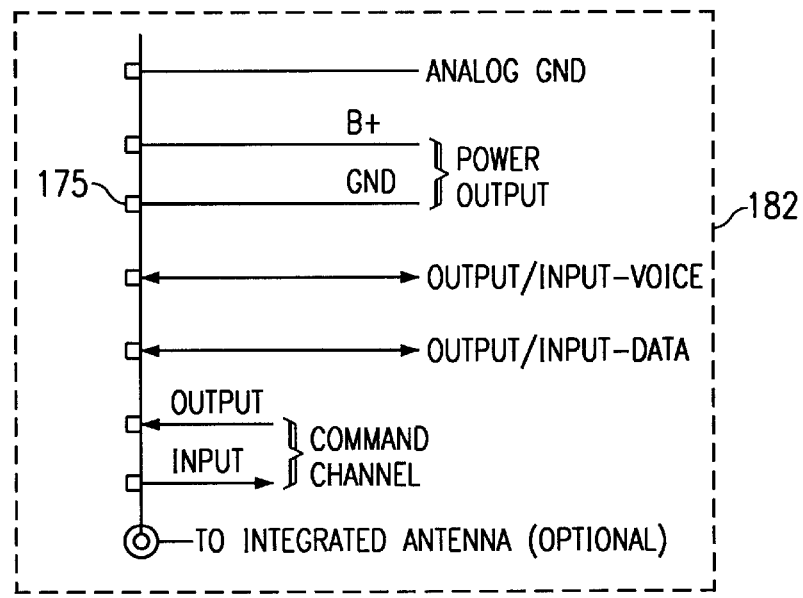
Figure 125:
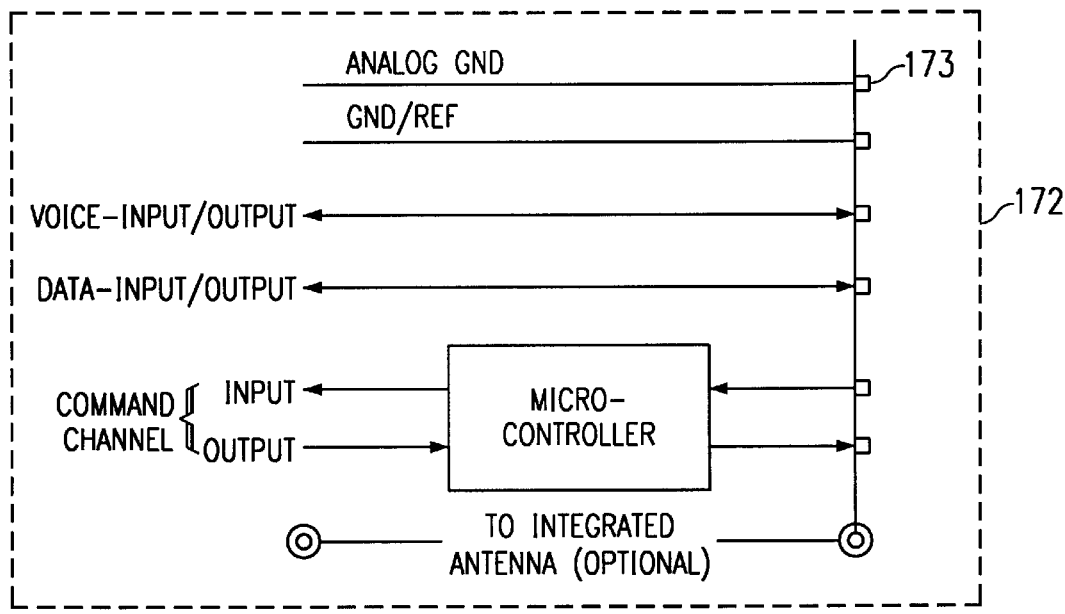
Figure 126:
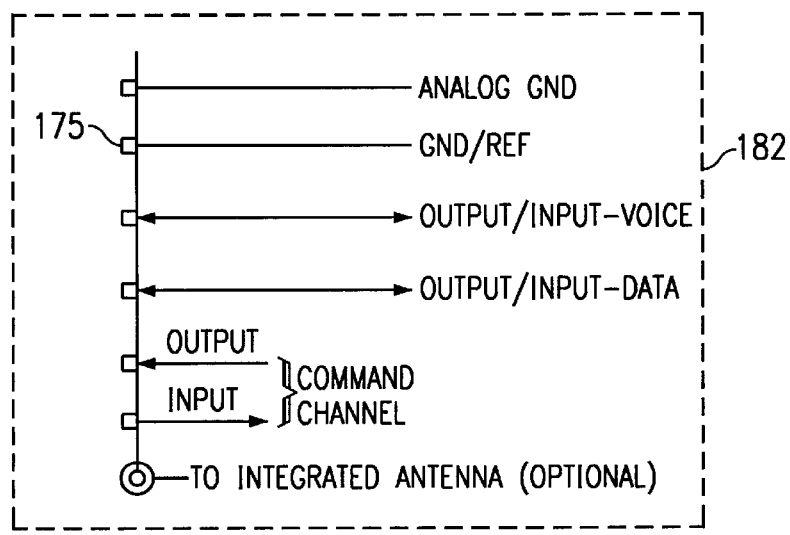

In the embodiment of the invention illustrated in FIG. 123, computer/portable telephone interface 172 comprises: an analog ground lead line; power leads for charging the portable telephone's battery(s) while connected to the computer; one voice input and output signal line for operating in a bidirectional half duplex mode and one data input and output signal line for operating in a bidirectional half duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 124. In the embodiment of the invention illustrated in FIG. 125, computer/portable interface 172 comprises: an analog ground lead line; a ground/reference signal line; one voice input and output signal line for operating in a bidirectional half duplex mode and one data input and output signal line for operating in a bidirectional half duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 126. Power leads are not necessary in embodiments of the invention where computer charging of the portable telephone's battery(s) is not desired.

Figure 127:
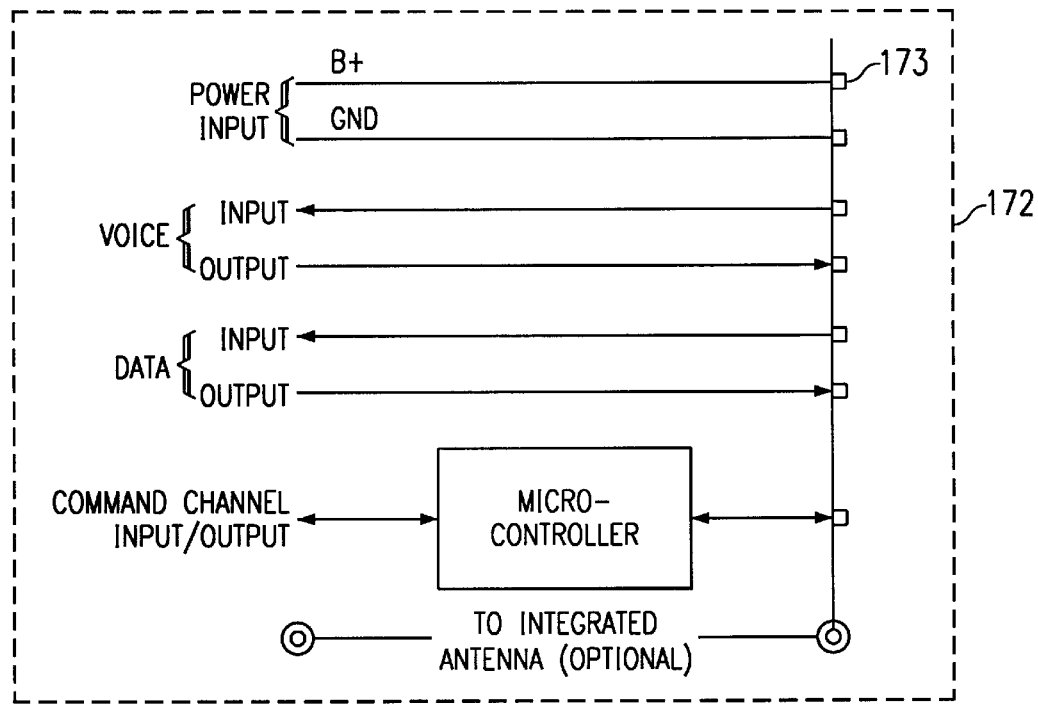
Figure 128:
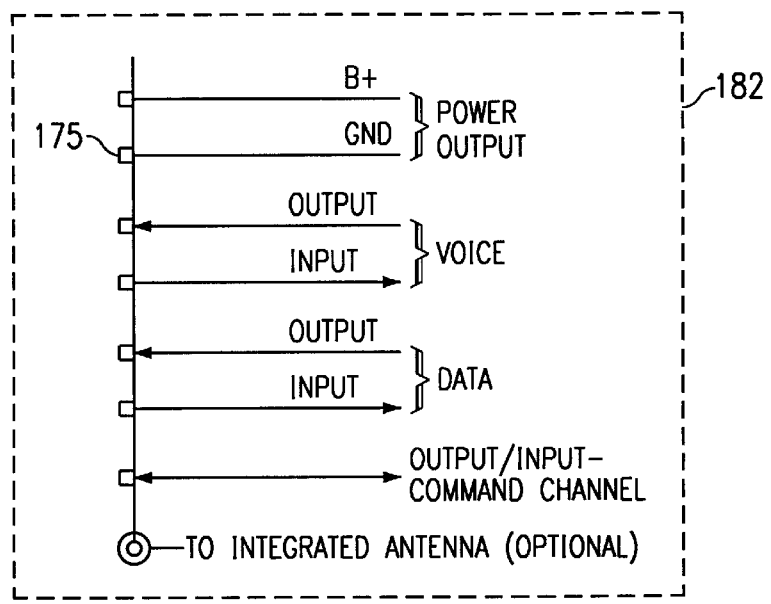
Figure 129:
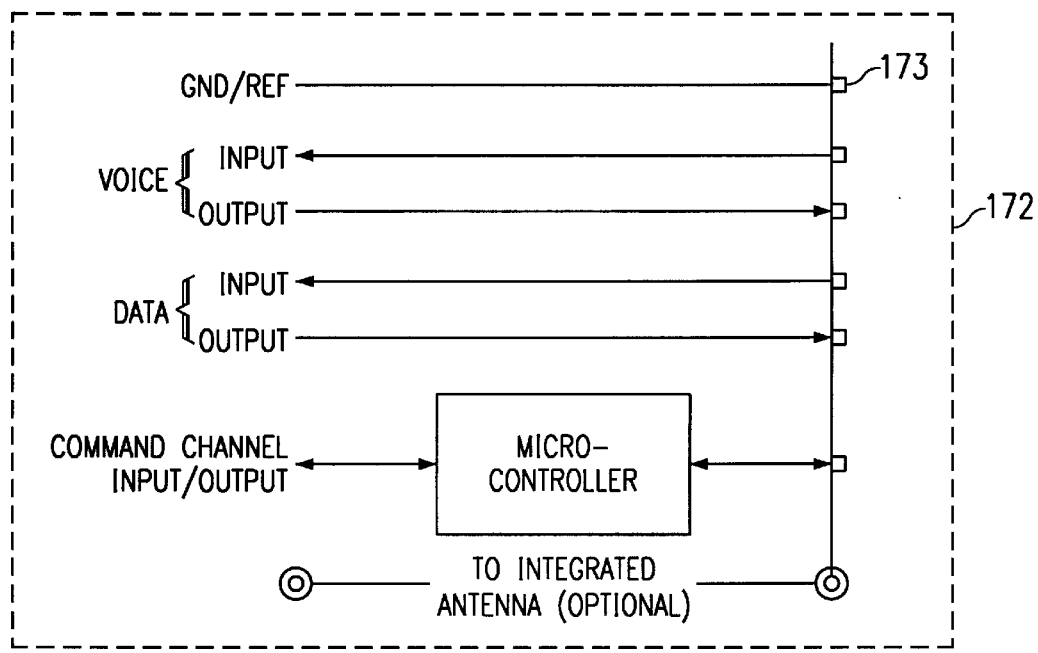
Figure 130:
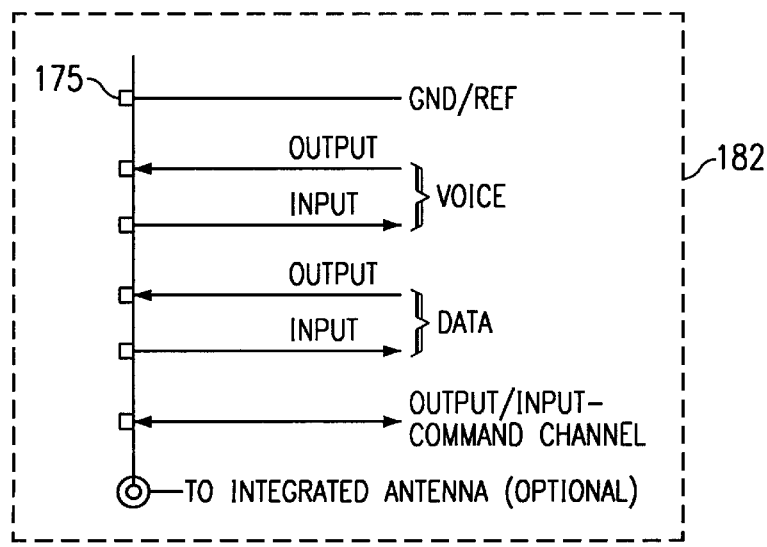

In the embodiment of the invention, illustrated in FIG. 127, computer/portable telephone interface 172 comprises: power leads for charging the portable telephone's battery(s) while connected to the computer; two voice input and output signal lines for full duplex mode; two data input and output signal lines for full duplex mode; a microcontroller having one input/output command channel lead line for operating in a bidirectional half duplex mode; a signal line (optional) for coupling to an antenna integrated in the computer; and electrical contacts for coupling the leads to corresponding electrical contacts and leads in computer/portable telephone interface 182 in portable computer 164, as illustrated in FIG. 128. In the embodiment of the invention illustrated in FIG. 129, computer/portable interface 172 comprises: a ground/reference signal line; two voice input and output signal lines for full duplex mode; two data input and output signal lines for full duplex mode; a microcontroller having one input/output command channel lead line for operating in a bidirectional half duplex mode; a signal line (optional) for coupling to an antenna integrated in the computer; and electrical contacts for coupling the leads to corresponding electrical contacts and leads in computer/portable telephone interface 182 in portable computer 164, as illustrated in FIG. 130. Power leads are not necessary in embodiments of the invention where computer charging of the portable telephone's battery(s) is not desired.

Figure 131:
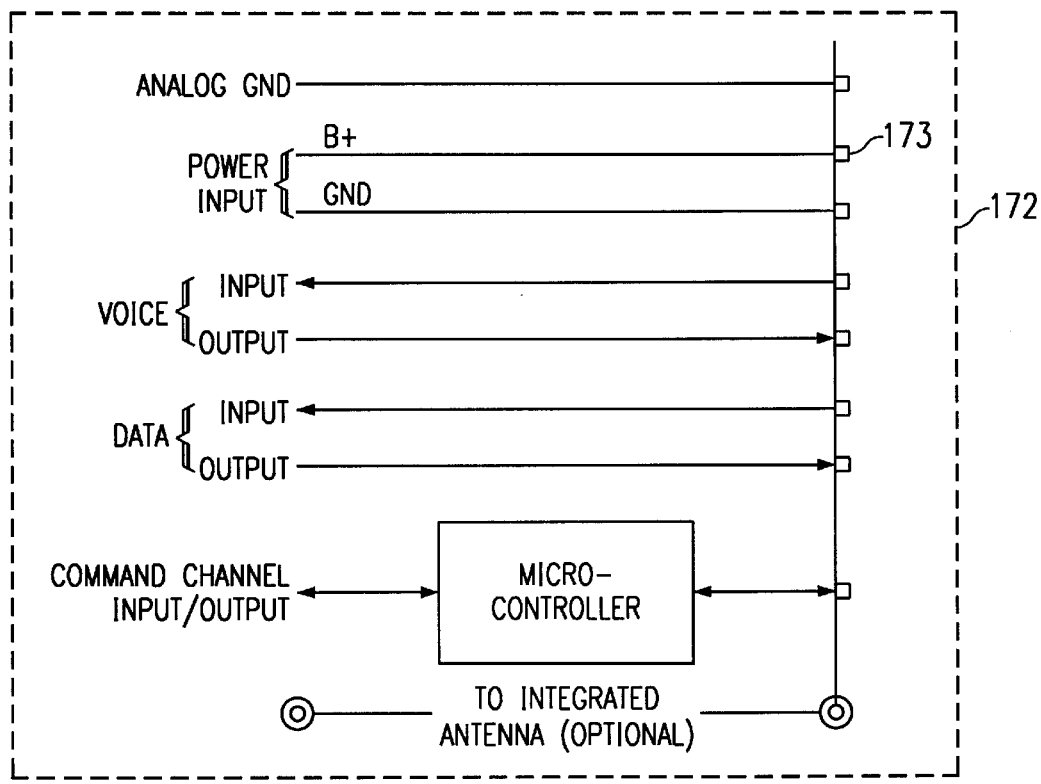
Figure 132:
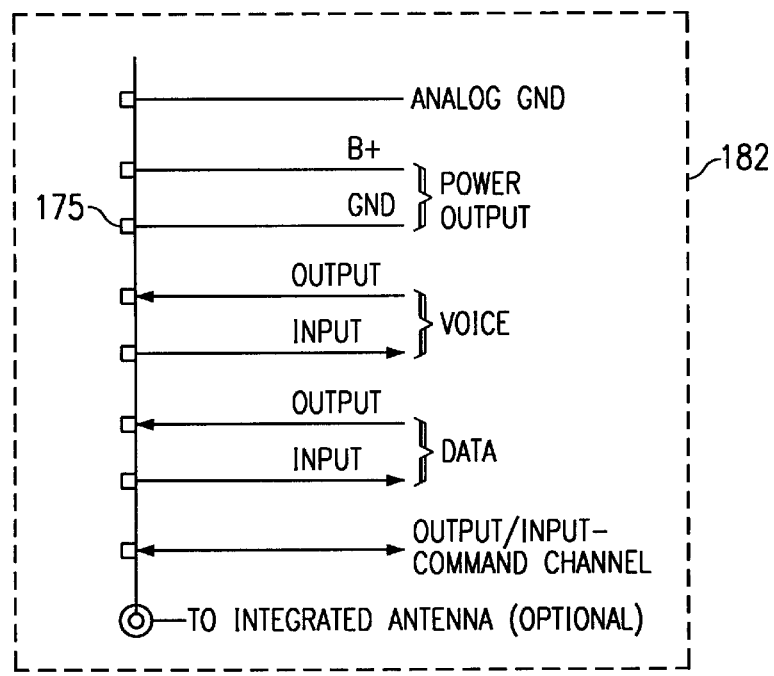
Figure 133:
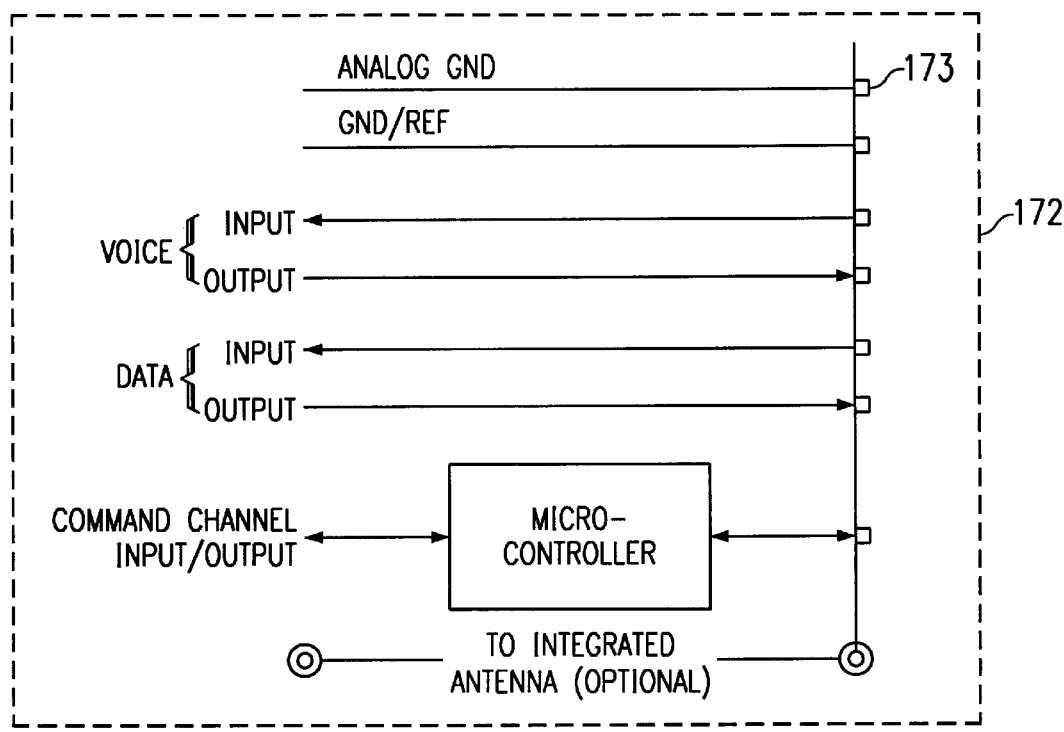
Figure 134:
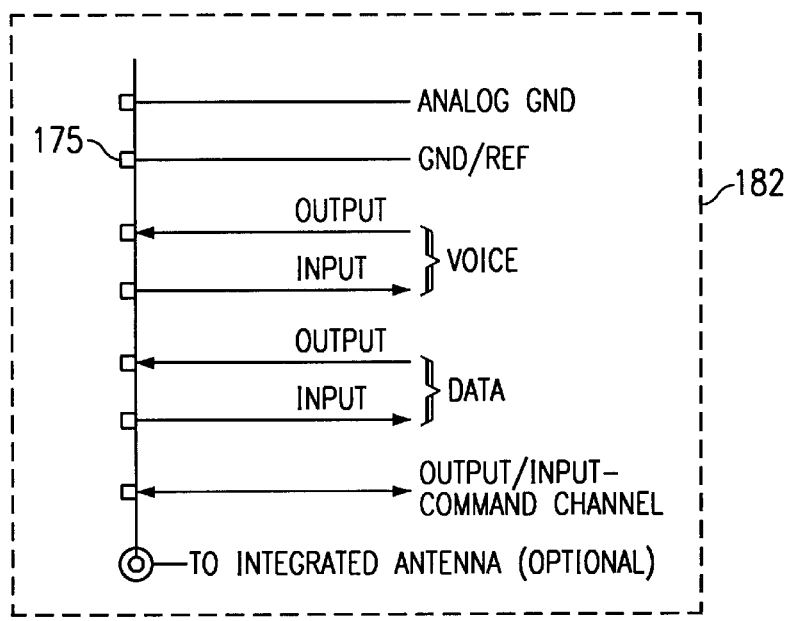

In the embodiment of the invention illustrated in FIG. 131, computer/portable telephone interface 172 comprises: an analog ground lead line; power leads for charging the portable telephone's battery(s) while connected to the computer; two voice input and output signal lines for full duplex mode; two data input and output signal lines for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 132. In the embodiment of the invention illustrated in FIG. 133, computer/portable interface 172 comprises: an analog ground lead line; a ground/reference signal line; two voice input and output signal lines for full duplex mode; two data input and output signal lines for full duplex mode; a microcontroller having input and output command channel leads; a signal line (optional) for coupling to an antenna integrated in the computer; and electrical contacts for coupling the leads to corresponding electrical contacts and leads in computer/portable telephone interface 182 in portable computer 164, as illustrated in FIG. 134.

Figure 135:
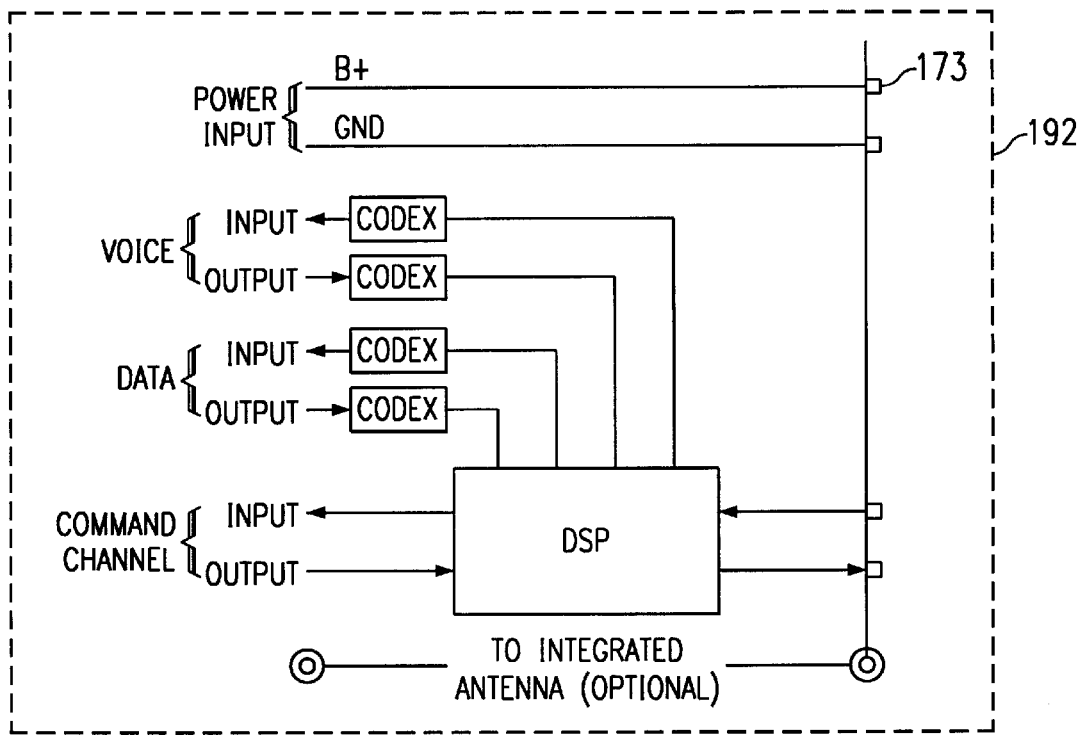
Figure 136:
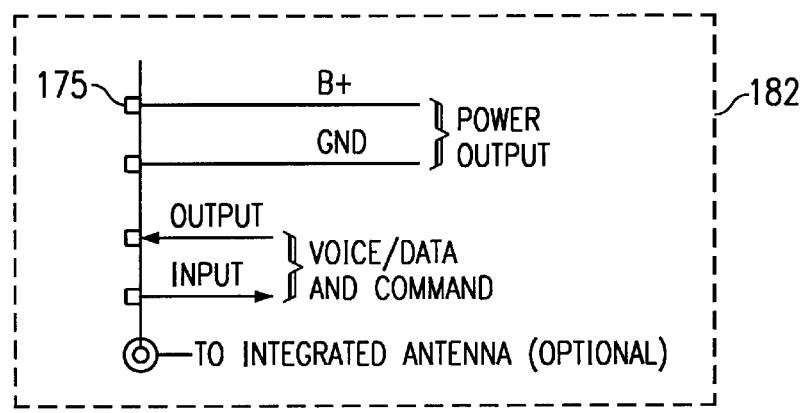
Figure 137:
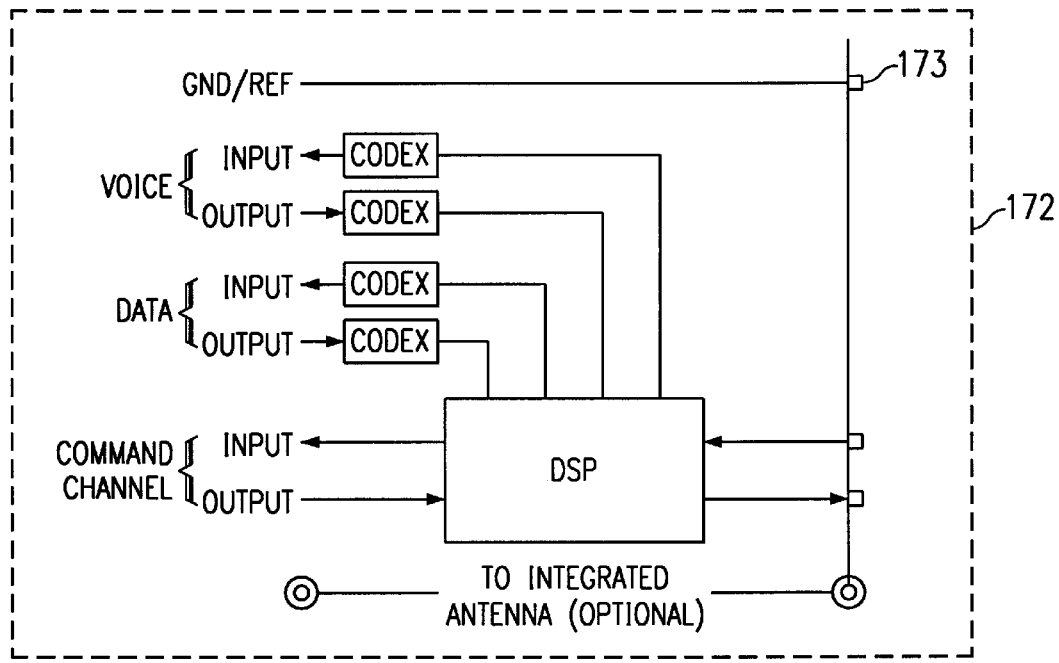
Figure 138:
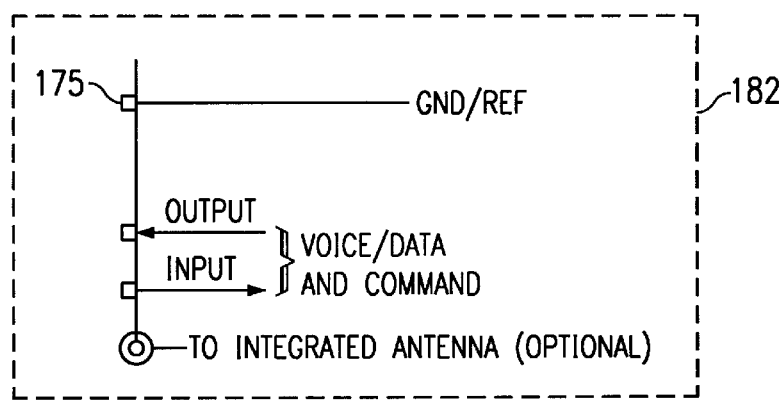

In the embodiment of the invention illustrated in FIG. 135, computer/portable telephone interface 172 comprises: power leads for charging the portable telephone's battery(s) while connected to the computer; two codex circuits for coupling two signal lines (voice input and output) to a digital signal processor (DSP); two codex circuits for coupling two signal lines (data input and output) to the digital signal processor; input and output command channel leads; a signal line (optional) for coupling to an antenna integrated in the computer; and electrical contacts for coupling the power leads and at least two input/output leads coupled to the DSP, to corresponding electrical contacts and leads in computer/portable telephone interface 182 in portable computer 164, as illustrated in FIG. 136. In the embodiment of the invention illustrated in FIG. 137, computer/portable interface 172 comprises: a ground/reference signal line; two codex circuits for coupling two signal lines (voice input and output) to a digital signal processor (DSP); two codex circuits for coupling two signal lines (data input and output) to the digital signal processor; input and output command channel leads; a signal line (optional) for coupling to an antenna integrated in the computer; and electrical contacts for coupling the power leads and at least two input/output leads coupled to the DSP, to corresponding electrical contacts and leads in computer/portable telephone interface 182 in portable computer 164, as illustrated in FIG. 138.

Figure 139:
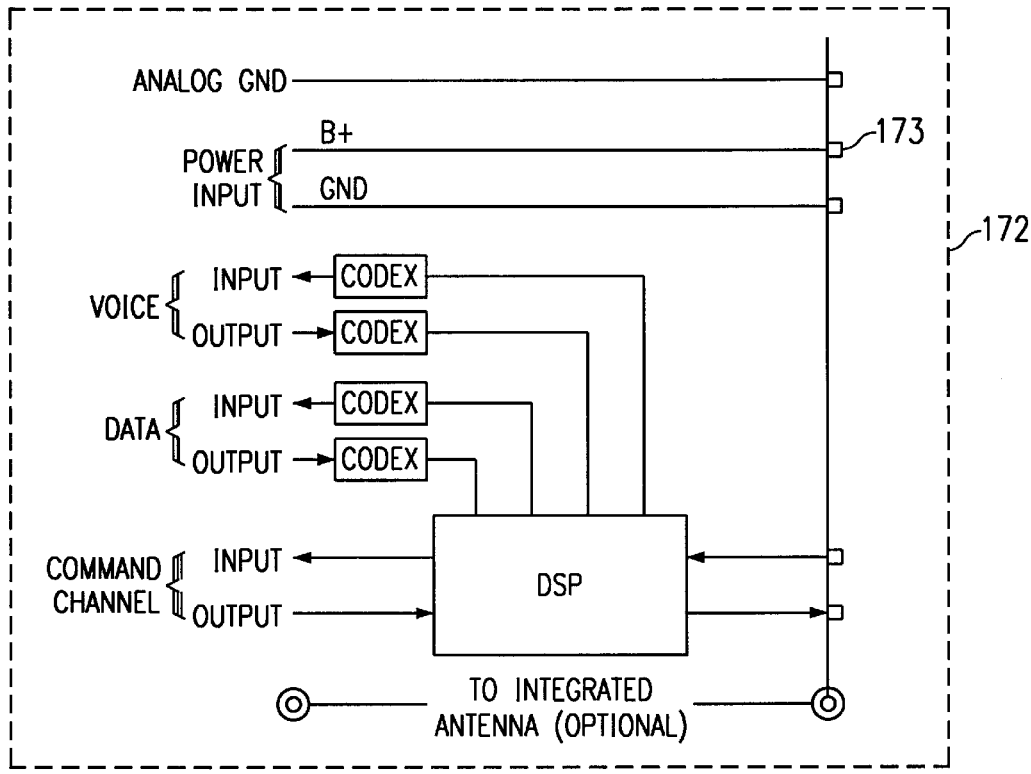
Figure 140:
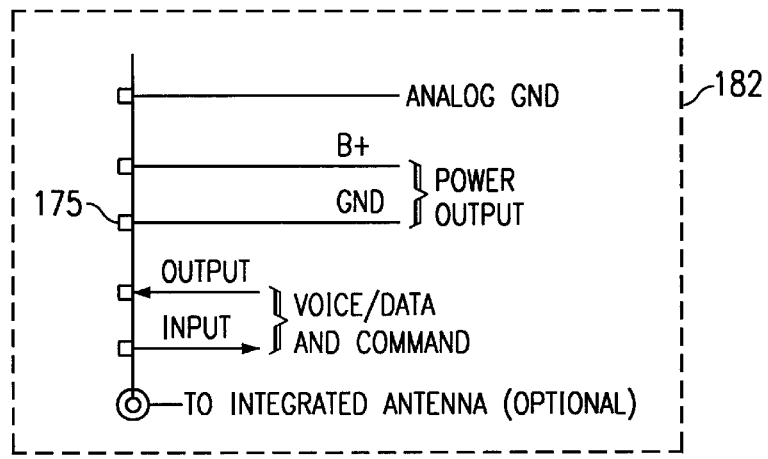
Figure 141:
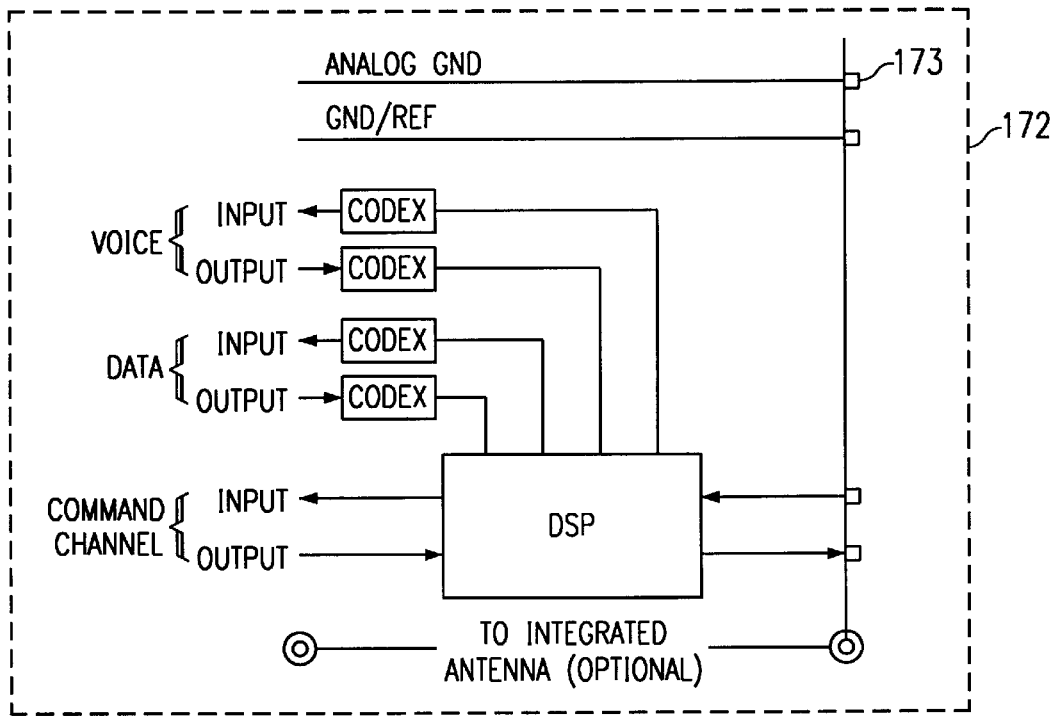
Figure 142:
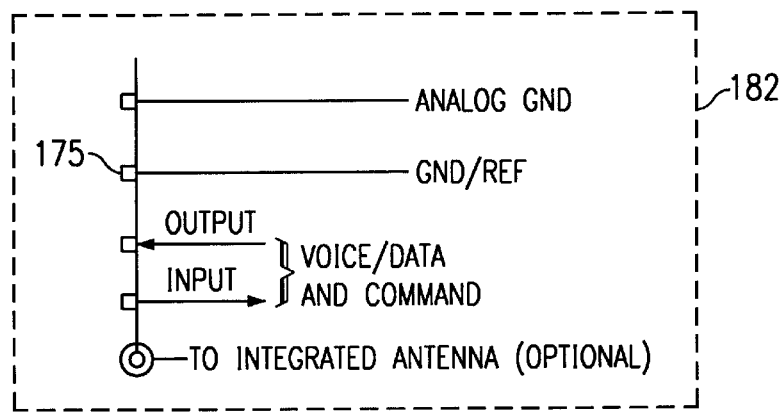

In the embodiment of the invention illustrated in FIG. 139, computer/portable telephone interface 172 comprises: an analog ground lead line; two codex circuits for coupling two signal lines (voice input and output) to a digital signal processor (DSP); two codex circuits for coupling two signal lines (data input and output) to the digital signal processor; input and output command channel leads; a signal line (optional) for coupling to an antenna integrated in the computer; and electrical contacts for coupling the power leads and at least two input/output leads coupled to the DSP, to corresponding electrical contacts and leads in computer/portable telephone interface 182 in portable computer 164, as illustrated in FIG. 140. In the embodiment of the invention illustrated in FIG. 141, computer/portable interface 172 comprises: an analog ground lead line; a ground/reference signal line; two codex circuits for coupling two signal lines (voice input and output) to a digital signal processor (DSP); two codex circuits for coupling two signal lines (data input and output) to the digital signal processor; input and output command channel leads; a signal line (optional) for coupling to an antenna integrated in the computer; and electrical contacts for coupling the power leads and at least two input/output leads coupled to the DSP, to corresponding electrical contacts and leads in computer/portable telephone interface 182 in portable computer 164, as illustrated in FIG. 142. Power leads are not necessary in embodiments of the invention where computer charging of the portable telephone's battery(s) is not desired.

Figure 143:
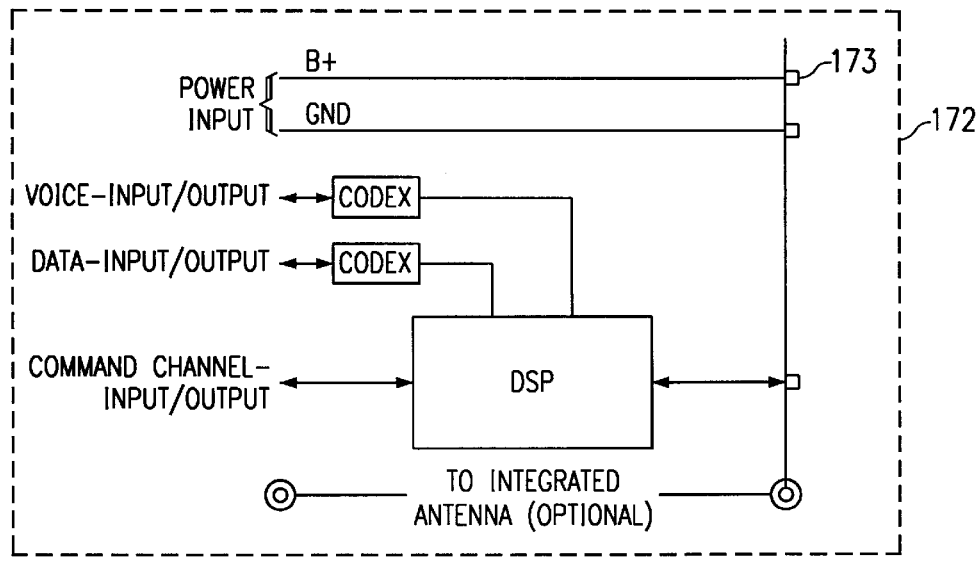
Figure 144:
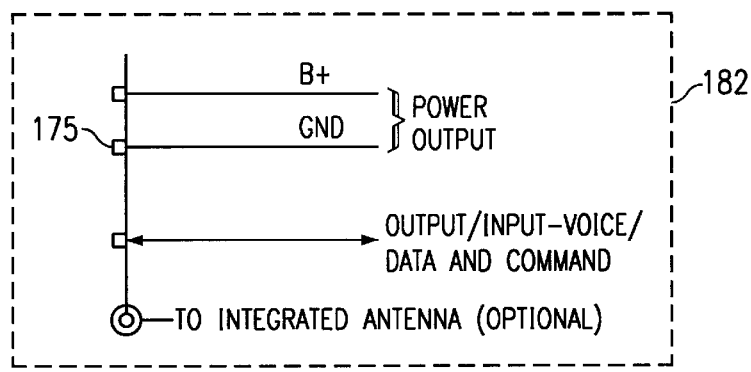
Figure 145:
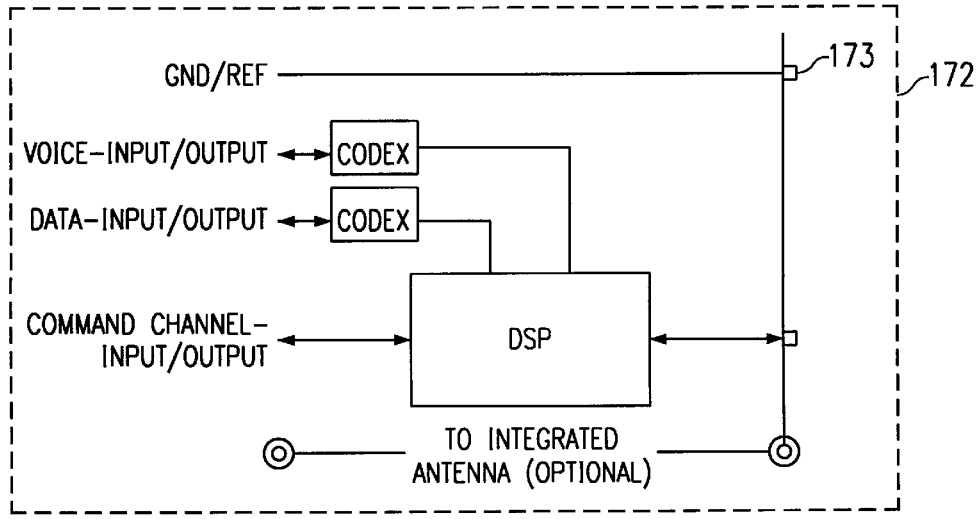
Figure 146:
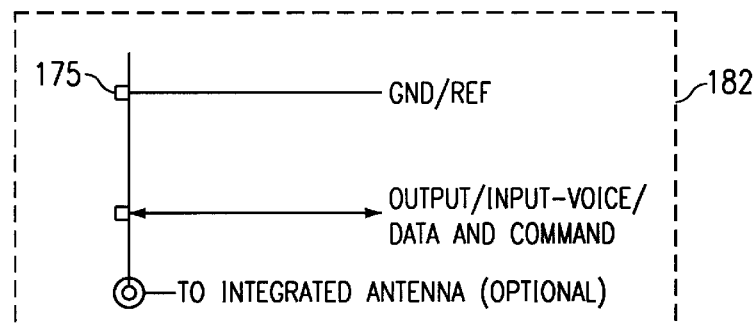

In the embodiment of the invention illustrated in FIG. 143, computer/portable interface 172 comprises: power leads for charging the portable telephone's battery(s) while connected to the computer; a codex circuit for coupling a signal line (voice input and output for operating in a bidirectional half duplex mode) to a digital signal processor (DSP); a codex circuit for coupling a signal line (data input and output for operating in a bidirectional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts and leads in computer/portable telephone interface 182 in portable computer 164, as illustrated in FIG. 144. In the embodiment of the invention illustrated in FIG. 145, computer/portable interface 172 comprises: a ground/reference signal line; a codex circuit for coupling a signal line (voice input and output for operating in a bidirectional half duplex mode) to a digital signal processor (DSP); a codex circuit for coupling a signal line (data input and output for operating in a bidirectional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts and leads in computer/portable telephone interface 182 in portable computer 164, as illustrated in FIG. 146.

Figure 147:
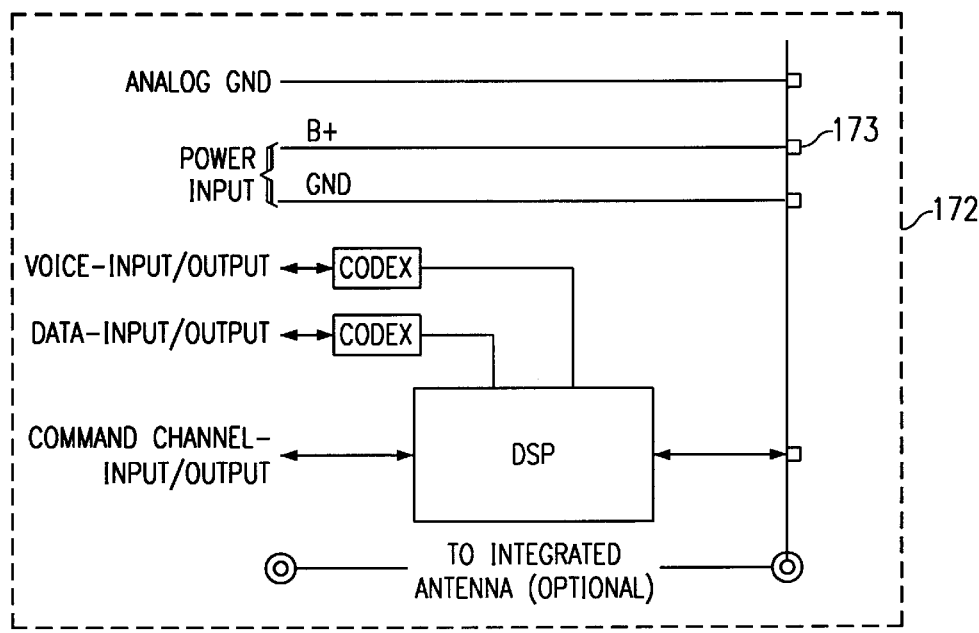
Figure 148:
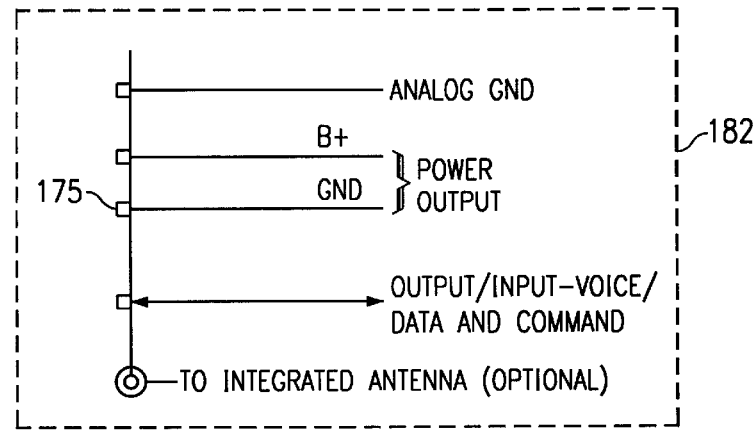
Figure 149:
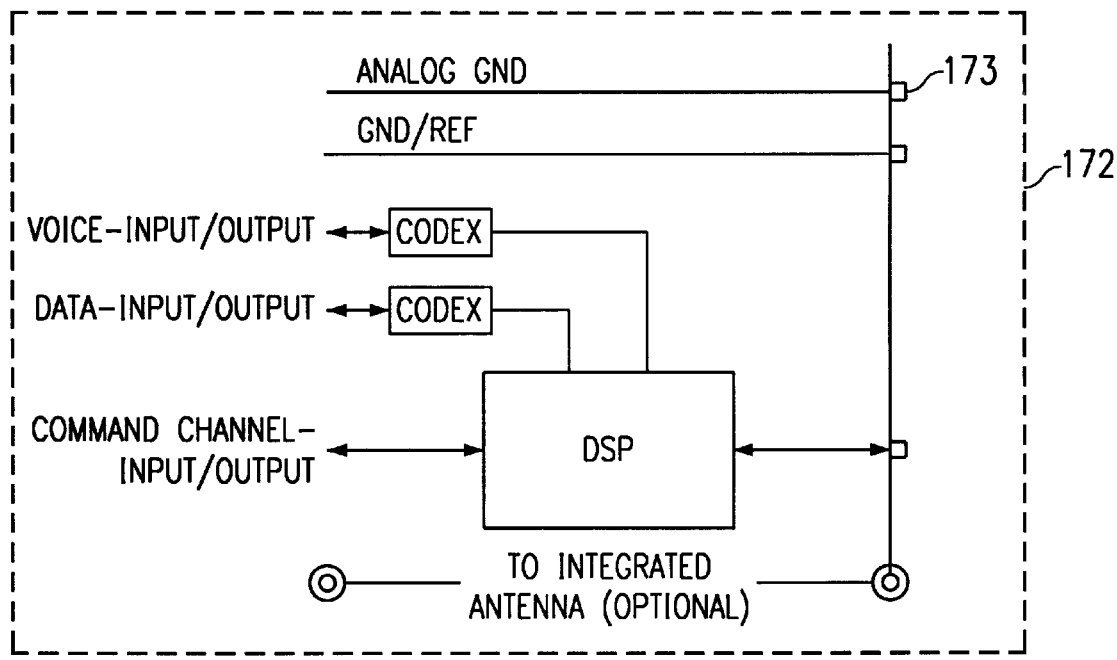
Figure 150:
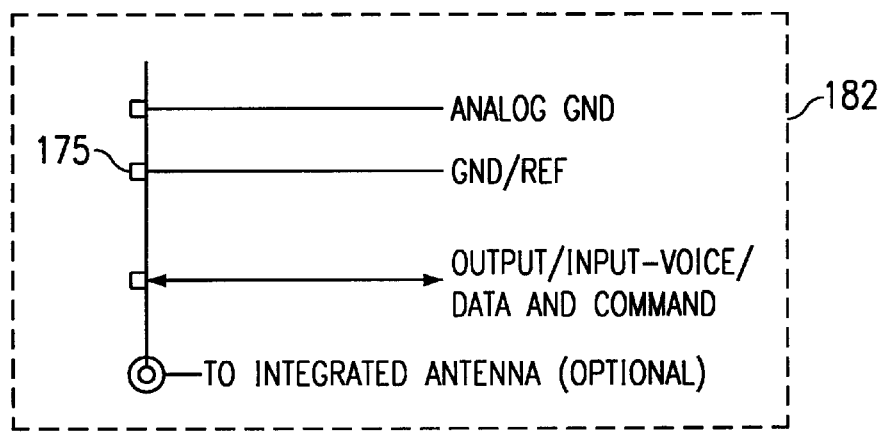

In the embodiment of the invention illustrated in FIG. 147, computer/portable interface 172 comprises: an analog ground lead line; power leads for charging the portable telephone's battery(s) while connected to the computer; a codex circuit for coupling a signal line (voice input and output for operating in a bidirectional half duplex mode) to a digital signal processor (DSP); a codex circuit for coupling a signal line (data input and output for operating in a bidirectional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts and leads in computer/portable telephone interface 182 in portable computer 164, as illustrated in FIG. 148. In the embodiment of the invention illustrated in FIG. 149, computer/portable interface 172 comprises: an analog ground lead line; a ground/reference signal line; a codex circuit for coupling a signal line (voice input and output for operating in a bidirectional half duplex mode) to a digital signal processor (DSP); a codex circuit for coupling a signal line (data input and output for operating in a bidirectional half duplex mode) to a digital signal processor (DSP); an input and output command channel lead; a signal line (optional) for coupling to an antenna integrated in the computer; and electrical contacts for coupling the power leads and the input/output lead coupled to the DSP, to corresponding electrical contacts and leads in computer/portable telephone interface 182 in portable computer 164, as illustrated in FIG. 150.

Figure 151:
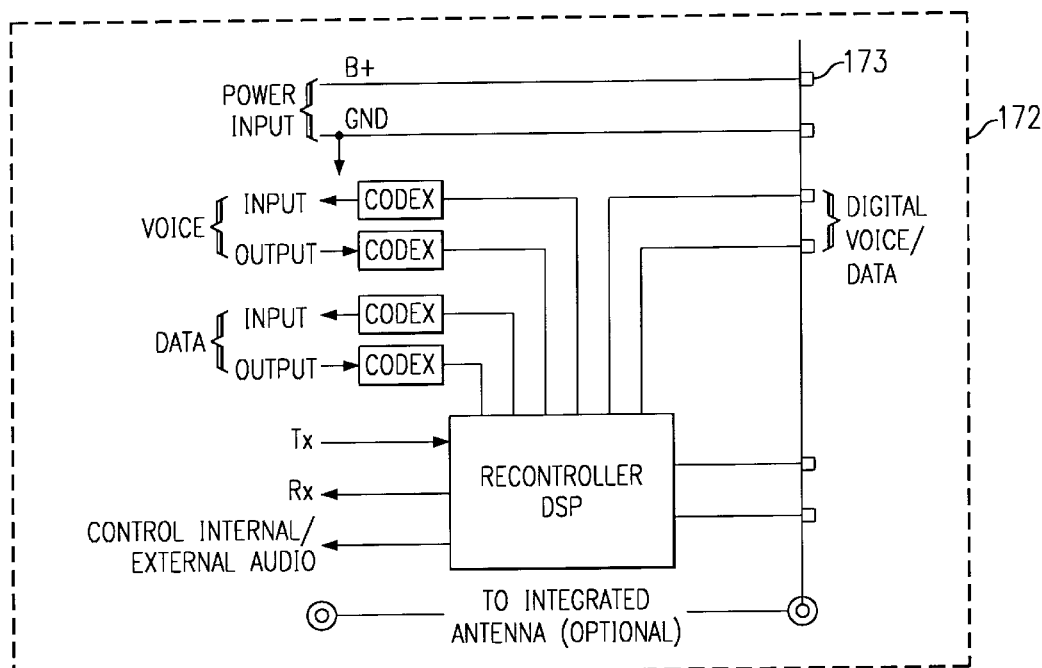
Figure 152:
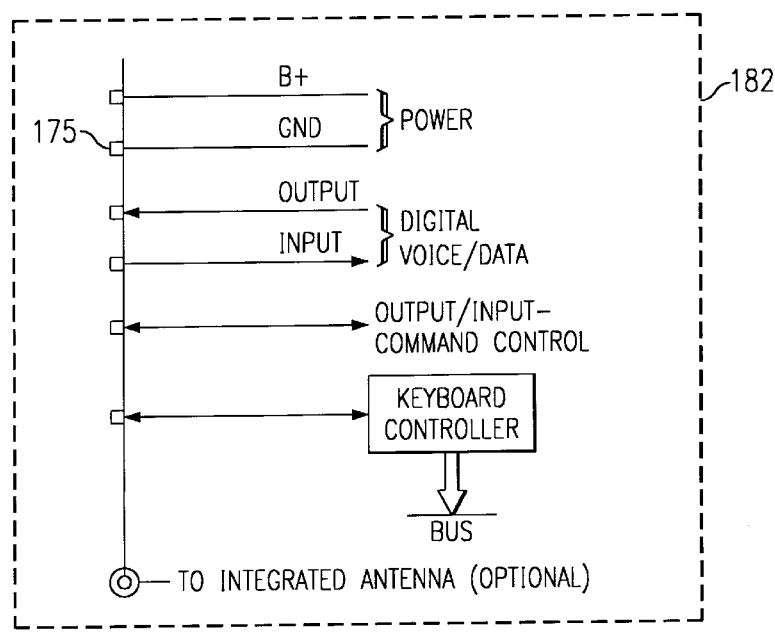
Figure 153:
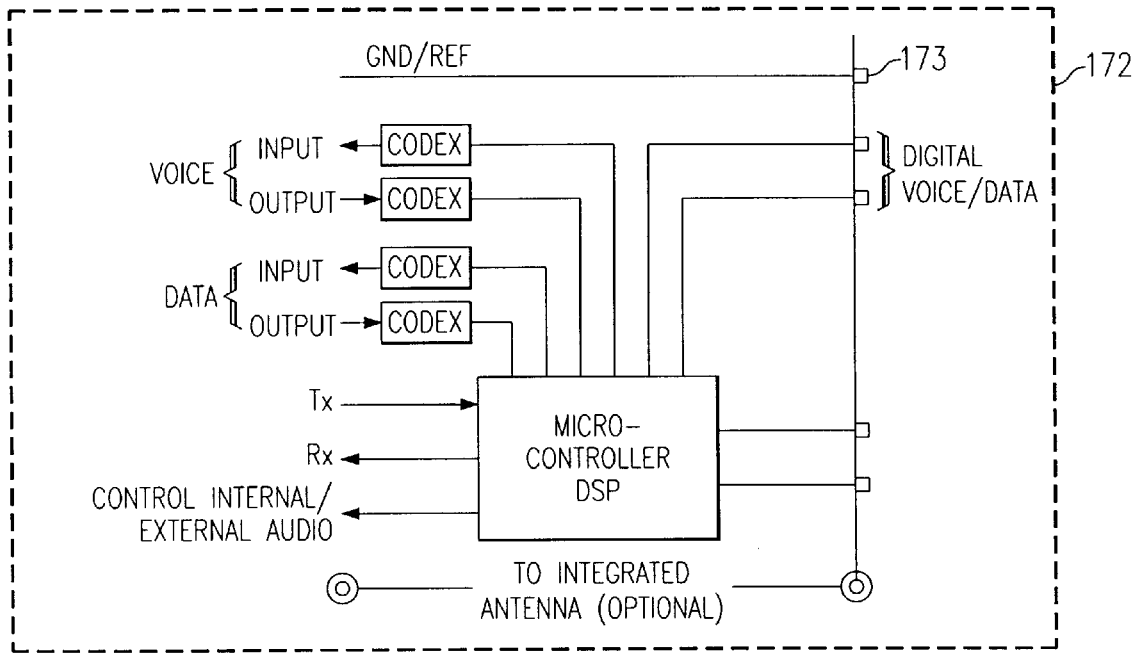
Figure 154:
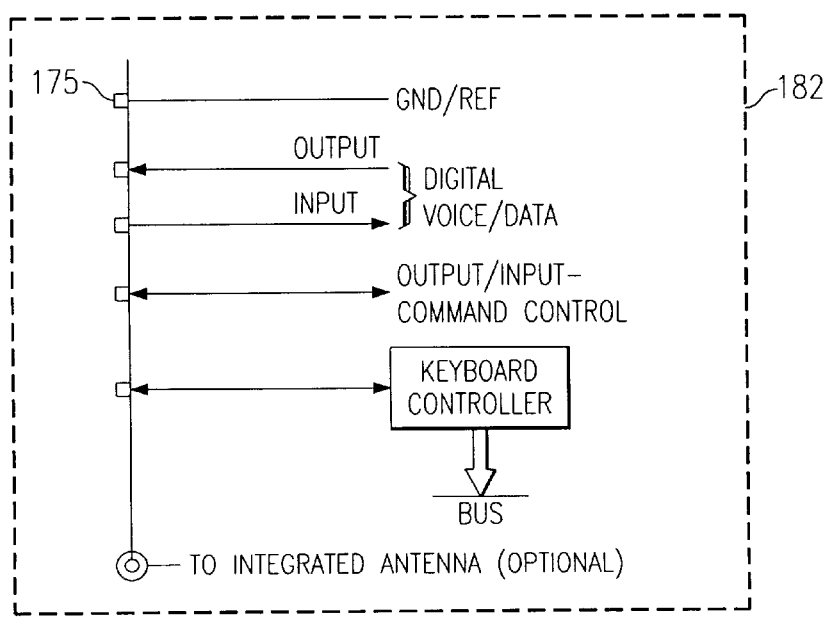

In the embodiment of the invention illustrated in FIG. 151, computer/portable telephone interface 172 comprises: power leads for charging the portable telephone's battery(s) while connected to the computer; two codex circuits for coupling two signal lines (voice input and output) to a microcontroller DSP; two codex circuits for coupling two signal lines (data input and output) to the microcontroller DSP; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 152. In the embodiment of the invention illustrated in FIG. 153, computer/portable telephone interface 172 comprises: a ground/reference signal line; two codex circuits for coupling two signal lines (voice input and output) to a microcontroller DSP; two codex circuits for coupling two signal lines (data input and output) to the microcontroller DSP; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 154.

Figure 155:
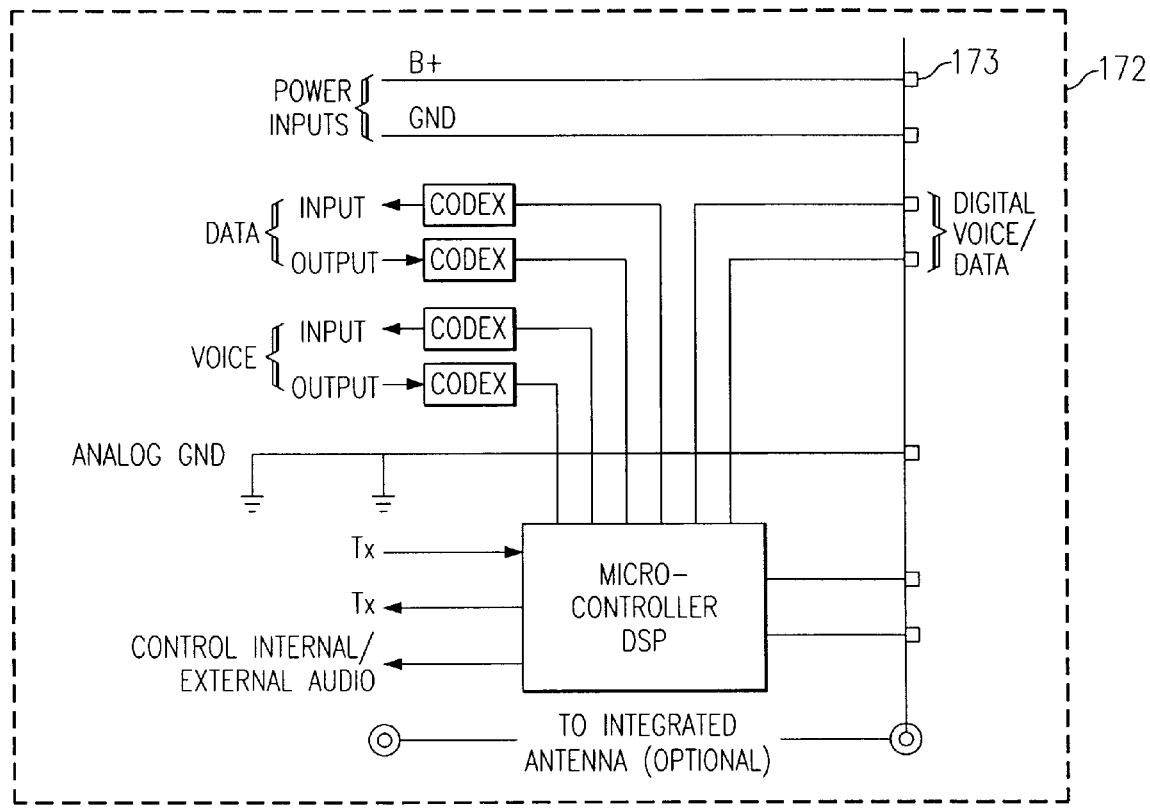
Figure 156:
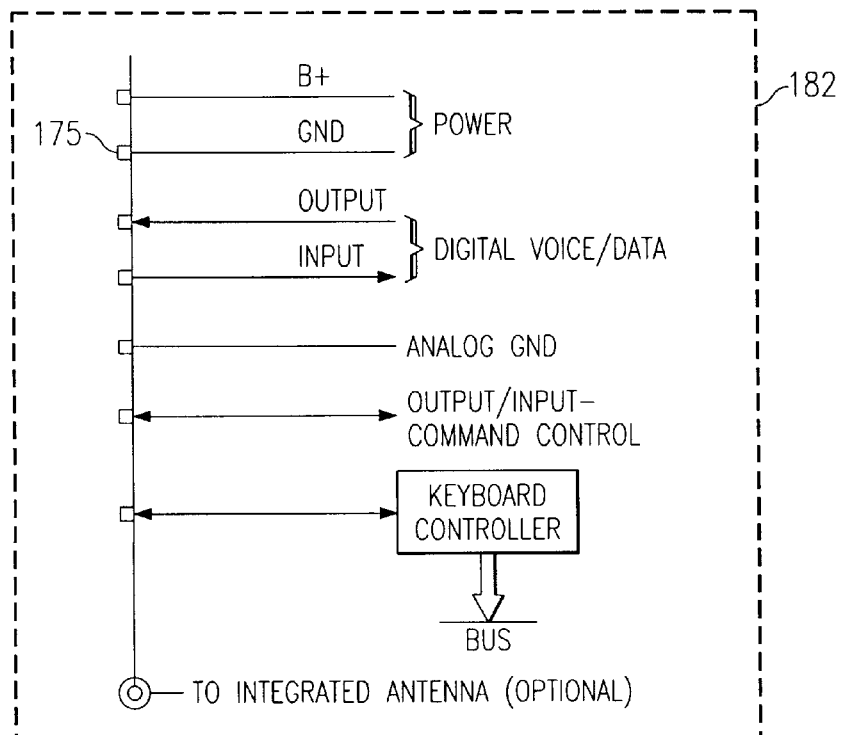
Figure 157:
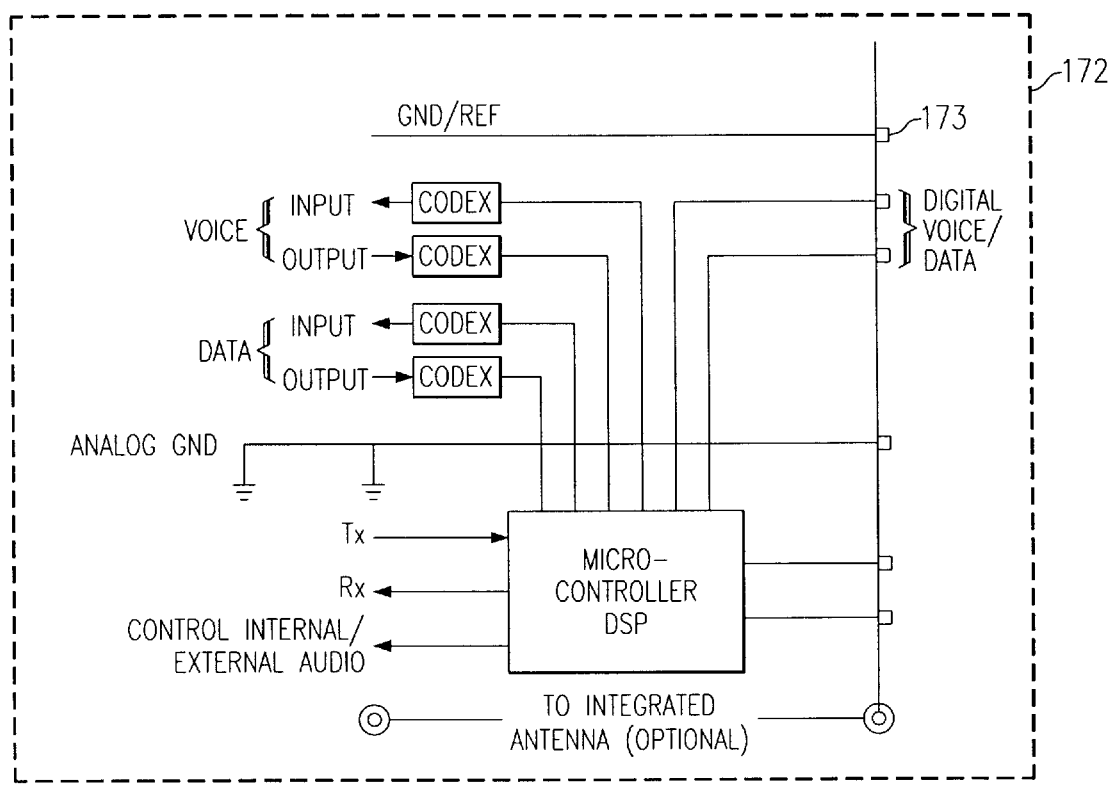
Figure 158:
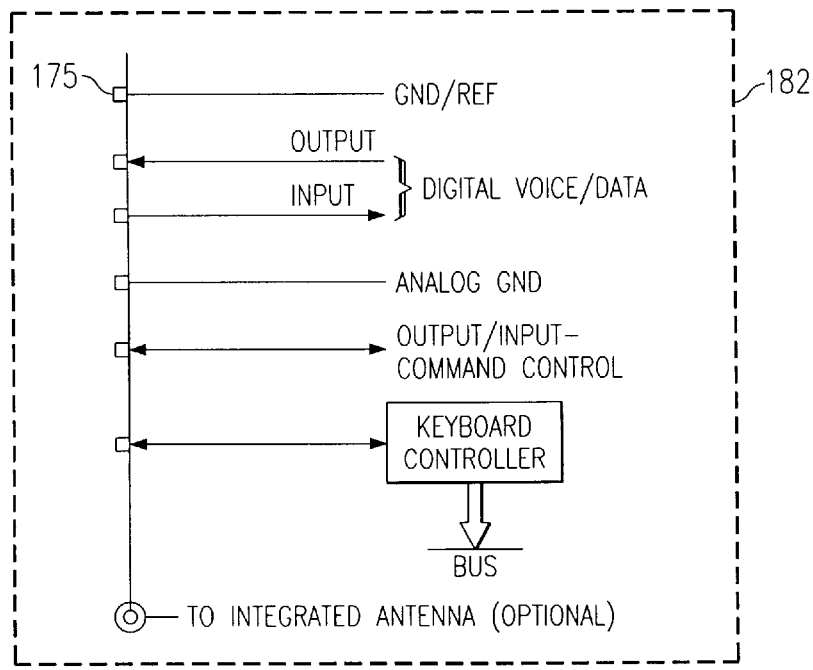

In the embodiment of the invention illustrated in FIG. 155, computer/portable telephone interface 172 comprises: power leads for charging the portable telephone's battery(s) while connected to the computer; two codex circuits for coupling two signal lines (voice input and output) to a microcontroller DSP; two codex circuits for coupling two signal lines (data input and output) to the microcontroller DSP; an analog ground lead line; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 156. In the embodiment of the invention illustrated in FIG. 157, computer/portable telephone interface 172 comprises: a ground/reference signal line; two codex circuits for coupling two signal lines (voice input and output) to a microcontroller DSP; two codex circuits for coupling two signal lines (data input and output) to the microcontroller DSP; an analog ground lead line; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 158.

Figure 159:
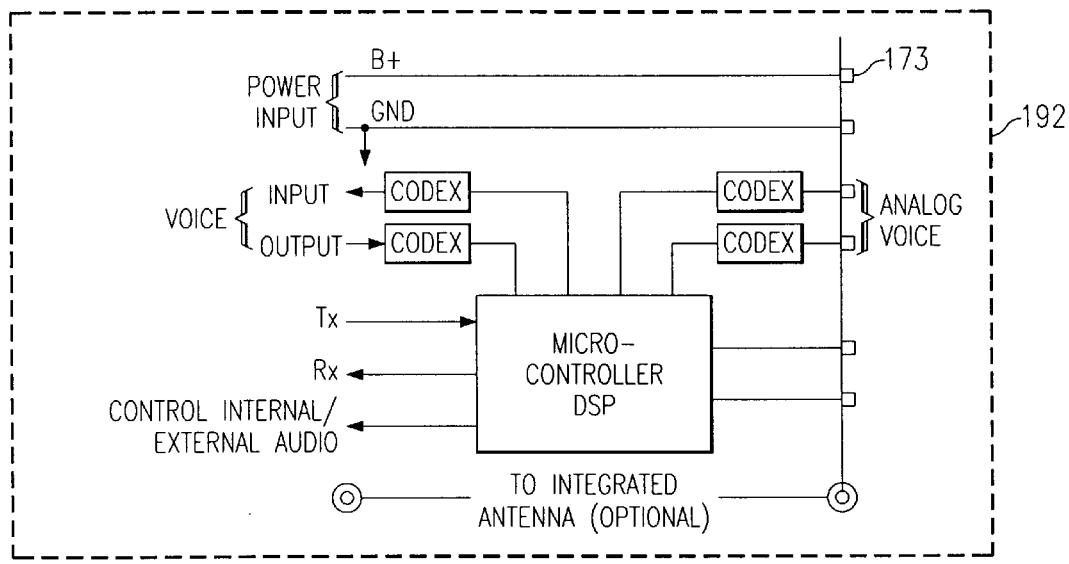
Figure 160:
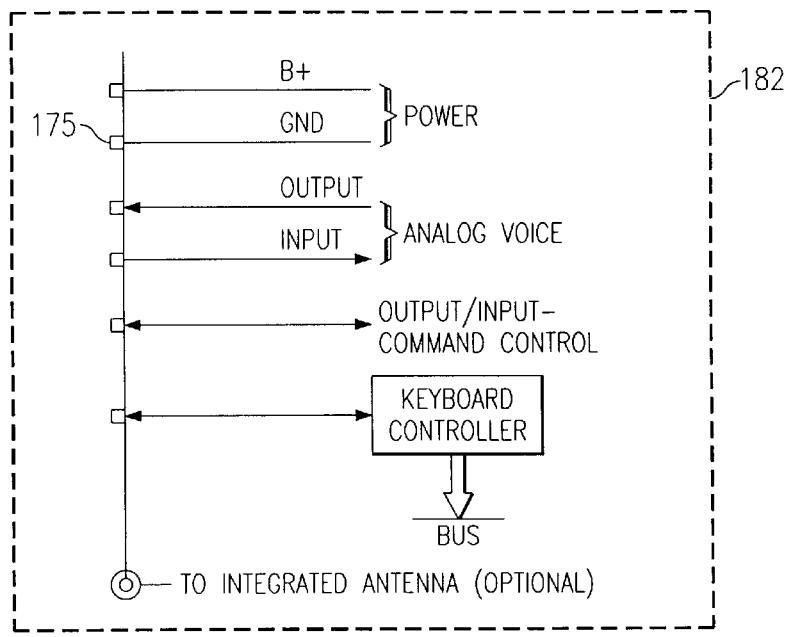
Figure 161:
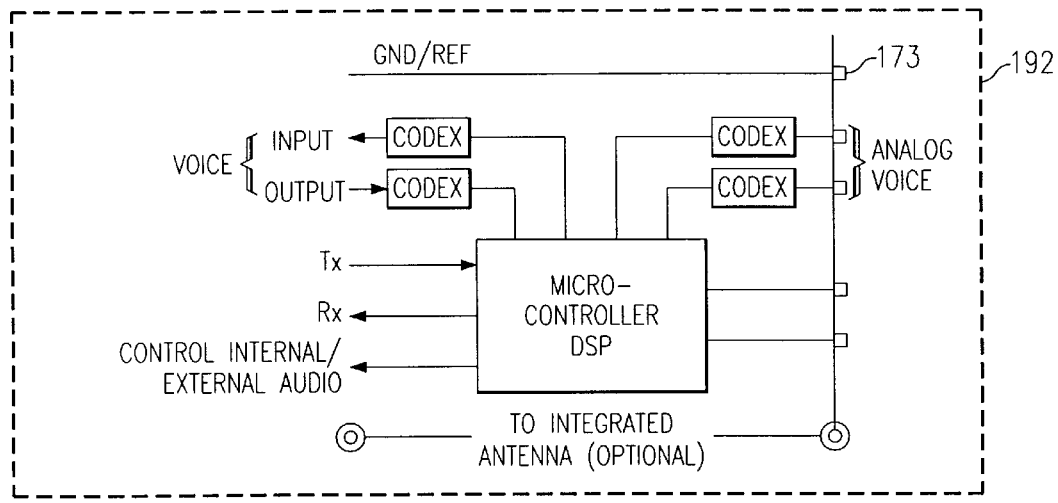
Figure 162:
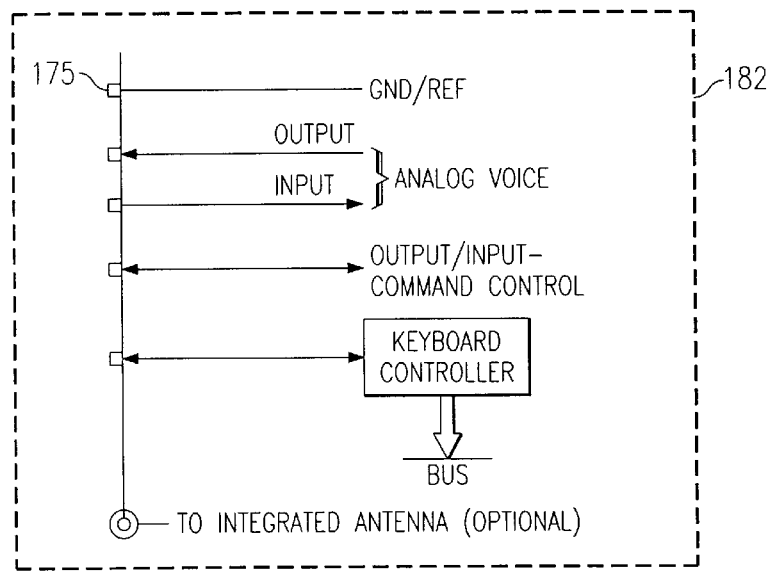

In the embodiment of the invention illustrated in FIG. 159, computer/portable telephone interface 172 comprises: power leads for charging the portable telephone's battery(s) while connected to the computer; four codex circuits for coupling the voice input and output signal lines to a microcontroller DSP; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 160. This embodiment of the invention provides a means of implementing a full duplex speaker phone in computers that do not have the processing capability to do so (the computer would only need a speaker and microphone and would not have to have any sound capability). Other possible applications could be voice pass word recognition for phone functioning. In the embodiment of the invention illustrated in FIG. 161, computer/portable telephone interface 172 comprises: a ground/reference signal line; four codex circuits for coupling the voice input and output signal lines to a microcontroller DSP; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 162. This embodiment of the invention also provides a means of implementing a full duplex speaker phone in computers that do not have the processing capability to do so (the computer would only need a speaker and microphone and would not have to have any sound capability). Other possible applications could be voice pass word recognition for phone functioning.

Figure 163:
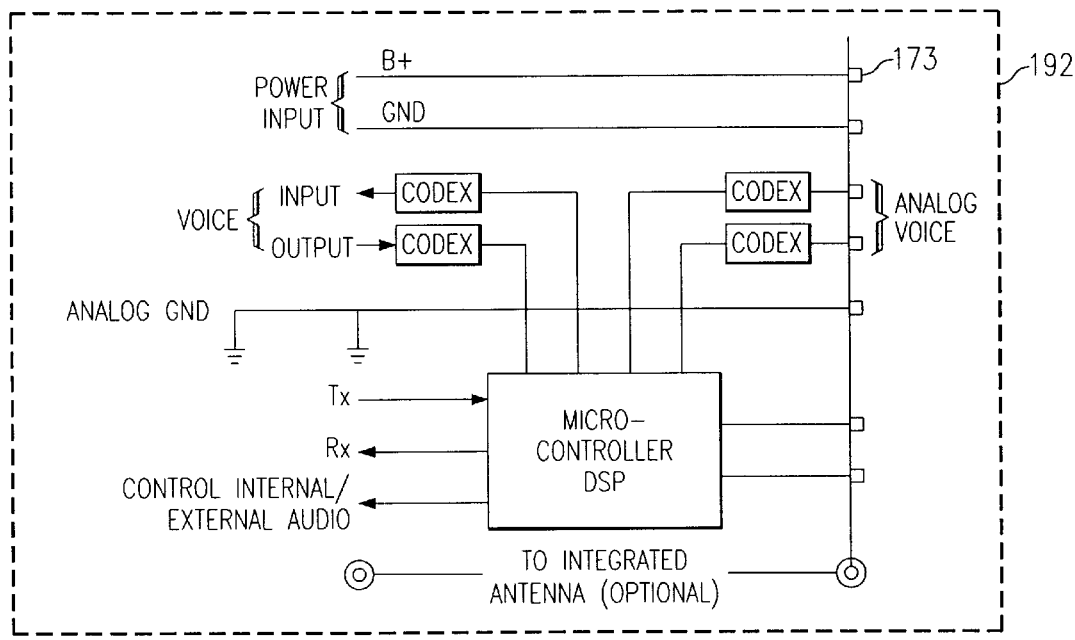
Figure 164:
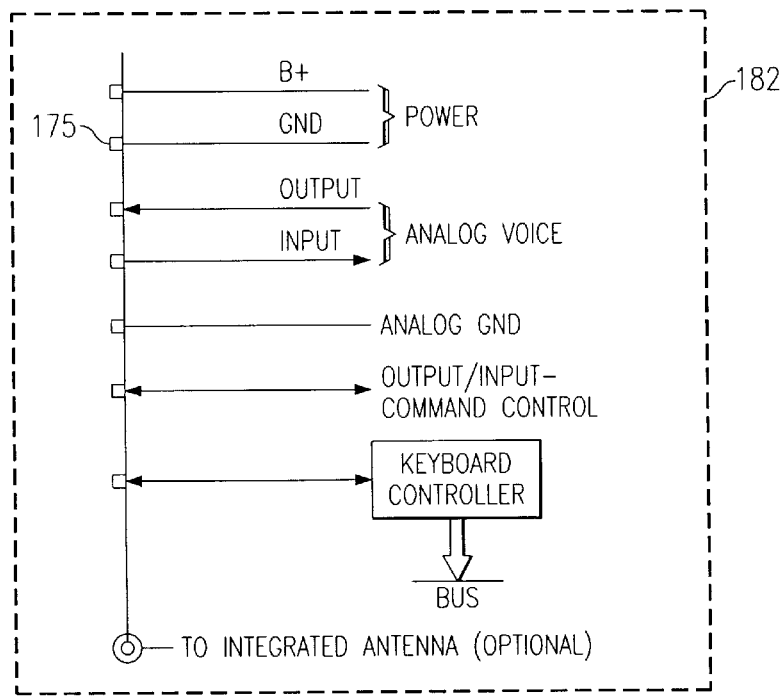
Figure 165:
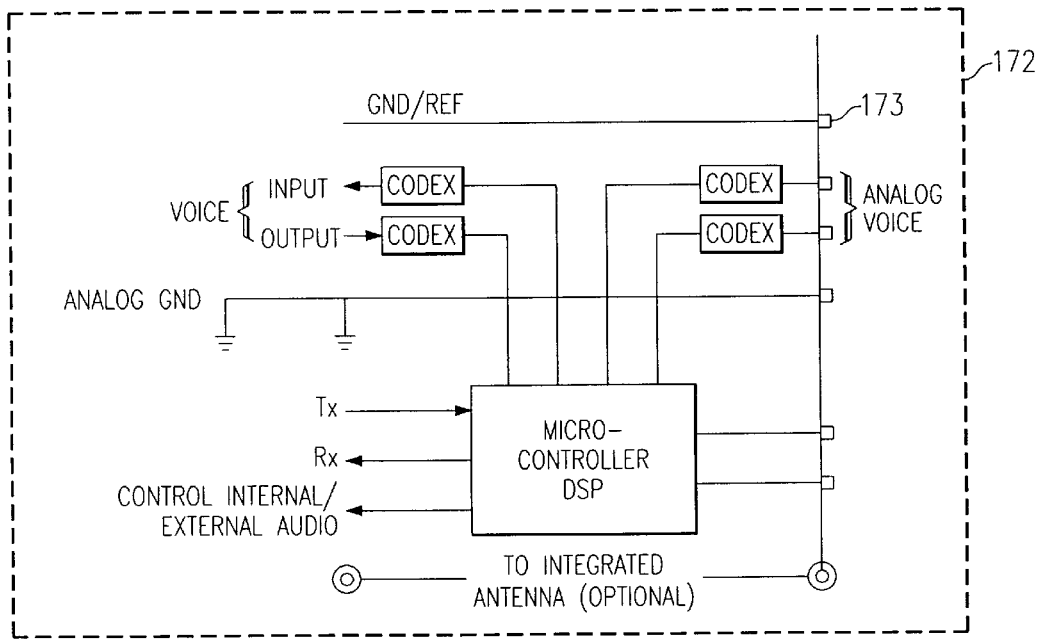
Figure 166:
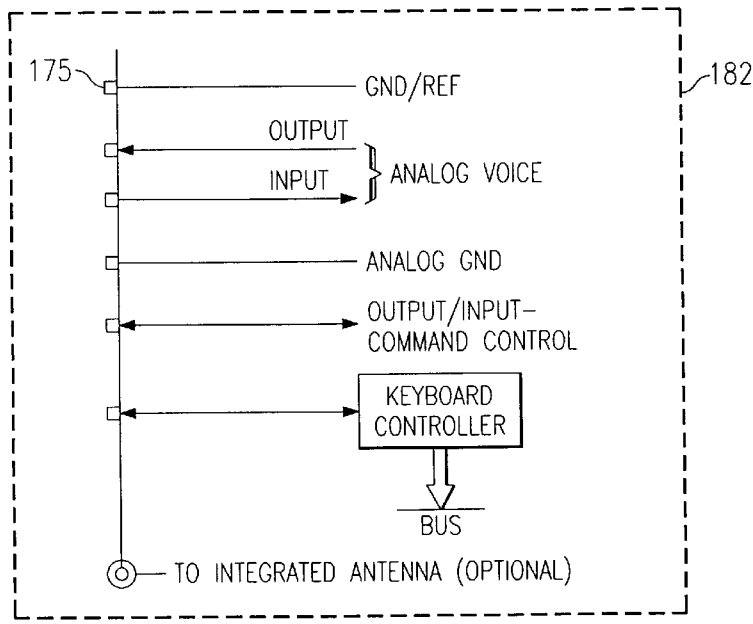

In the embodiment of the invention illustrated in FIG. 163, computer/portable telephone interface 172 comprises: power leads for charging the portable telephone's battery(s) while connected to the computer; four codex circuits for coupling the voice input and output signal lines to a microcontroller DSP; an analog ground lead line; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 164. This embodiment of the invention similarly provides a means of implementing a full duplex speaker phone in computers that do not have the processing capability to do so (the computer would only need a speaker and microphone and would not have to have any sound capability). Other possible applications could be voice pass word recognition for phone functioning. In the embodiment of the invention illustrated in FIG. 165, computer/portable telephone interface 172 comprises: a ground/reference signal line; four codex circuits for coupling the voice input and output signal lines to a microcontroller DSP; an analog ground lead line; transmit, receive and control internal/external audio signal lines coupled to the microcontroller DSP; and electrical contacts for coupling the power leads, at least two input/output voice leads (input and output), a command channel lead (input/output) and a lead line for receiving a keyboard controller signal, to corresponding electrical contacts and leads in computer/portable telephone interface 182 in portable computer 164, as illustrated in FIG. 166. This embodiment of the invention also provides a means of implementing a full duplex speaker phone in computers that do not have the processing capability to do so (the computer would only need a speaker and microphone and would not have to have any sound capability). Other possible applications could be voice pass word recognition for phone functioning.

Figure 167:
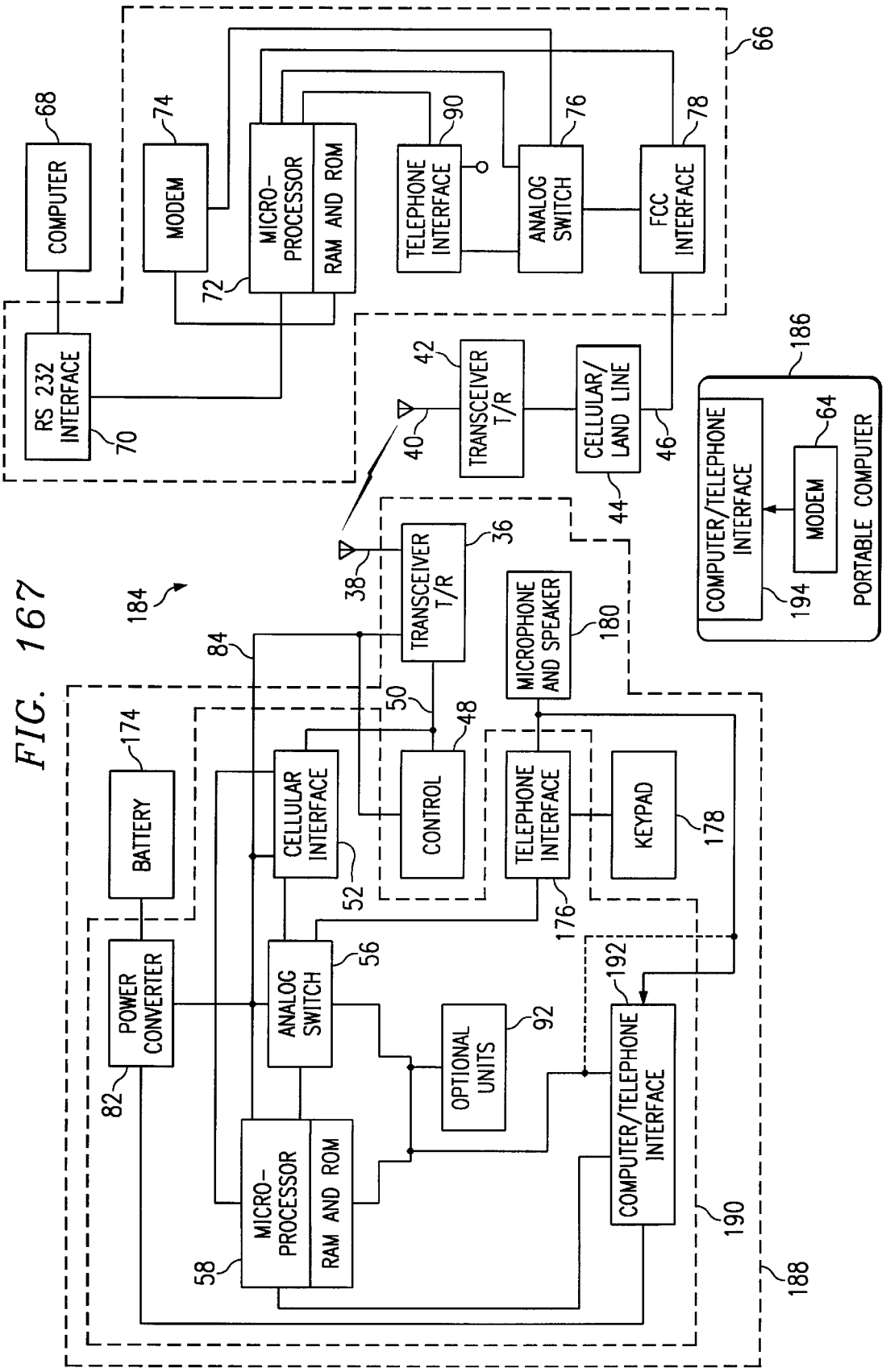
FIG. 167 illustrates a block diagram of a cellular telephone voice/data communication system according to another embodiment of the invention.

Another embodiment of the invention for transmitting voice/data over a cellular telephone network is indicated generally at 184 in FIG. 167. In this embodiment, modem 64 is located in portable computer 186 instead of in portable telephone 188. Modem 64 may be one of a number of conventional modems used for telephone wire line transmission which has test mode capabilities for deactivating certain modem functions. Modem 64 may be a separate board that is inserted into the portable computer as an integral part of the computer (as in the case of the Texas Instruments TM-4000E portable computer), or as part of a card insertable into the PCMCIA card slot in the portable computer (as in the case of the Texas Instruments TM-5000 portable computer). One modem suitable for use as modem 64 in devices having an internal modem option is the AMI 3530 modem manufactured by Gould Advanced Semiconductors of 3800 Hemstead Road, Santa Clara, Calif. As an example, the TM-4000E portable computer manufactured by Texas Instruments, Inc., has an internal modem (optional). The TM-5000 portable computer, on the other hand, does not. The TM-5000 can be modified for this modem function by using a PCMCIA modem card (such as the XJ2288 PCMCIA card available from Megahertz) and modifying it so that analog line connections are routed back into the notebook computer. Alternatively, the TM-5000 can be modified to contain an internal modem. Other suitable modems are commercially available. Modems of this type, when employed for data transmission over conventional telephone lines, will disconnect immediately in response to a carrier loss. When such modems sense a channel blanked status occasioned by a carrier loss, they provide a "break bit" output and disconnect. Also, for normal use such modems include a scrambler system which assures that the data modulated signal is continuously changing, and this signal change is used by the modem PLL circuitry to provide synchronization. A non-scrambled modulated signal may be interpreted by the telephone operating equipment as a valid switch command, and this is particularly true when the modem is in the static condition. Normally this scrambler system in the modem prevents this tactic condition where loss of synchronization by the PLL or the interpretation of the static signal as a switch command is most likely to occur. However, modems such as the AMI 3530 or modified Megahertz PCMCIA modem card incorporate a test mode of operation wherein the modem is prevented from disconnecting in response to carrier loss and wherein the modem scrambler can be deactivated or defeated. Normally, such modems would be incapable of effective operation in this test mode, but it is the availability of this test mode that renders modems of this type suitable for use as the modem 64.

The data stream from the microprocessor 58, including error correction data from the microprocessor, is sent via coupled computer/portable telephone interfaces 172 and 182 to modem 64, then transmitted by modem 64 through the coupled computer/portable telephone interfaces 194 and 190, analog switch 56 and cellular interface 52 to the transceiver 36. This data is then transmitted as a radio frequency signal by the antenna 38 to the antenna 40, where it is converted by the transceiver 42 and cellular land line equipment 44 to a signal suitable for transmission over conventional telephone lines 46. These telephone lines connect the signal to the second portion of the cellular transmission system of the present invention which is a static data programming interface 66 operative to pass data signals to and from the telephone line 46. The data signals which are passed to the telephone line originate at a host computer 68.

For transmission purposes, the computer 68 provides data to an RS 232 interface 70 which in turn provides the data to a microprocessor 72. This microprocessor preferably is identical in construction and function to the microprocessor 58, and is programmed with the same control and error correction and other programming. The microprocessor 72 adds error correction and control signal to the data provided from the RS 232 interface, and then provides the modified data stream to a modem 74. The modem 74 preferably is identical in construction and function to the modem 64, and operates to transmit the data stream by means of an analog switch and conditioning system 76 to a conventional FCC interface 78. The FCC interface provides the data stream to the telephone lines 46 where they are sent by means of the cellular land line equipment 44 to the transceiver 42. The data is then transmitted to the transceiver 36 which provides it by means of the cellular interface 52 and the analog switch 56 to the microprocessor 58. The microprocessor then removes the error correction and control signals from the data stream and provides the data through the coupled computer/portable telephone interfaces 192 and 194 and modem 64 for display and use by the portable computer 164.

The static data programming interface 66 receives data transmitted over the cellular telephone line, and this incoming data from the FCC interface 78 is fed by means of the analog switch 76 to the microprocessor 72. Here the error and control signals are removed from the data and the data is then displayed and/or used by the computer 68. It will be noted that the static data programming interface 66 and the mobile data programming interface 190 are similar in structure and operation with the exceptions that the static data programming interface is connected to a computer via a cable through an RS 232 interface while the mobile data programming interface utilizes a direct electrical connection to couple it to the portable computer. Additional differences are that the static data programming interface 66 is connected to telephone lines by an FCC interface while the mobile data programming interface 190 is connected to a cellular telephone system by a cellular interface. The cellular telephone 188 may be powered from a battery 174 (and/or a battery substitute-power supply) which operates through a conventional power converter 82 to provide power to a power bus 84. This power bus 84 is connected to provide power to all of the operating units in the cellular telephone 188. The static programming interface 66 includes a similar power bus, not shown, which is connected to any conventional power supply such as the power supply in a building containing the computer 68.

Although the mobile data programming interface 190 and the static data programming interface 66 must communicate with one another to effectively transmit data over a cellular telephone system, both of these units can also transmit and receive conventional cellular telephone audio transmissions. The mobile data programming interface 190 includes a telephone interface 176 connected to a keypad 178 and a microphone and speaker 180, which operate in a conventional manner through the analog switch and conditioning system 56 and cellular interface 52 to transmit and receive audio communications by means of the transceiver 36. In a similar manner, the static data programming interface 66 includes a telephone interface 90 which may be connected to an external telephone to transmit and receive audio signals through the telephone interface, the analog switch 76 and the FCC interface 78. Thus, both the mobile data programming interface 190 and the static data programming interface 66 are adapted for normal audio communication. Like the mobile data programming interface, the static data programming interface includes a control and display section (not shown) which is connected to the microprocessor 72 and which operates to receive data from which the microprocessor has extracted the control and error signals.

Both the mobile data programming interface 190 and the static data programming interface 66 will operate with optional equipment, and an optional equipment block 92 is shown for the mobile data programming interface in FIG. 167. This optional equipment might include other modems and various memory and encrypting devices known to the art to accomplish automatic dialing and other similar functions.

Computer/portable telephone interface 192 replaces the RS 232 interface 62 (could also supplement the RS 232 interface is specific situations) in the mobile data programming interface 54 of FIG. 3, and cellular telephone 188 is a self-contained and compact unit (versus the multi-component unit of FIG. 3) having a keypad 178 and microphone and speaker 180 (instead of the cellular phone 88 of FIG. 3) connected to telephone interface 176. Computer/portable telephone interfaces 192 and 194 may utilize the embodiments of computer/portable telephone interfaces 172 and 174 as illustrated in FIGS. 15–166, respectively.

Figure 168:
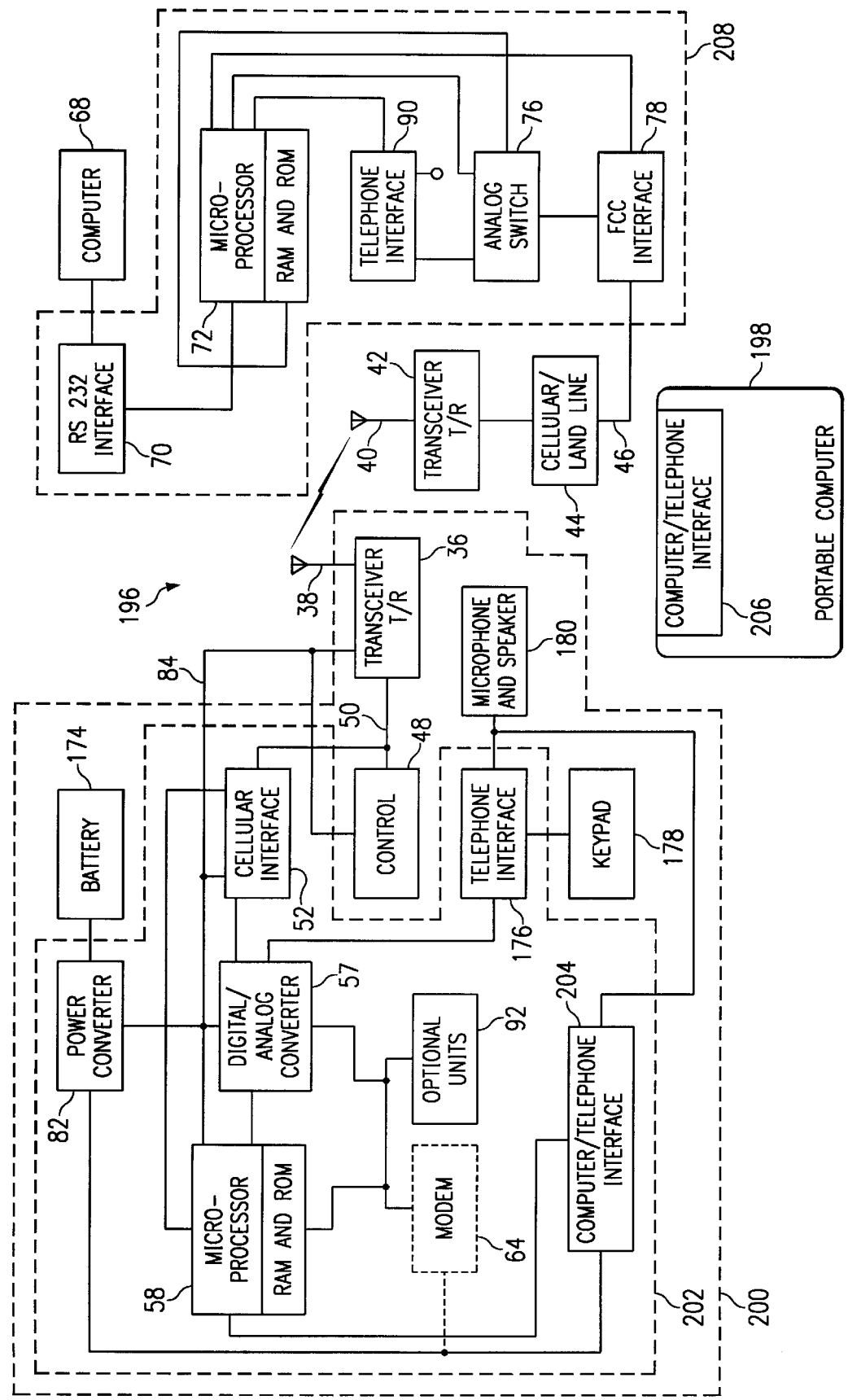
FIG. 168 illustrates a block diagram of a cellular telephone voice/data communication system according to yet another embodiment of the invention.

Yet another embodiment of the invention for transmitting voice/data over a cellular telephone network is indicated generally at 196 in FIG. 168. This embodiment of the invention utilizes digital transmitting/receiving radio frequency communication in contrast to the analog transmitting/receiving radio frequency communication of the previous embodiments of the invention. The modem may be omitted when telephone 188 is to be used in a completely digital telephone network.

In the digital embodiment of the invention, data is sent directly from portable computer 198 through coupled computer/portable telephone interfaces 206 and 204 to microprocessor 58. A data stream from the microprocessor 58, including error correction data from the microprocessor, is sent via digital/analog converter 57 which converts digital to analog and analog to digital, and cellular interface 52 to the transceiver 36. This data is then transmitted as a radio frequency signal by the antenna 38 to the antenna 40, where it is converted by the transceiver 42 and cellular land line equipment 44 to a signal suitable for transmission over conventional telephone lines 46. These telephone lines connect the signal to the second portion of the cellular transmission system of the present invention which is a static data programming interface 208 operative to pass data signals to and from the telephone line 46. The data signals which are passed to the telephone line originate at a host computer 68.

For transmission purposes, the computer 68 provides data to an RS 232 interface 70 which in turn provides the data to a microprocessor 72. This microprocessor preferably is identical in construction and function to the microprocessor 58, and is programmed with the same control and error correction and other programming. The microprocessor 72 adds error correction and control signal to the data provided from the RS 232 interface, and transmits the data stream by means of a digital/analog converter 77 which converts digital to analog and analog to digital, to a conventional FCC interface 78. The FCC interface provides the data stream to the telephone lines 46 where they are sent by means of the cellular land line equipment 44 to the transceiver 42. The digital data is then transmitted to the transceiver 36 which provides it by means of the cellular interface 52 and the digital/analog converter 57 to the microprocessor 58. The microprocessor then removes the error correction and control signals from the data stream and provides the data through the coupled computer/portable telephone interfaces 204 and 206 for display and use by the portable computer 198.

The static data programming interface 208 receives digital data transmitted over the cellular telephone line, and this incoming data from the FCC interface 78 is fed by means of the digital/analog converter 77 to the microprocessor 72. Here the error and control signals are removed from the data and the data is then displayed and/or used by the computer 68. It will be noted that the static data programming interface 208 and the mobile data programming interface 202 are similar in structure and operation with the exceptions that the static data programming interface is connected to a computer via a cable through an RS 232 interface while the mobile data programming interface utilizes a direct electrical connection to couple it to the portable computer. Additional differences are that the static data programming interface 208 is connected to telephone lines by an FCC interface while the mobile data programming interface 202 is connected to a cellular telephone system by a cellular interface 52. The cellular telephone 196 may be powered from a battery 174 (and/or a battery substitute-power supply) which operates through a conventional power converter 82 to provide power to a power bus 84. This power bus 84 is connected to provide power to all of the operating units in the cellular telephone 188. The static programming interface 208 includes a similar power bus, not shown, which is connected to any conventional power supply such as the power supply in a building containing the computer 68.

Although the mobile data programming interface 202 and the static data programming interface 208 must communicate with one another to effectively transmit data over a cellular telephone system, both of these units can also transmit and receive conventional cellular telephone audio transmissions. The mobile data programming interface 202 includes a telephone interface 176 connected to a keypad 178 and a microphone and speaker 180, which operate in a conventional manner through the digital/analog converter 57 and cellular interface 52 to transmit and receive audio communications by means of the transceiver 36. In a similar manner, the static data programming interface 208 includes a telephone interface 90 which may be connected to an external telephone to transmit and receive audio signals through the telephone interface, the digital/analog converter 77 and the FCC interface 78. Thus, both the mobile data programming interface 202 and the static data programming interface 208 are adapted for normal audio communication. Like the mobile data programming interface, the static data programming interface includes a control and display section (not shown) which is connected to the microprocessor 72 and which operates to receive data from which the microprocessor has extracted the control and error signals.

Both the mobile data programming interface 202 and the static data programming interface 208 will operate with optional equipment, and an optional equipment block 92 is shown for the mobile data programming interface in FIG. 168. This optional equipment might include various memory and encrypting devices known to the art to accomplish automatic dialing and other similar functions.

Computer/portable telephone interface 204 replaces the RS 232 interface 62 (could also supplement the RS 232 interface is specific situations) in the mobile data programming interface 54 of FIG. 3, and cellular telephone 200 is a self-contained and compact unit (versus the multi-component unit of FIG. 3) having a keypad 178 and microphone and speaker 180 (instead of the cellular phone 88 of FIG. 3) connected to telephone interface 176. Computer/portable telephone interfaces 204 and 206 may utilize the embodiments of computer/portable telephone interfaces 172 and 174 as illustrated in FIGS. 15–166, respectively.

Figure 169:
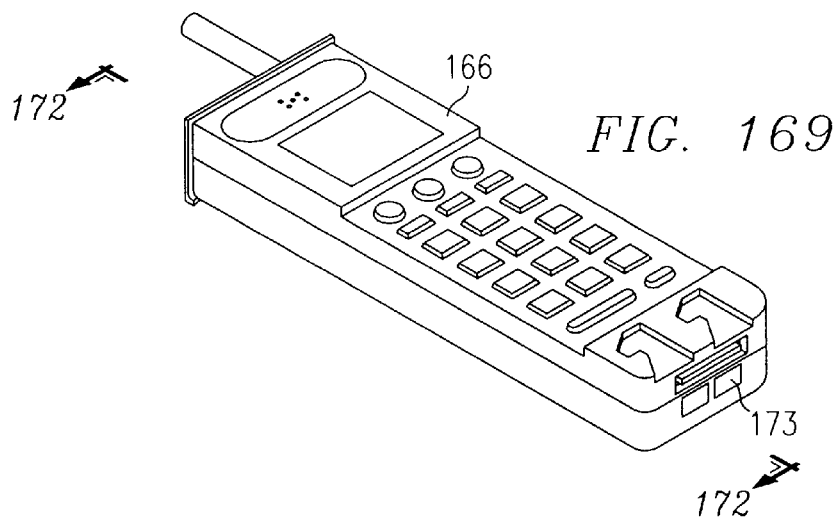
FIG. 169 illustrates an elevational view of portable telephone 167.
Figure 170:
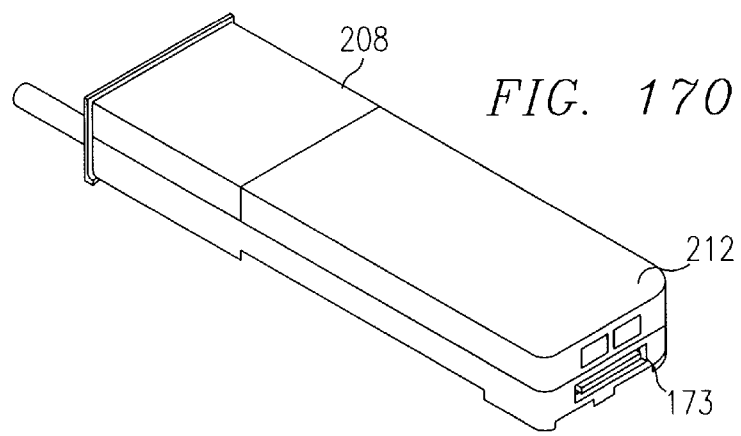
FIG. 170 illustrates an elevational view of rechargeable battery 208.

Electrical contacts 173 may be formed in the bottom end of portable telephone 166, as illustrated in FIG. 169. Electrical contacts 173 are also formed in the bottom end of rechargeable battery 208, as illustrated in FIG. 170. A rechargeable battery 208 is inserted in and coupled to portable computer 164 in FIGS. 7–11. If portable telephone 166 is not to coupled to the portable computer (Texas Instruments TM-5000 in the present case) for a period of time, a second rechargeable battery, identical to battery 208, may be inserted in place of portable telephone 166 into the cavity 210 in the portable computer used by portable telephone. A second battery will effectively double the available battery capacity.

Figure 171:
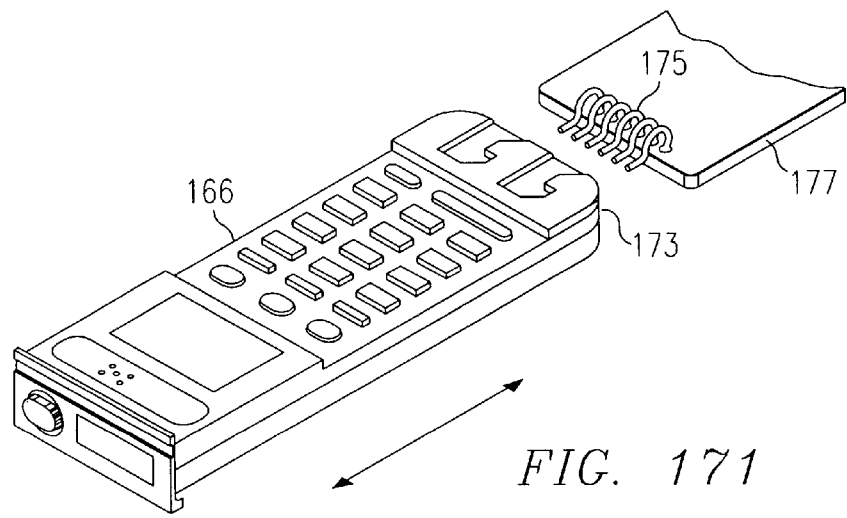
FIG. 171 illustrates an elevational view of how contacts 173 on portable telephone 166 connect with electrical contacts 175 on board 177 in portable computer 164.
Figure 172:
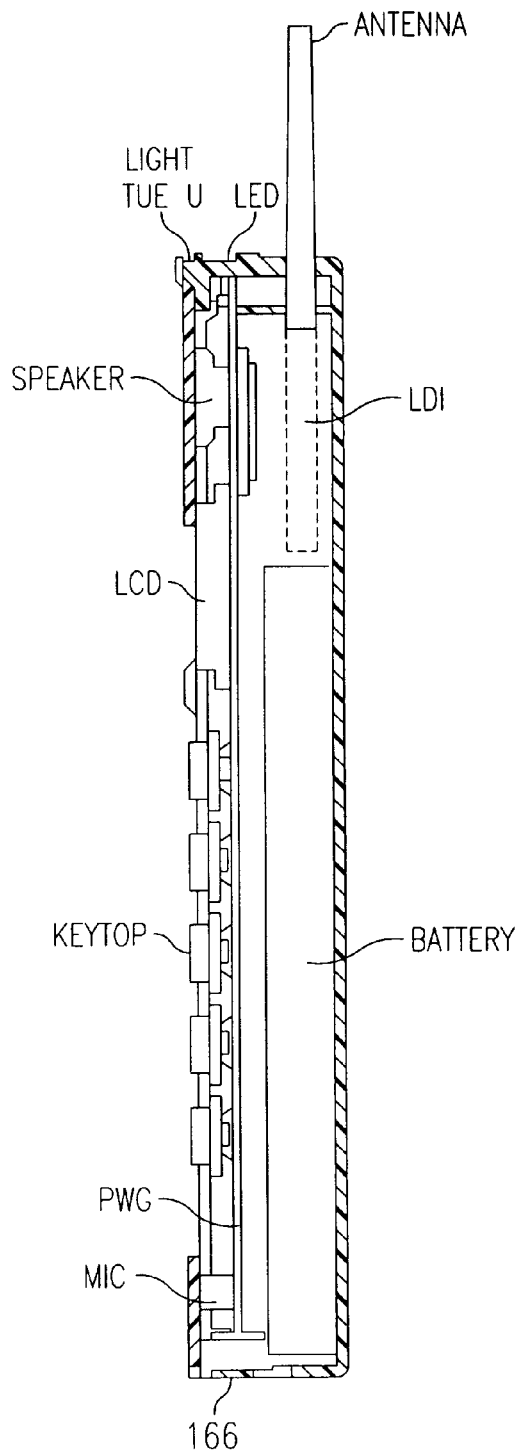
FIG. 172 illustrates a side sectional view of portable telephone 166 along the section lines 1—1 of FIG. 169.
Figure 173:
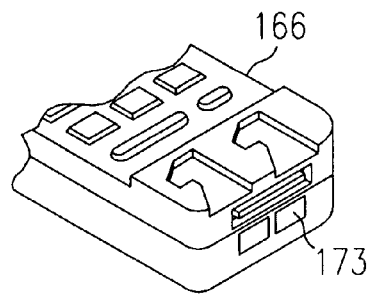
FIG. 173 illustrates a bottom view of portable telephone 166.

Electrical contacts 173 mate to corresponding electrical contacts 175 in portable computer 164. In the embodiment of the invention illustrated in FIG. 171, electrical contacts 175 are individual curved contacts each soldered or otherwise electrically and physically connected to a circuit board 177 within the portable computer. Contacts 175 provide an electrical connection and a spring tension force against electrical contacts 173 when either portable telephone 166 or battery 208 is fully inserted within cavity 210. The spring tension force makes removal of portable telephone 166 or battery 208 easier when a latch with cavity 210 is released from latch locking bracket 212. And while electrical contacts 173 have been shown as individual contacts being formed in the bottom of portable telephone 166, and electrical contacts 175 have been shown as being curved individual contacts electrically and physically connected to a circuit board in portable computer 164, commercially available or customized electrical connectors can be used in lieu of the electrical contacts disclosed. FIG. 172 illustrates a side sectional view of portable telephone 166 along the section lines 1—1 of FIG. 171. FIG. 173 illustrates a bottom view of portable telephone 166.

Portable computer 164 also contains a microphone 214 and a sound system (known in the art and commercially available) having at least one speaker 216. An autodialing software package, such as the autodialer available with Microsoft's Windows 95 operating system, is loaded onto portable computer 164 and utilized to access the dialing functions of portable telephone 166.

While implementations of preferred embodiments of the present invention have been shown and described, various modifications and alternate embodiments will occur to those skilled in the art. Accordingly, it is intended that the invention be limited only in terms of the appended claims.

What is claimed:

1. A portable telephone, comprising:
    a housing dimensioned to fit completely within a cavity in a computer;
    a radio frequency (RF) transceiver within said housing;
    a microprocessor coupled to said transceiver;
    a power source coupled to said microprocessor;
    a telephone interface coupled to said processor;
    a keypad coupled to said telephone interface;
    a microphone and speaker coupled to said telephone interface;
    an interface coupled to said microprocessor, said interface being directly connectable to a corresponding interface in a computer; and
    a mechanism on said housing that cooperates with a corresponding latching mechanism in said computer for removably securing said portable telephone to said computer.

2. The portable telephone of claim 1, wherein said computer is a portable computer.

3. The portable telephone of claim 1, wherein said portable telephone is a cellular telephone.

4. The portable telephone of claim 1, wherein said corresponding interface in said computer is located within said cavity in said computer.

5. The portable telephone of claim 1, further including a modem coupled to said microprocessor.

6. The portable telephone of claim 5, wherein said portable telephone is capable of transmitting and receiving voice and data signals while connected to said computer.

7. The portable telephone of claim 1, wherein said portable telephone is capable of transmitting and receiving voice and data signals while connected to said computer.

8. The portable telephone of claim 1, further including a cellular interface coupled to said microprocessor.

9. The portable telephone of claim 1, wherein an analog switch couples said telephone interface to said microprocessor.

10. The portable telephone of claim 1, wherein said interface coupled to said microprocessor comprises: at least one voice channel lead, one command channel lead and a ground/reference lead for connection to corresponding leads in said interface in said computer.

11. The portable telephone of claim 10, wherein said at least one voice channel lead facilitates a bidirectional half duplex mode.

12. The portable telephone of claim 10, wherein said at least one command channel lead facilitates a bidirectional half duplex mode.

13. The portable telephone of claim 10, wherein said interface coupled to said microprocessor further includes a power lead.

14. The portable telephone of claim 10, wherein voice and data are transmitted on said at least one voice channel lead.

15. The portable telephone of claim 10, wherein said interface coupled to said microprocessor further includes at least one data channel lead.

16. The portable telephone of claim 15, wherein said at least one data channel lead facilitates a bidirectional half duplex mode.

17. The portable telephone of claim 16, wherein said interface coupled to said microprocessor further includes a second command channel lead.

18. The portable telephone of claim 17, wherein each of said voice channel leads facilitates a unidirectional full duplex mode.

19. The portable telephone of claim 10, wherein said interface coupled to said microprocessor further includes a second voice channel lead.

20. The portable telephone of claim 19, wherein each of said voice channel leads facilitates a unidirectional full duplex mode.

21. The portable telephone of claim 20, wherein voice and data are transmitted on said voice channel leads.

22. The portable telephone of claim 10, wherein said interface coupled to said microprocessor further includes a second command channel lead.

23. The portable telephone of claim 22, wherein each of said voice channel leads facilitates a unidirectional full duplex mode.

24. The portable telephone of claim 10, wherein said interface coupled to said microprocessor is further coupled to said telephone interface.

25. The portable telephone of claim 1, wherein the dimensions of said housing are the same as the dimensions of a housing of another device that may be inserted into said cavity in lieu of said portable telephone.

26. The portable telephone of claim 25, wherein said another device is a battery.

27. A portable telephone, comprising:
    a housing dimensioned to fit completely within a cavity in a computer such that only a single surface of said housing is exposed to a user of said computer when said portable telephone is fully inserted into said cavity;

a radio frequency (RF) transceiver within said housing;

a microprocessor coupled to said transceiver;

a power source coupled to said microprocessor;

a telephone interface coupled to said processor;

a keypad coupled to said telephone interface;

a microphone and speaker coupled to said telephone interface;

an interface coupled to said microprocessor, said interface being directly connectable to a corresponding interface in a computer; and a mechanism on said housing that cooperates with a corresponding latching mechanism in said computer for removably securing said portable telephone to said computer.

28. The portable telephone of claim 27, wherein the dimensions of said housing are the same as the dimensions of a housing of another device that may be inserted into said cavity in lieu of said portable telephone.

29. The portable telephone of claim 28, wherein said another device is a battery.

* * * * *